(12) United States Patent
Sairam et al.

(10) Patent No.: US 12,499,619 B2
(45) Date of Patent: Dec. 16, 2025

(54) OBSTACLE DETECTION SYSTEM AND METHOD

(71) Applicant: KUBOTA CORPORATION, Osaka (JP)

(72) Inventors: Varun Sairam, Fremont, CA (US); Aarush Gupta, Fremont, CA (US)

(73) Assignee: KUBOTA CORPORATION, Osaka (JP)

( * ) Notice: Subject to any disclaimer, the term of this patent is extended or adjusted under 35 U.S.C. 154(b) by 256 days.

(21) Appl. No.: 18/202,453

(22) Filed: May 26, 2023

(65) Prior Publication Data

US 2024/0394973 A1 Nov. 28, 2024

(51) Int. Cl.
*G06T 17/05* (2011.01)
*A01B 69/04* (2006.01)
*G01C 21/20* (2006.01)

(52) U.S. Cl.
CPC ............ *G06T 17/05* (2013.01); *A01B 69/008* (2013.01); *G01C 21/20* (2013.01); *G06T 2210/32* (2013.01); *G06T 2210/56* (2013.01)

(58) Field of Classification Search
CPC . G06T 17/05; G06T 2210/32; G06T 2210/56; G06T 2207/10028; A01B 69/008; G01C 21/20; G01S 17/89–90; G01S 17/93–931
See application file for complete search history.

(56) References Cited

U.S. PATENT DOCUMENTS

| | | | | |
|---|---|---|---|---|
| 2017/0098323 A1* | 4/2017 | Rogan | ............... | G01S 17/89 |
| 2020/0043220 A1* | 2/2020 | Mishaev | ............... | G06T 5/70 |
| 2021/0192273 A1* | 6/2021 | Pfeiffer | ............... | G06V 10/267 |
| 2022/0004198 A1* | 1/2022 | Ryu | ............... | G05D 1/0274 |
| 2024/0111297 A1* | 4/2024 | Masuda | ............... | G05D 1/622 |

FOREIGN PATENT DOCUMENTS

| | | | | |
|---|---|---|---|---|
| JP | 2020034772 A | * | 3/2020 | |
| WO | WO-2011085437 A1 | * | 7/2011 | ............ G06T 17/05 |
| WO | 2020076418 A1 | | 4/2020 | |

OTHER PUBLICATIONS

EPO machine translated description of JP-2020034772-A. (Year: 2020).*
Official Communication issued in International Patent Application No. PCT/JP2024/018318, mailed on Jul. 23, 2024, 9 pages.

* cited by examiner

*Primary Examiner* — Navid Z. Mehdizadeh
*Assistant Examiner* — Shelley Marie Osterhout
(74) *Attorney, Agent, or Firm* — Keating & Bennett, LLP

(57) ABSTRACT

A method includes generating a three-dimensional point cloud including a plurality of data points and filtering the three-dimensional point cloud to remove one or more data points from the plurality of data points. The one or more data points are removed from the plurality of data points based on a position of the one or more data points.

20 Claims, 32 Drawing Sheets

Fig. 9A
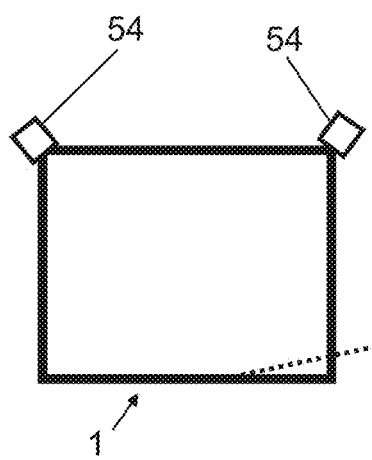
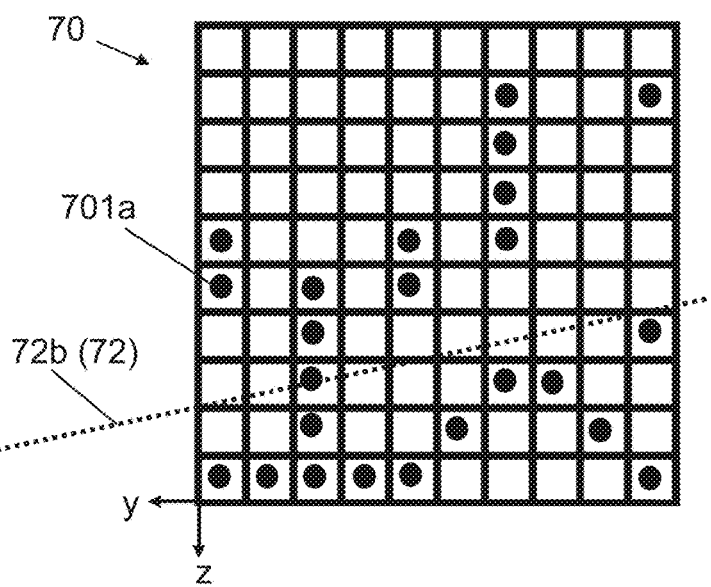
Fig. 9B
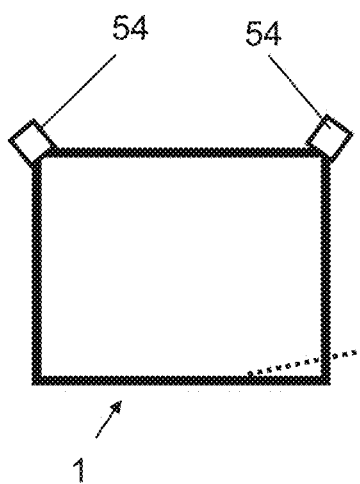
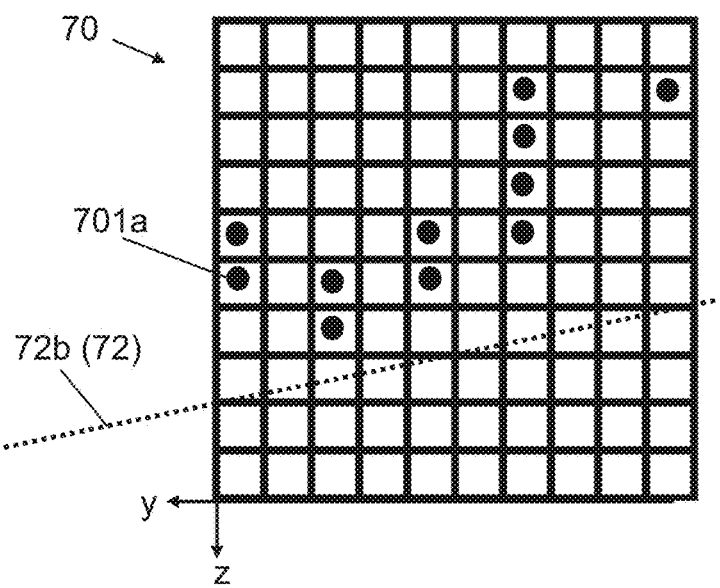

Fig. 10A
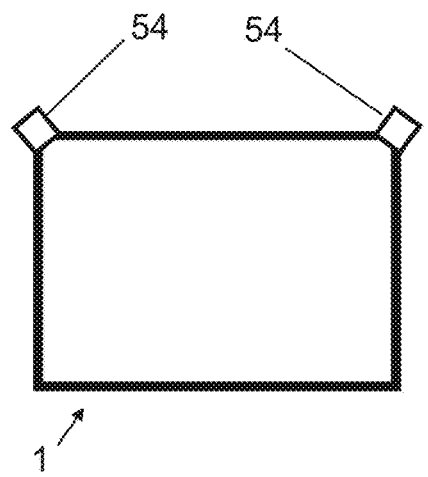
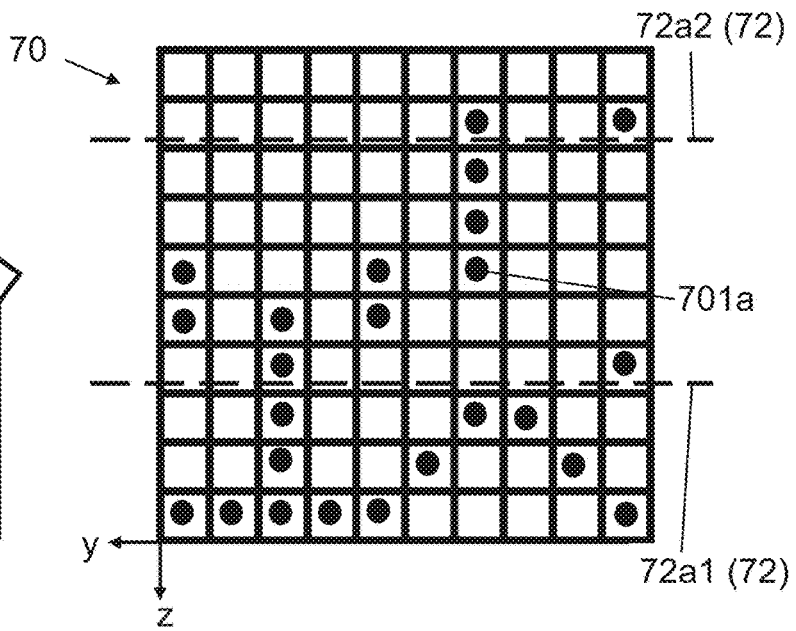
Fig. 10B
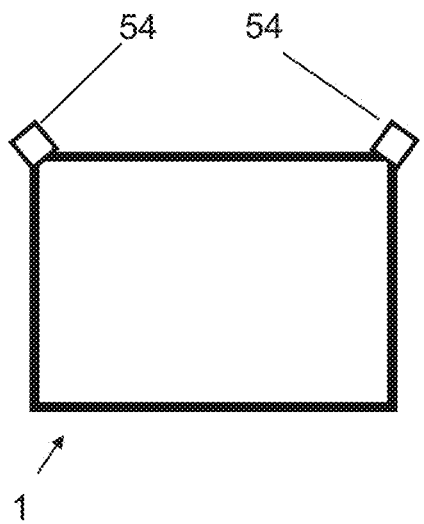
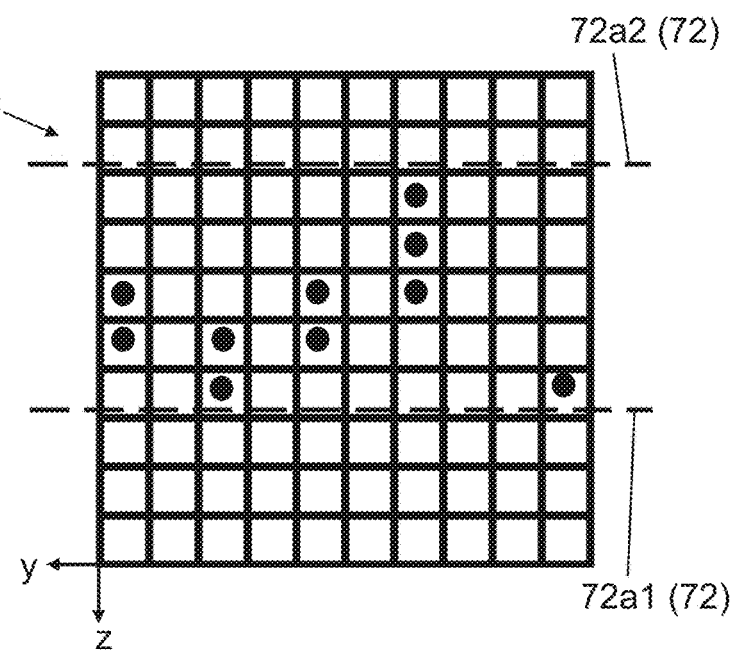

Fig. 14A
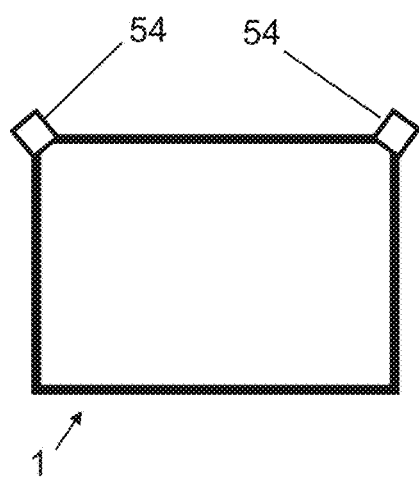 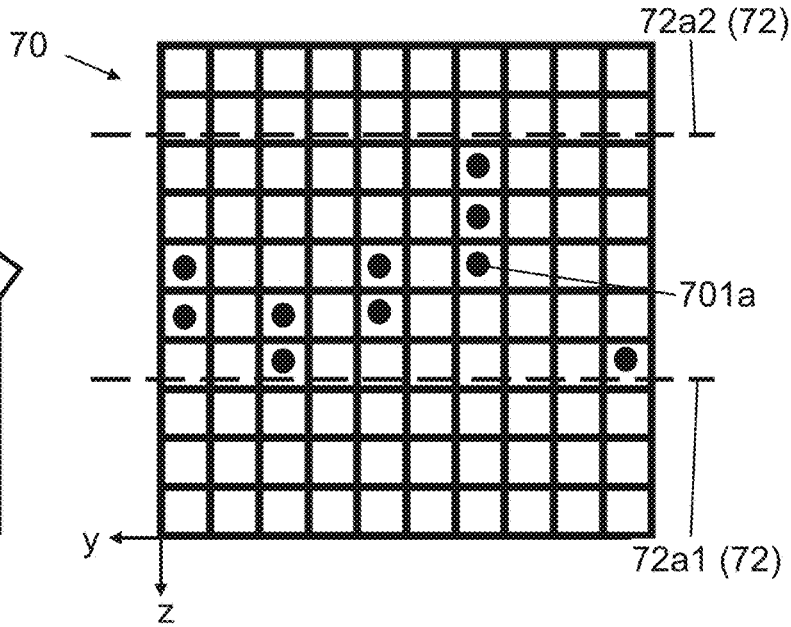
Fig. 14B
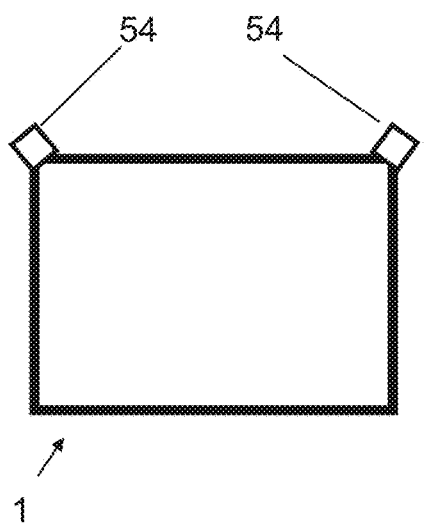 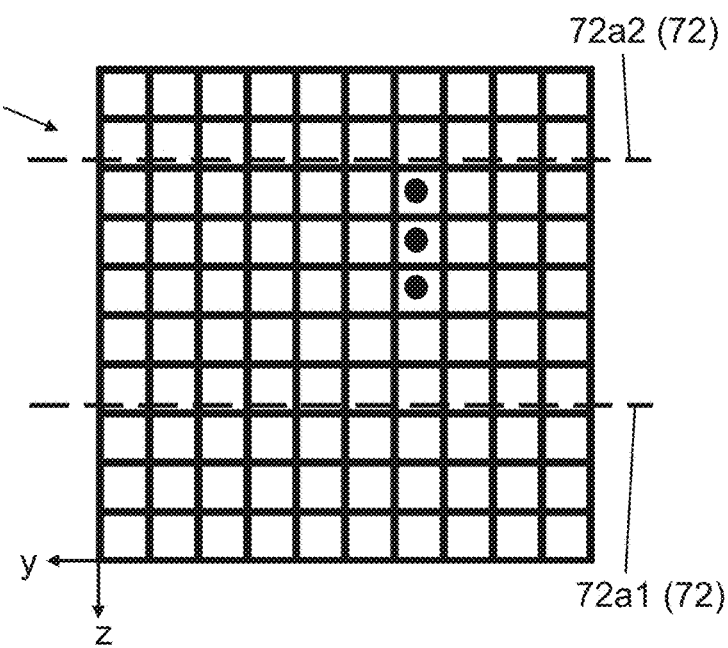

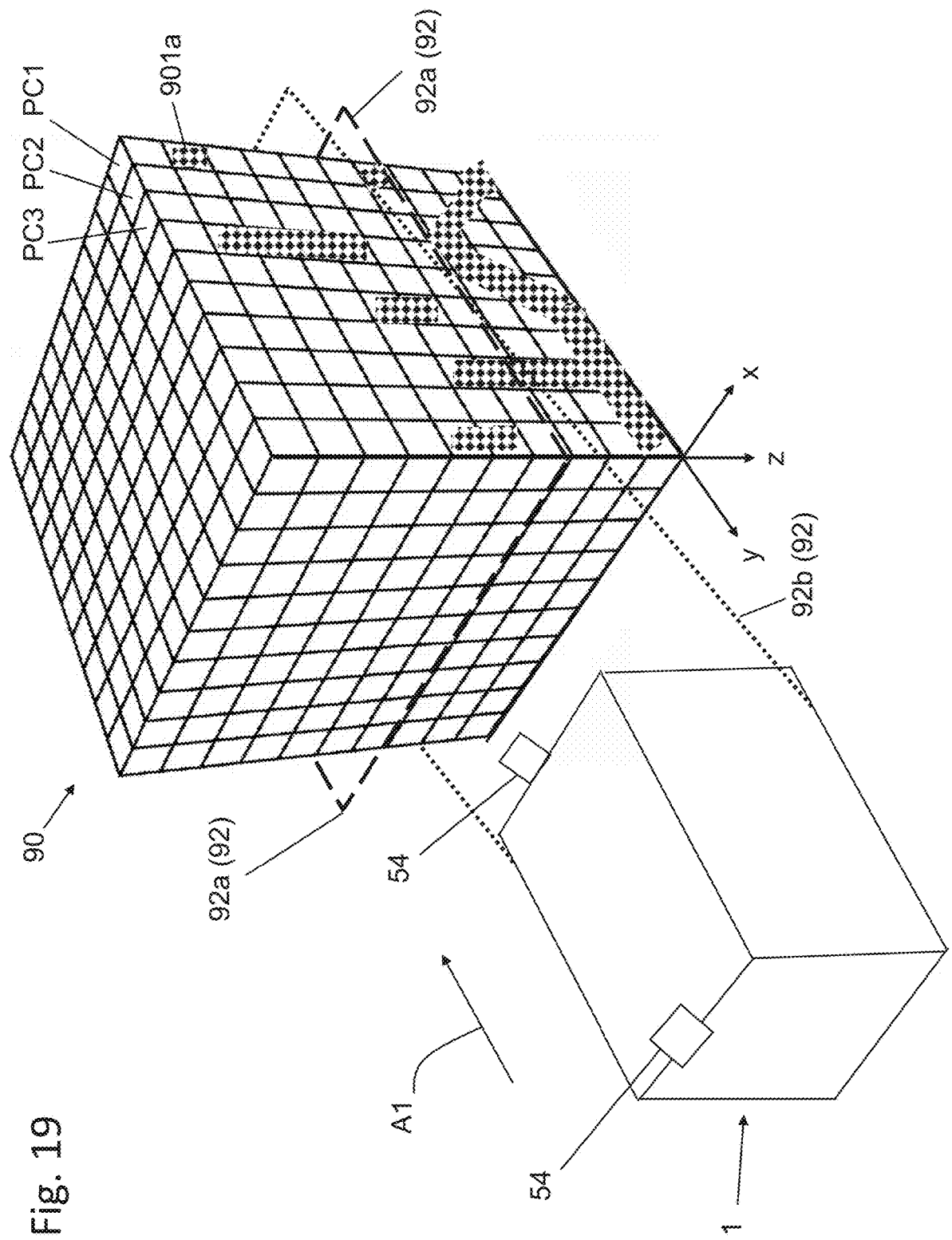

Fig. 21A
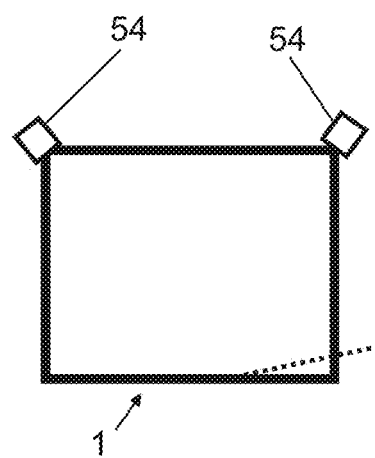
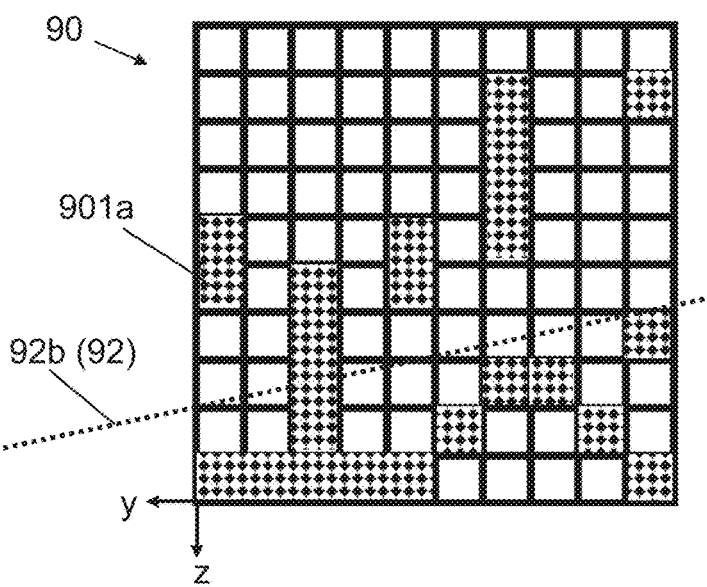
Fig. 21B
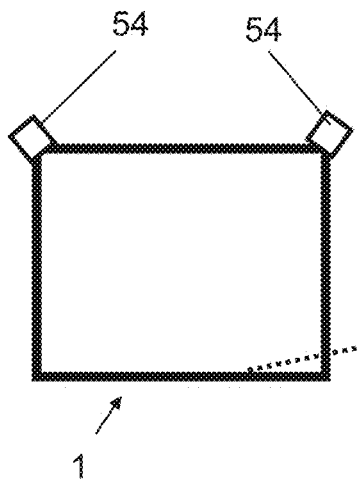
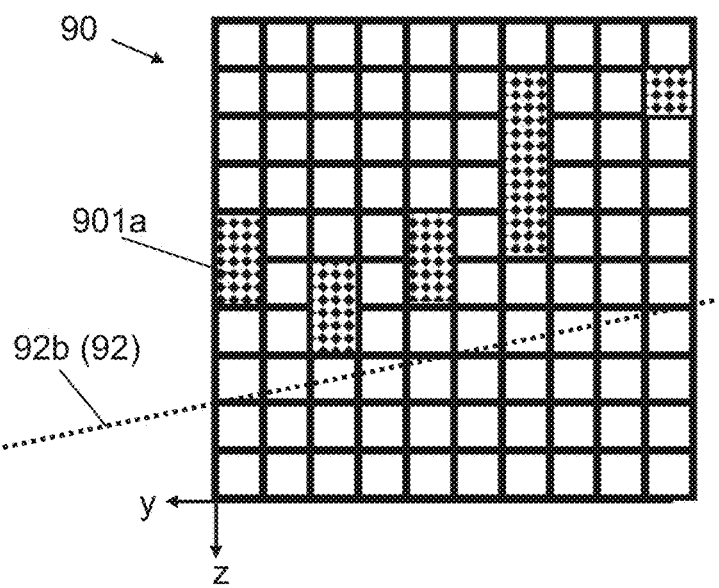

Fig. 22A
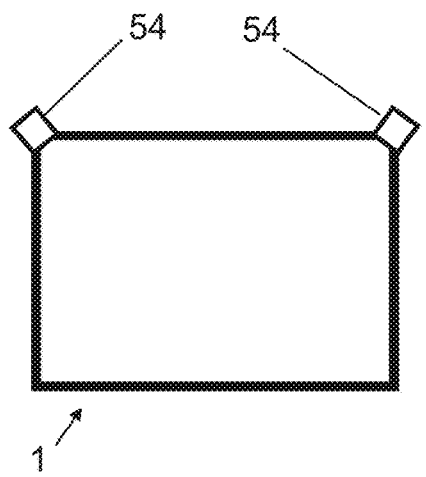
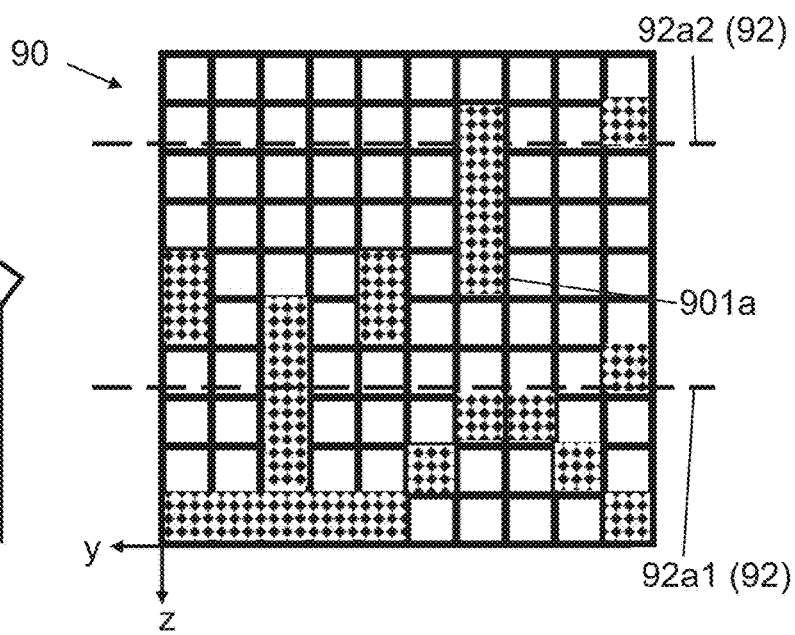
Fig. 22B
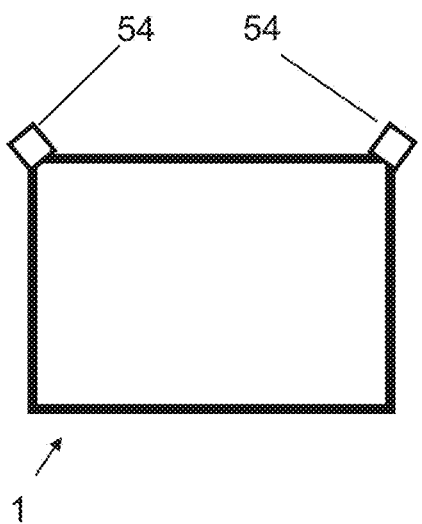
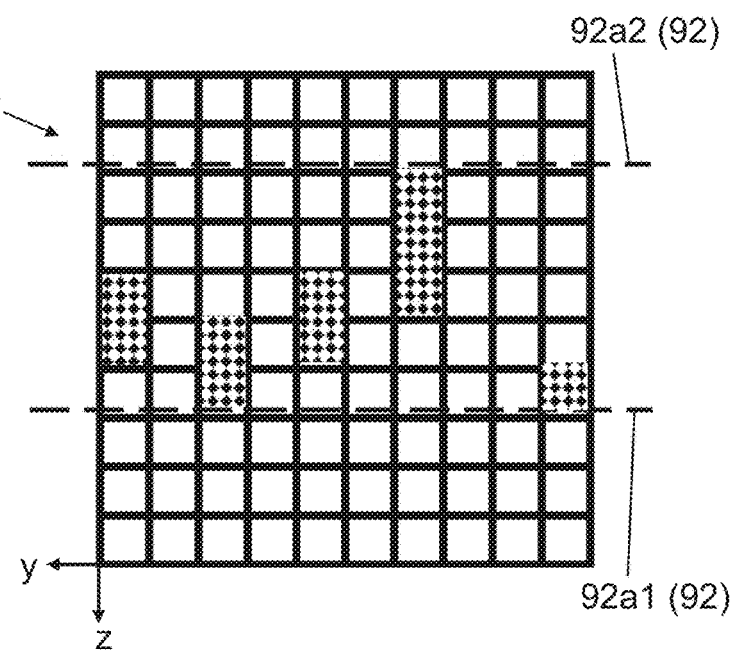

Fig. 26A
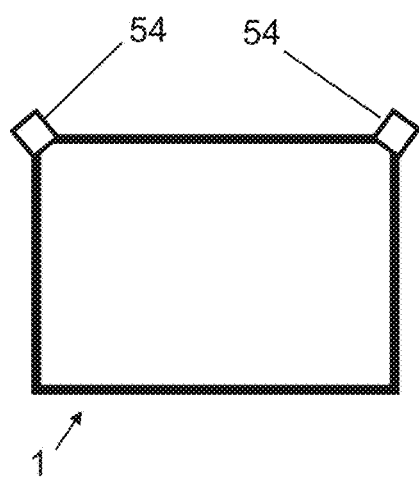
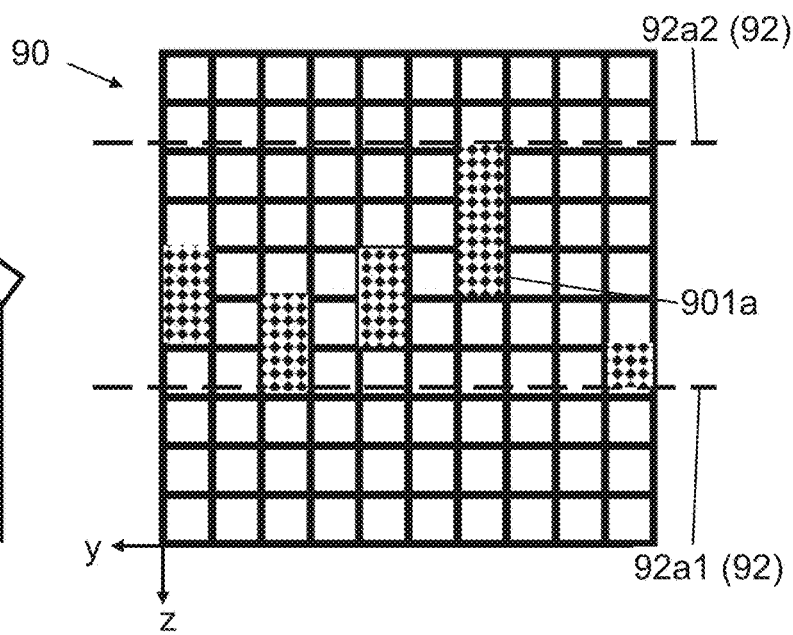
Fig. 26B
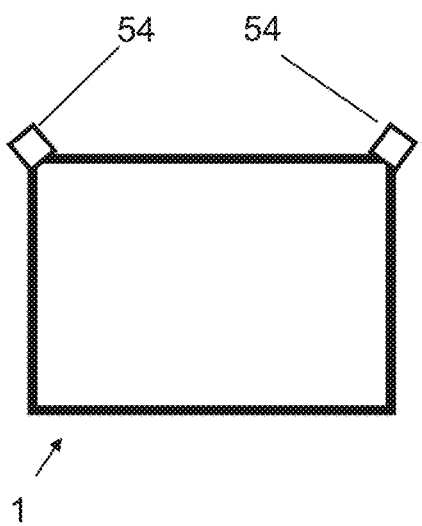
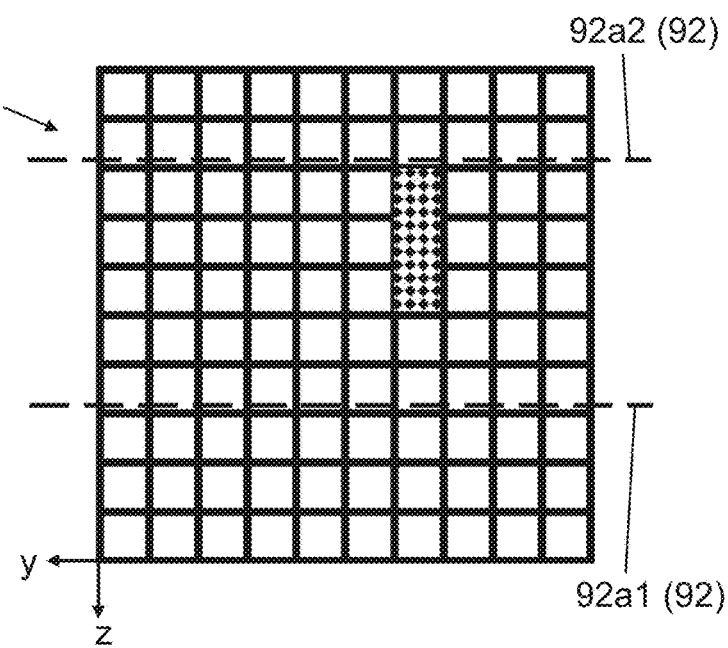

OBSTACLE DETECTION SYSTEM AND METHOD

BACKGROUND OF THE INVENTION

1. Field of the Invention

The present invention relates to a working machine and an obstacle detection system and a method. More specifically, the present invention relates to a working machine and an obstacle detection system and a method that can more accurately identify obstacles that may affect a traveling route of the working machine.

2. Description of the Related Art

Conventionally, a working machine may include an object detection system that uses a sensor to detect an object around the working machine. However, a conventional object detection system is not able to determine whether or not the object is an insignificant object that the working machine can pass over or through without consequence, or an obstacle for which the traveling route of the working machine should be changed to avoid the working machine passing over or through the obstacle and prevent damage to the working machine or the obstacle. As a result, the conventional object detection system may result in the traveling route of the working machine being changed based on an insignificant object that the working machine could have passed over or through without consequence, which can undesirably add to the time and distance the working machine travels.

For the foregoing reasons, there is a need for a working machine and an obstacle detection system and method that can more accurately identify obstacles that may affect a traveling route of the working machine.

SUMMARY OF THE INVENTION

Preferred embodiments of the present invention provide a working machine and an obstacle detection system and a method.

A method according to a preferred embodiment of the present invention includes generating a three-dimensional point cloud including a plurality of data points and filtering the three-dimensional point cloud to remove one or more data points from the plurality of data points, and the one or more data points are removed from the plurality of data points based on a position of the one or more data points.

In a method according to a preferred embodiment of the present invention, the method further includes filtering the three-dimensional point cloud to remove one or more additional data points from the plurality of data points based on the one or more additional data points corresponding to a portion of a working machine, and the one or more additional data points that correspond to the portion of the working machine are determined based on a known positional relationship between a sensor used to generate the three-dimensional point cloud and the portion of the working machine.

In a method according to a preferred embodiment of the present invention, the filtering the three-dimensional point cloud includes using a voxel grid to filter the three-dimensional point cloud to remove the one or more data points from the plurality of data points, the voxel grid includes one or more activated voxels that include at least one of the plurality of data points of the three-dimensional point cloud that corresponds to an object or a portion of an object, the filtering the three-dimensional point cloud using the voxel grid includes applying a filter to the voxel grid to remove certain activated voxels from the voxel grid by changing the certain activated voxels to inactivated voxels, and when the certain activated voxels are removed from the voxel grid, the one or more data points, which are included in the certain activated voxels, are removed from the plurality of data points of the three-dimensional point cloud.

In a method according to a preferred embodiment of the present invention, the filter applied to the voxel grid removes the certain activated voxels located above or below the filter in a vertical direction of the voxel grid, and the filter is represented by a plane that is parallel to, and located a predetermined distance from, a bottom surface of the voxel grid.

In a method according to a preferred embodiment of the present invention, the filter applied to the voxel grid removes the certain activated voxels through which the filter extends and located below the filter in a vertical direction of the voxel grid, and the filter is represented by an inclined plane that starts from a point located on or adjacent to a working machine and that increases at a predetermined slope away from the point located on or adjacent to the working machine.

In a method according to a preferred embodiment of the present invention, the filter applied to the voxel grid is applied to a particular voxel column that extends in a vertical direction of the voxel grid, and the filter removes the certain activated voxels from the particular voxel column based on a number of voxels between an activated voxel with a largest value in the vertical direction and an activated voxel with a smallest value in the vertical direction within the particular voxel column.

In a method according to a preferred embodiment of the present invention, the filter determines whether or not the number of voxels between the activated voxel with the largest value in the vertical direction and the activated voxel with the smallest value in the vertical direction is less than a predetermined threshold, and the filter removes the certain activated voxels, which include all of the activated voxels included in the particular voxel column, when the number of voxels between the activated voxel with the largest value in the vertical direction and the activated voxel with the smallest value in the vertical direction is less than the predetermined threshold.

In a method according to a preferred embodiment of the present invention, the filter removes the certain activated voxels from the particular voxel column based on whether or not there are any instances of consecutive activated voxels within the particular voxel column.

In a method according to a preferred embodiment of the present invention, the filter applied to the voxel grid is applied to a particular voxel column that extends in a vertical direction of the voxel grid, and the filter removes the certain activated voxels from the particular voxel column based on whether or not an activated voxel with a smallest value in the vertical direction within the particular voxel column is spaced away from an additional filter that was previously used to remove activated voxels located below the additional filter in the vertical direction of the voxel grid.

In a method according to a preferred embodiment of the present invention, the filter is simultaneously applied to a plurality of particular voxel columns that extend in the vertical direction of the voxel grid.

In a method according to a preferred embodiment of the present invention, the method further includes converting the three-dimensional point cloud to a two-dimensional obstacle map that includes a location of one or more obstacles, and the converting the three-dimensional point cloud to the two-dimensional obstacle map includes removing a vertical coordinate from each of the plurality of data points remaining in the three-dimensional point cloud after the one or more data points have been removed from the plurality of data points.

In a method according to a preferred embodiment of the present invention, the method further includes converting the three-dimensional point cloud to a two-dimensional obstacle map that includes a location of one or more obstacles, updating an agricultural field map to include the location of the one or more obstacles based on the two-dimensional obstacle map, and determining whether or not to update a planned traveling route of a working machine based on the updated agricultural field map.

In a method according to a preferred embodiment of the present invention, the converting the three-dimensional point cloud to the two-dimensional obstacle map includes down sampling the three-dimensional point cloud by reducing a number of data points included in the three-dimensional point cloud based on a voxel grid that was used to filter the three-dimensional point cloud.

In a method according to a preferred embodiment of the present invention, the one or more data points are removed from the plurality of data points based on a distance between a first of the one or more data points with a largest vertical position within a column that extends in a vertical direction of the three-dimensional point cloud and a second of the one or more data points with a smallest vertical position within the column that extends in the vertical direction of the three-dimensional point cloud, and the one or more data points are removed from the plurality of data points when the distance between the first of the one or more data points and the second of the one or more data points is less than a predetermined threshold.

In a method according to a preferred embodiment of the present invention, the three-dimensional point cloud is generated using one or more LiDAR sensors.

A method according to a preferred embodiment of the present invention includes generating a three-dimensional point cloud including a plurality of data points, and determining whether or not to update a planned traveling route of a working machine based on a distance between a first of the plurality of data points with a largest vertical position within a column that extends in a vertical direction of the three-dimensional point cloud and a second of the plurality of data points with a smallest vertical position within the column that extends in the vertical direction of the three-dimensional point cloud.

In a method according to a preferred embodiment of the present invention, the method includes determining not to update the planned traveling route of the working machine when the distance between the first of the plurality of data points and the second of the plurality of data points is less than a predetermined threshold.

A working machine according to a preferred embodiment of the present invention includes a sensor to generate a three-dimensional point cloud including a plurality of data points, and a controller configured or programmed to control the working machine based on the three-dimensional point cloud.

In a working machine according to a preferred embodiment of the present invention, the controller is configured or programmed to filter the three-dimensional point cloud to remove one or more data points from the plurality of data points based on a position of the one or more data points, the controller is configured or programmed to use a voxel grid to filter the three-dimensional point cloud to remove the one or more data points from the plurality of data points, the voxel grid includes one or more activated voxels that include at least one of the plurality of data points of the three-dimensional point cloud that corresponds to an object or a portion of an object, the controller is configured or programmed to apply a filter to the voxel grid to filter the three-dimensional point cloud using the voxel grid, the filter applied to the voxel grid removes certain activated voxels from the voxel grid by changing the certain activated voxels to inactivated voxels, and when the certain activated voxels are removed from the voxel grid, the one or more data points, which are included in the certain activated voxels, are removed from the plurality of data points of the three-dimensional point cloud.

In a working machine according to a preferred embodiment of the present invention, the controller is configured or programmed to apply the filter to a particular voxel column that extends in a vertical direction of the voxel grid, and the filter removes the certain activated voxels from the particular voxel column based on a number of voxels between an activated voxel with a largest value in the vertical direction and an activated voxel with a smallest value in the vertical direction within the particular voxel column.

In a working machine according to a preferred embodiment of the present invention, the controller is configured or programmed to apply the filter to a particular voxel column that extends in a vertical direction of the voxel grid, and the filter removes the certain activated voxels from the particular voxel column based on whether or not an activated voxel with a smallest value in the vertical direction within the particular voxel column is spaced away from an additional filter that was previously used to remove activated voxels located below the additional filter in the vertical direction of the voxel grid.

In a working machine according to a preferred embodiment of the present invention, the controller is configured or programmed to filter the three-dimensional point cloud to remove one or more data points from the plurality of data points based on a position of the one or more data points, convert the three-dimensional point cloud to a two-dimensional obstacle map that includes a location of one or more obstacles, update an agricultural field map to include the location of the one or more obstacles based on the two-dimensional obstacle map, and determine whether or not to update a planned traveling route of the working machine based on the updated agricultural field map.

In a working machine according to a preferred embodiment of the present invention, the controller is configured or programmed to filter the three-dimensional point cloud to remove one or more data points from the plurality of data points based on a position of the one or more data points, remove the one or more data points from the plurality of data points based on a distance between a first of the one or more data points with a largest vertical position within a column that extends in a vertical direction of the three-dimensional point cloud and a second of the one or more data points with a smallest vertical position within the column that extends in the vertical direction of the three-dimensional point cloud, and remove the one or more data points from the plurality of data points when the distance between the first of the one or more data points and the second of the one or more data points is less than a predetermined threshold.

In a working machine according to a preferred embodiment of the present invention, the controller is configured or programmed to determine whether or not to update a planned traveling route of the working machine based on a distance between a first of the plurality of data points with a largest vertical position within a column that extends in a vertical direction of the three-dimensional point cloud and a second of the plurality of data points with a smallest vertical position within the column that extends in the vertical direction of the three-dimensional point cloud.

The above and other features, elements, steps, configurations, characteristics, and advantages of the present invention will become more apparent from the following detailed description of preferred embodiments of the present invention with reference to the attached drawings.

BRIEF DESCRIPTION OF THE DRAWINGS

FIG. 9A is a side view of an example of a voxel grid according to a preferred embodiment of the present invention.

FIG. 9B is a side view of an example of a voxel grid according to a preferred embodiment of the present invention.

FIG. 10A is a side view of an example of a voxel grid according to a preferred embodiment of the present invention.

FIG. 10B is a side view of an example of a voxel grid according to a preferred embodiment of the present invention.

FIG. 14A is a side view of an example of a voxel grid according to a preferred embodiment of the present invention.

FIG. 14B is a side view of an example of a voxel grid according to a preferred embodiment of the present invention.

FIG. 19 is a perspective view of an example of a three-dimensional point cloud according to a preferred embodiment of the present invention.

FIG. 21A is a side view of an example of a three-dimensional point cloud according to a preferred embodiment of the present invention.

FIG. 21B is a side view of an example of a three-dimensional point cloud according to a preferred embodiment of the present invention.

FIG. 22A is a side view of an example of a three-dimensional point cloud according to a preferred embodiment of the present invention.

FIG. 22B is a side view of an example of a three-dimensional point cloud according to a preferred embodiment of the present invention.

FIG. 26A is a side view of an example of a three-dimensional point cloud according to a preferred embodiment of the present invention.

FIG. 26B is a side view of an example of a three-dimensional point cloud according to a preferred embodiment of the present invention.

DETAILED DESCRIPTION OF PREFERRED EMBODIMENTS

Figure 1A:
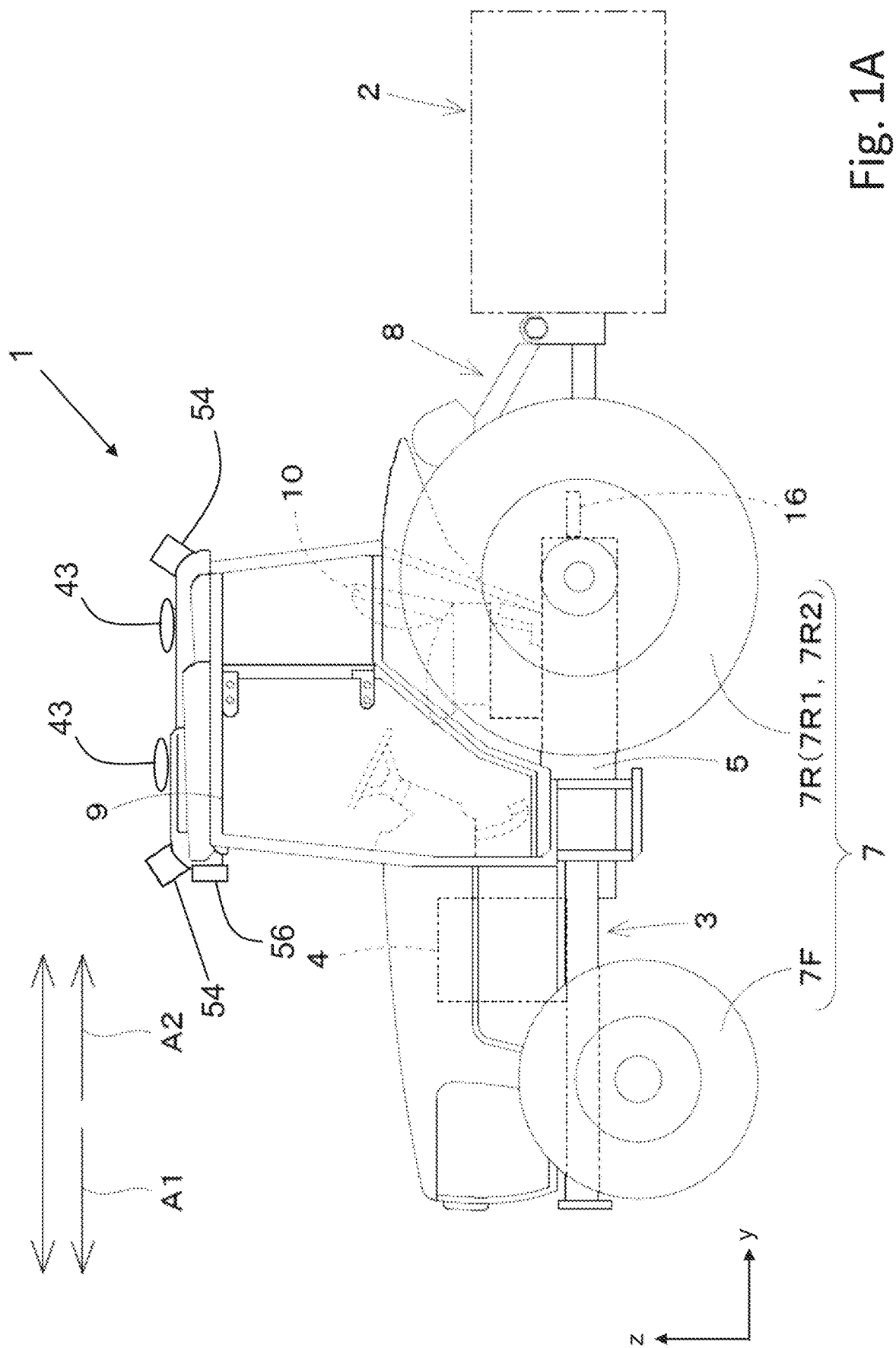
FIG. 1A is a side view of a working machine according to a preferred embodiment of the present invention.

FIG. 1A illustrates a tractor as an example of a working machine 1 according to a preferred embodiment. Although a tractor will be described as an example of the working machine 1 in the present preferred embodiment, the working machine 1 is not limited to a tractor and may be an agricultural machine, such as a rice transplanter, that performs agricultural work, or a construction machine, such as a backhoe, that performs construction work. In the description of the present preferred embodiment of the present invention, the forward direction (the arrow A1 direction in FIG. 1A) of an operator (driver) sitting on an operator's seat 10 of the working machine 1 is referred to as the front, the rearward direction (the arrow A2 direction in FIG. 1A) of the operator is referred to as the rear, the leftward direction of the operator is referred to as the left, and the rightward direction of the operator is referred to as the right. In the description, the horizontal direction, which is a direction orthogonal to the front-rear direction of the working machine 1, is referred to as the width direction.

Figure 3:
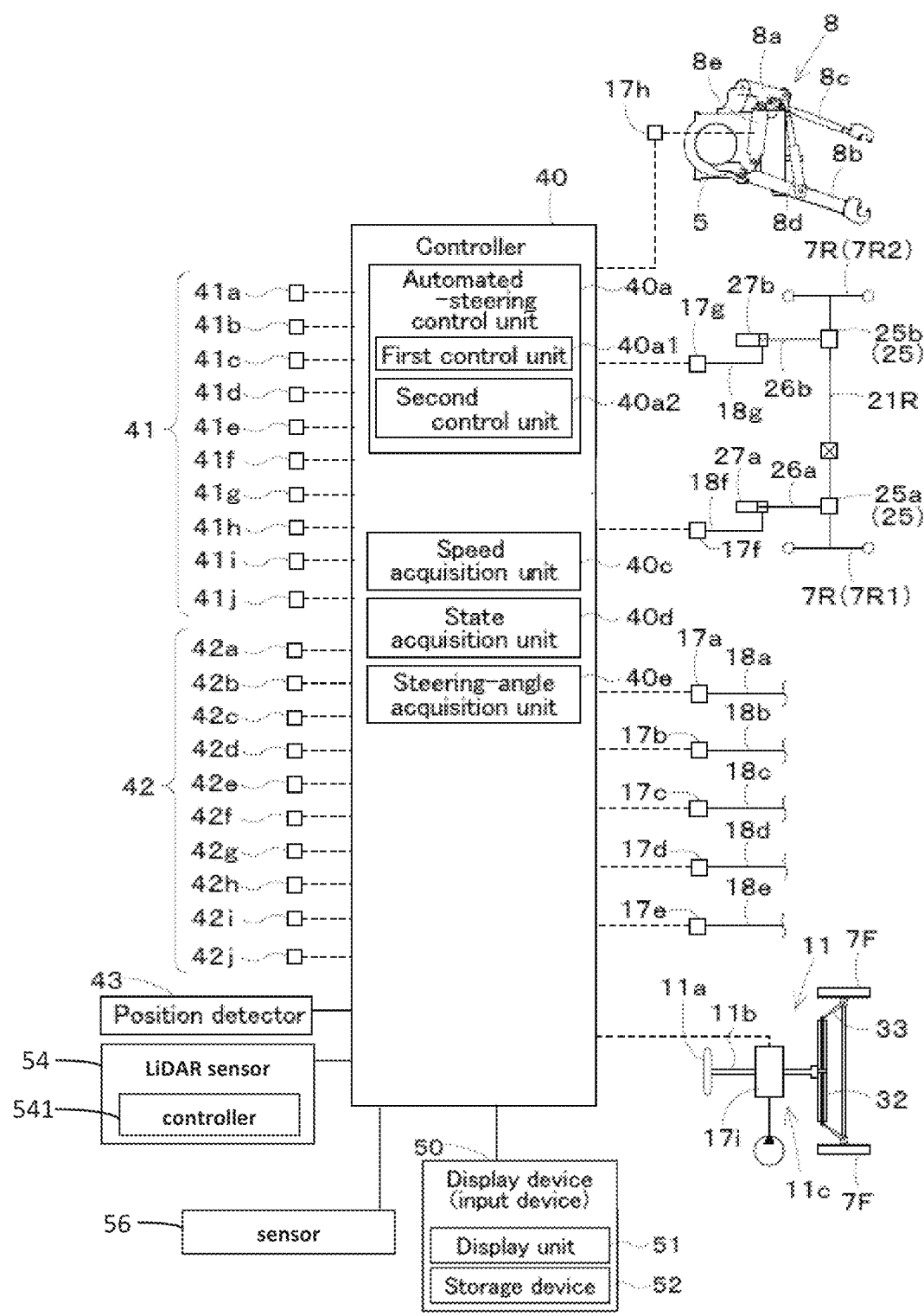
FIG. 3 is a control block diagram of a working machine according to a preferred embodiment of the present invention.

As illustrated in FIGS. 1 and 3, the working machine 1 includes a traveling vehicle (machine body) 3 including a traveling device 7, a prime mover 4, a transmission 5, and a steering device 11. The traveling device 7 is a device that includes a front wheel 7F and a rear wheel 7R. The rear wheel 7R includes a first wheel 7R1 provided on one side (left side) of the machine body 3 in a machine-body width direction, and a second wheel 7R2 provided on the other side (right side) of the machine body 3 in the machine-body width direction. The second wheel 7R2 is separated from the first wheel 7R1 in the machine-body width direction. The front wheel 7F may be of a tire type or a crawler type. The rear wheel 7R also may be of a tire type or a crawler type. The prime mover 4 includes an internal combustion engine, such as a gasoline engine or a diesel engine, an electric motor, or the like. In this preferred embodiment, the prime mover 4 is a diesel engine, for example. The transmission 5 can switch the propulsive force of the traveling device 7 by gear shifting and is able to switch between forward traveling and reverse traveling of the traveling device 7. The machine body 3 includes a cabin 9, and the operator's seat 10 is disposed in the cabin 9.

As illustrated in FIG. 1A, a rear portion of the machine body 3 is provided with a lifting apparatus 8. A working device 2 is attachable to and detachable from the lifting apparatus 8. The lifting apparatus 8 can raise and lower the working device 2 mounted thereon. The working device 2 is, for example, a cultivator to cultivate, a fertilizer spreader to spread a fertilizer, an agricultural chemical spreader to spread an agricultural chemical, a harvester to harvest, a mower to mow grass or the like, a tedder to ted grass or the like, a rake to rake grass or the like, or a baler to bale grass or the like.

As illustrated in FIG. 3, the working machine 1 includes a display device 50. The display device 50 is a device that includes a display unit 51 including a liquid crystal panel, a touch panel, or the other panel, and a storage device 52. The display unit 51 can display various information on the working machine 1, in addition to information to assist traveling of the working machine 1. For example, the display unit 51 can display an agricultural field map M and an obstacle map OM discussed in more detail below. The storage device 52 is a nonvolatile memory or the like and stores information and the like to be displayed on the display unit 51. The display device 50 is connected to a device included in the working machine 1 in a wired or wireless manner such that communication is enabled.

Figure 2:
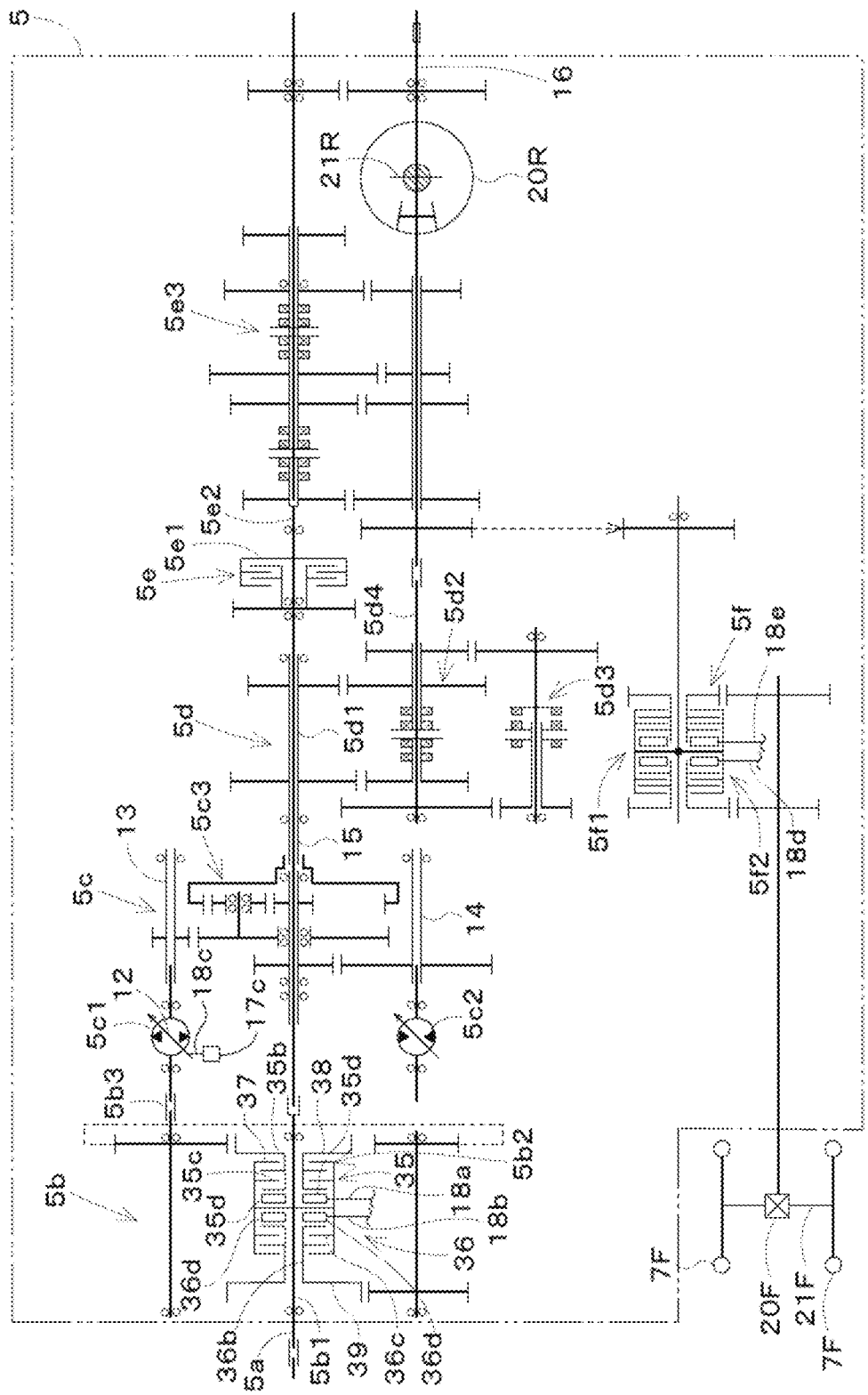
FIG. 2 is a configuration diagram of a transmission included in a working machine according to a preferred embodiment of the present invention.

As illustrated in FIG. 2, the transmission 5 includes a main shaft (propeller shaft) 5a, a shuttle unit 5b, a main transmission unit 5c, a sub-transmission unit 5d, a PTO power transmission unit 5e, and a front transmission unit 5f. The propeller shaft 5a is rotatably supported by a housing case of the transmission 5, and power from a crankshaft of the prime mover 4 is transmitted to the propeller shaft 5a.

As illustrated in FIG. 2, the shuttle unit 5b has a shuttle shaft 5b1 and a forward-reverse switching unit 5b2. Power from the propeller shaft 5a is transmitted to the shuttle shaft 5b1. The forward-reverse switching unit 5b2 includes, for example, a hydraulic clutch or the like. The hydraulic clutch is turned on and off to switch the rotation direction of the shuttle shaft 5b1, in other words, forward traveling and reverse traveling of the working machine 1. Specifically, the forward-reverse switching unit 5b2 includes a forward clutch unit 35 and a reverse clutch unit 36. The forward clutch unit 35 and the reverse clutch unit 36 include a housing 37 that rotates integrally with the propeller shaft 5a.

As illustrated in FIG. 2, the forward clutch unit 35 includes a cylindrical shaft 35b, a friction plate 35c disposed between the housing 37 and the cylindrical shaft 35b, and a press member 35d. The press member 35d is urged by an urging member such as a spring (not illustrated) in a direction away from the friction plate 35c.

As illustrated in FIG. 2, a first fluid passage 18a through which a hydraulic fluid is supplied and discharged is connected to the inside of the housing 37 on the forward clutch unit 35 side. As illustrated in FIG. 3, the first fluid passage 18a is connected to a first control valve 17a. When the opening degree of the first control valve 17a is changed and the hydraulic fluid is supplied to the inside of the housing 37 through the first fluid passage 18a, the press member 35d moves against the urging force of the spring to the pressing side (connection side), thereby causing the friction plate 35c to be in pressure contact with any portion on the housing 37 side and causing the forward clutch unit 35 to be in a connected state. The power of the propeller shaft 5a is transmitted to a gear 38 that rotates integrally with the cylindrical shaft 35*b*. When the hydraulic fluid is discharged from the inside of the housing 37 into the first fluid passage 18*a*, the press member 35*d* moves due to the urging force of the spring to the disconnection side, thereby causing the friction plate 35*c* to be separated from any part on the housing 37 side and causing the forward clutch unit 35 to be in a disconnected state. The power of the propeller shaft 5*a* is not transmitted to the gear 38. The gear (output gear) 38 on the output side of the forward clutch unit 35 engages with an output shaft 5*b*3. When the forward clutch unit 35 is in the connected state, a driving force is transmitted to the output shaft 5*b*3.

As illustrated in FIG. 2, the reverse clutch unit 36 has a cylindrical shaft 36*b*, a friction plate 36*c* disposed between the housing 37 and the cylindrical shaft 36*b*, and a press member 36*d*. The press member 36*d* is urged by an urging member such as a spring (not illustrated) in a direction away from the friction plate 36*c*.

As illustrated in FIG. 2, a second fluid passage 18*b* through which the hydraulic fluid is supplied and discharged is connected to the inside of the housing 37 on the reverse clutch unit 36 side. As illustrated in FIG. 3, the second fluid passage 18*b* is connected to a second control valve 17*b*. When the opening degree of the second control valve 17*b* is changed and the hydraulic fluid is supplied to the inside of the housing 37 through the second fluid passage 18*b*, the press member 36*d* moves against the urging force of the spring to the pressing side (connection side), thereby causing the friction plate 36*c* to be in pressure contact with the side of the housing 37 and causing the reverse clutch unit 36 to be in a connected state. The power of the propeller shaft 5*a* is transmitted to a gear 39 that rotates integrally with the cylindrical shaft 36*b*. When the hydraulic fluid is discharged from the side of the housing 37 into the second fluid passage 18*b*, the press member 36*d* moves due to the urging force of the spring to the disconnection side, thereby causing the friction plate 36*c* to be separated from any portion on the housing 37 side and causing the reverse clutch unit 36 to be in a disconnected state. The power of the propeller shaft 5*a* is not transmitted to the gear 39. The gear (output gear) 39 on the output side of the reverse clutch unit 36 engages with the output shaft 5*b*3. When the reverse clutch unit 36 is in the connected state, a driving force is transmitted to the output shaft 5*b*3.

The main transmission unit 5*c* is a continuously variable transmission mechanism that changes input power continuously. As illustrated in FIG. 2, the continuously variable transmission mechanism includes a hydraulic pump 5*c*1, a hydraulic motor 5*c*2, and a planetary gear mechanism 5*c*3. The hydraulic pump 5*c*1 is rotated by the power from the output shaft 5*b*3 of the shuttle unit 5*b*. The hydraulic pump 5*c*1 is, for example, a variable displacement pump including a swash plate 12, and can change the flow rate of the hydraulic fluid output from the hydraulic pump 5*c*1 by changing the angle (swash plate angle) of the swash plate 12. The hydraulic motor 5*c*2 is a motor that is rotated by the hydraulic fluid output from the hydraulic pump 5*c*1 via a fluid passage such as a pipe. The rotation speed of the hydraulic motor 5*c*2 can be changed by changing the swash plate angle of the hydraulic pump 5*c*1 or changing the power to be input to the hydraulic pump 5*c*1.

As illustrated in FIG. 2, the planetary gear mechanism 5*c*3 includes a plurality of gears (cogwheels) and power transmission shafts including input shafts, an output shaft, and the like. The planetary gear mechanism 5*c*3 includes an input shaft 13 to which the power of the hydraulic pump 5*c*1 is input, an input shaft 14 to which the power of the hydraulic motor 5*c*2 is input, and an output shaft 15 that outputs power. The planetary gear mechanism 5*c*3 combines the power of the hydraulic pump 5*c*1 and the power of the hydraulic motor 5*c*2 and transmits the combined power to the output shaft 15.

Therefore, with the main transmission unit 5*c*, it is possible to change the power that is to be output to the sub-transmission unit 5*d* by changing the swash plate angle of the swash plate 12 of the hydraulic pump 5*c*1, the rotation speed of the prime mover 4, or the like.

In the present preferred embodiment, the angle of the swash plate 12 can be changed by the hydraulic fluid supplied from a third control valve 17*c*. The swash plate 12 and the third control valve 17*c* are connected by, for example, a third fluid passage 18*c* through which the hydraulic fluid is supplied and discharged. The third control valve 17*c* is a two-position switching valve with a solenoid valve and can control the angle of the swash plate 12, in other words, change the power that is to be output to the sub-transmission unit 5*d* by energizing or deenergizing a solenoid of the solenoid valve to thereby control the hydraulic fluid that flows in the third fluid passage 18*c*. The main transmission unit 5*c*, which includes a continuously variable transmission mechanism, may be a multispeed transmission mechanism that performs gear shifting by using gears.

The sub-transmission unit 5*d* is a transmission mechanism including multispeed gears (cogwheels) that perform gear shifting of power. The sub-transmission unit 5*d* changes the power input from the output shaft 15 of the planetary gear mechanism 5*c*3 to the sub-transmission unit 5*d* by changing the connection (engagement) of the plurality of gears, as appropriate, and outputs the power (performs gear shifting). As illustrated in FIG. 2, the sub-transmission unit 5*d* includes an input shaft 5*d*1, a first gearshift clutch 5*d*2, a second gearshift clutch 5*d*3, and an output shaft 5*d*4. The input shaft 5*d*1 is a shaft to which the power of the output shaft 15 of the planetary gear mechanism 5*c*3 is input. The input shaft 5*d*1 inputs the input power to the first gearshift clutch 5*d*2 and the second gearshift clutch 5*d*3 via a gear and the like. The input power is changed by switching between connection and disconnection of each of the first gearshift clutch 5*d*2 and the second gearshift clutch 5*d*3 and is output to the output shaft 5*d*4. The power output to the output shaft 5*d*4 is transmitted to a rear-wheel differential 20R. The rear-wheel differential 20R rotatably supports a rear axle 21R on which the rear wheel 7R is mounted.

As illustrated in FIG. 2, the PTO power transmission unit 5*e* includes a PTO clutch 5*e*1, a PTO propeller shaft 5*e*2, and a PTO gearshift unit 5*e*3. The PTO clutch 5*e*1 includes, for example, a hydraulic clutch or the like and is switched between a state in which the power of the propeller shaft 5*a* is transmitted to the PTO propeller shaft 5*e*2 and a state in which the power of the propeller shaft 5*a* is not transmitted to the PTO propeller shaft 5*e*2 by connection and disconnection of the hydraulic clutch. The PTO gearshift unit 5*e*3 includes a gearshift clutch, a plurality of gears, and the like and changes and outputs the power (rotation speed) input to the PTO gearshift unit 5*e*3 from the PTO propeller shaft 5*e*2. The power from the PTO gearshift unit 5*e*3 is transmitted to a PTO shaft 16 via a gear and the like.

As illustrated in FIG. 2, the front transmission unit 5*f* includes a first front gearshift clutch 5*f*1 and a second front gearshift clutch 5*f*2. The power from the sub-transmission unit 5*d* can be transmitted to the first front gearshift clutch 5*f*1 and the second front gearshift clutch 5*f*2. For example, the power of the output shaft 5*d*4 is transmitted to the first front gearshift clutch 5*f*1 and the second front gearshift clutch 5f2 via a gear and a power transmission shaft. The power from the first front gearshift clutch 5f1 and the second front gearshift clutch 5f2 can be transmitted to a front axle 21F via a front power transmission shaft 22. Specifically, the front power transmission shaft 22 is connected to a front-wheel differential 20F. The front-wheel differential 20F rotatably supports the front axle 21F on which the front wheel 7F is mounted.

As illustrated in FIG. 2, the first front gearshift clutch 5f1 and the second front gearshift clutch 5f2 each includes a hydraulic clutch and the like. A fourth fluid passage 18d is connected to the first front gearshift clutch 5f1, and the fluid passage is connected to a fourth control valve 17d to which the hydraulic fluid output from the hydraulic pump is supplied, as illustrated in FIG. 3. The first front gearshift clutch 5f1 is switched between a connected state and a disconnected state in accordance with the opening degree of the fourth control valve 17d. As illustrated in FIG. 2, a fifth fluid passage 18e is connected to the second front gearshift clutch 5f2, and is connected to a fifth control valve 17e, as illustrated in FIG. 3. The second front gearshift clutch 5f2 is switched between a connected state and a disconnected state in accordance with the opening degree of the fifth control valve 17e. The fourth control valve 17d and the fifth control valve 17e are each, for example, a two-position switching valve with a solenoid valve and are switched to the connected state or the disconnected state by energizing or deenergizing of a solenoid of the solenoid valve.

When the first front gearshift clutch 5f1 is in the disconnected state and the second front gearshift clutch 5f2 is in the connected state, the power of the sub-transmission unit 5d is transmitted to the front wheel 7F through the second front gearshift clutch 5f2. Consequently, four wheel drive (4WD) in which the front wheel 7F and the rear wheel 7R are driven by power is performed, and the rotation speeds of the front wheel 7F and the rear wheel 7R become equal or substantially equal to each other (4WD equal speed state, equal speed drive). When the first front gearshift clutch 5f1 is in the connected state and the second front gearshift clutch 5f2 is in the disconnected state, four-wheel drive is performed, and the rotation speed of the front wheel 7F becomes faster than the rotation speed of the rear wheel 7R (4WD increased speed state, increased speed drive). When the first front gearshift clutch 5f1 and the second front gearshift clutch 5f2 are in the connected state, the power of the sub-transmission unit 5d is not transmitted to the front wheel 7F. Thus, two wheel drive (2WD) in which the rear wheel 7R is driven by power is performed. The configuration of the transmission 5 is not limited to the aforementioned configuration as long as the transmission 5 is able to switch forward traveling, reverse traveling, and the like of the traveling device 7.

As illustrated in FIG. 3, the working machine 1 includes a braking device 25. The braking device 25 includes a left braking device 25a and a right braking device 25b. Each of the left braking device 25a and the right braking device 25b is the braking device 25 of a disc type and can be switched between a brake state in which braking is performed and a release state in which braking is released. The left braking device 25a is provided on the left side of the rear axle 21R and performs braking of the rear wheel 7R (first wheel 7R1) at the left. The right braking device 25b is provided on the right side of the rear axle 21R and performs braking of the rear wheel 7R (second wheel 7R2) at the right.

In the vicinity of the operator's seat 10, for example, a left brake pedal (not illustrated) and a right brake pedal (not illustrated) are provided. In response to the left brake pedal being operated (stepped) by an operator that operates the working machine 1, a left coupling member 26a coupled to the left brake pedal moves in a braking direction and can cause the left braking device 25a to enter the brake state. In response to the right brake pedal being operated (stepped) by the operator, a right coupling member 26b coupled to the right brake pedal moves in the braking direction and can cause the right braking device 25b to enter the brake state.

A left hydraulic actuation unit 27a that is actuated by the hydraulic fluid is coupled to the left coupling member 26a. A sixth control valve 17f is connected to the left hydraulic actuation unit 27a via a sixth fluid passage 18f. The left coupling member 26a can be moved in the braking direction by actuating the left hydraulic actuation unit 27a by the sixth control valve 17f. A right hydraulic actuation unit 27b that is actuated by the hydraulic fluid is coupled to the right coupling member 26b. A seventh control valve 17g is connected to the right hydraulic actuation unit 27b via a seventh fluid passage 18g. The right coupling member 26b can be moved in the braking direction by actuating the right hydraulic actuation unit 27b by the seventh control valve 17g.

As described above, the left braking device 25a and the right braking device 25b can cause the rear wheel 7R (first wheel 7R1) at the left and the rear wheel 7R (second wheel 7R2) at the right, respectively, to be in the brake state independently not only by the operation of the left brake pedal and the right brake pedal but also by actuation of the left hydraulic actuation unit 27a and the right hydraulic actuation unit 27b. In the present preferred embodiment, the left braking device 25a is provided on the left side of the rear axle 21R, the right braking device 25b is provided on the right side of the rear axle 21R, and the braking device 25 performs braking of the rear wheel 7R of the wheels 7F and 7R. However, instead of or in addition to the left braking device 25a and the right braking device 25b, the braking device 25 may be provided on each of the left side and the right side of the front axle 21F and perform braking of each of the front wheels 7F.

As illustrated in FIG. 3, the lifting apparatus 8 includes lift arms 8a, lower links 8b, a top link 8c, a lift rod 8d, and a lift cylinder 8e. A front end portion of each of the lift arms 8a is supported to be swingable upward or downward at a rear upper portion of a case (transmission case) that houses the transmission 5. The lift arm 8a is swung (raised and lowered) by the drive of the lift cylinder 8e. The lift cylinder 8e includes a hydraulic cylinder. The lift cylinder 8e is connected to the hydraulic pump via an eighth control valve 17h. The eighth control valve 17h is a solenoid valve or the like and extends and contracts the lift cylinder 8e.

As illustrated in FIG. 3, a front end portion of each of the lower links 8b is supported to be swingable upward or downward at a rear lower portion of the transmission 5. A front end portion of the top link 8c is supported above the lower links 8b to be swingable upward or downward at a rear portion of the transmission 5. The lift rod 8d couples the lift arm 8a and the lower link 8b to each other. The working device 2 is coupled to a rear portion of the lower link 8b and a rear portion of the top link 8c. When the lift cylinder 8e is driven (extended and contracted), the lift arms 8a are raised or lowered, and the lower links 8b coupled to the lift arms 8a via the lift rods 8d are raised or lowered. Consequently, the working device 2 is swung (raised or lowered) upward or downward with a front portion of the lower links 8b as the fulcrum.

As illustrated in FIG. 3, the steering device (steering mechanism) 11 is able to change the orientation of the machine body 3 by changing the steering angle of the traveling device 7. The steering device 11 includes a steering handle (steering wheel) 11a, a rotary shaft (steering shaft) 11b that rotates along with the rotation of the steering handle 11a, and an assist mechanism (power steering mechanism) 11c that assists steering of the steering handle 11a. The steering handle 11a operates steering of the machine body 3 and is manually operated by an operator. The assist mechanism 11c includes a ninth control valve 17i and a steering cylinder 32. The ninth control valve 17i is, for example, a three-position switching valve that can be switched by a move of a spool or the like. The ninth control valve 17i can be switched also by steering of the rotary shaft 11b. The steering cylinder 32 is connected to an arm (knuckle arm) 33 that changes the orientation of the front wheel 7F. Therefore, when the steering handle 11a is operated, the switch position and the opening degree of the ninth control valve 17i are switched in response to the steering handle 11a, the steering cylinder 32 is extended or contracted leftward or rightward in accordance with the switch position and the opening degree of the ninth control valve 17i, and it is thereby possible to change the steering direction of the front wheel 7F. The steering device 11 described above is an example and is not limited to having the configuration described above.

As illustrated in FIG. 3, the working machine 1 includes a controller 40. The controller 40 is a device that is configured or programmed to perform various control operations of the working machine 1. In a preferred embodiment, a plurality of detectors 41 are connected to the controller 40. The plurality of detectors 41 are detectors to detect states of the working machine 1 and include, for example, a water temperature sensor 41a to detect the temperature of water, a fuel sensor 41b to detect the remaining amount of fuel, a prime mover rotation sensor (rotation sensor) 41c to detect the rotation speed of the prime mover 4, an accelerator pedal sensor 41d to detect the operation amount of an accelerator 42f, a steering angle sensor 41e to detect the steering angle of the steering device 11, an angle sensor 41f to detect the angle of the lift arm 8a, a tilt detection sensor 41g to detect the tilt of the machine body 3 in the width direction (the right direction or the left direction), a rotation speed sensor 41h to detect the rotation speeds of the wheels 7F and 7R, a PTO rotation sensor (rotation sensor) 41i to detect the rotation speed of the PTO shaft 16, a battery sensor 41j to detect the voltage of a storage battery such as a battery, and the like. The rotation speed sensor 41h can detect the rotation speeds of the wheels 7F and 7R based on, for example, the rotation speed of the front axle 21F and the rotation speed of the rear axle 21R. The rotation speed sensor 41h can also detect the rotation direction of any of the front axle 21F, the rear axle 21R, the front wheel 7F, or the rear wheel 7R and can also detect whether the working machine 1 (machine body 3) performs forward traveling or reverse traveling. The detectors 41 described above are examples and are not limited to the sensors described above.

In a preferred embodiment, a plurality of operation members 42 are connected to the controller 40. The plurality of operation members 42 include a forward-reverse switching lever (shuttle lever) 42a to switch between forward traveling and reverse traveling of the machine body 3, an ignition switch 42b to perform starting and the like of the prime mover 4, a PTO gear shift lever 42c to set the rotation speed of the PTO shaft 16, a gearshift switching switch 42d to switch between automatic gearshift and manual gearshift, a gear shift lever 42e to manually switch gear positions (gear shift levels) of the transmission 5, the accelerator 42f to increase and decrease vehicle speed, a raising/lowering switch 42g to operate raising and lowering of the lifting apparatus 8, an upper-limit setting dial 42h to set the upper limit of the lifting apparatus 8, a vehicle speed lever 42i to set vehicle speed, a switching tool 42j to perform switching operation of the equal speed drive, the increased speed drive, and the 2WD of the transmission 5, and the like. The operation members 42 described above are examples and are not limited to the operation members 42 described above.

In a preferred embodiment of the present invention, the working machine 1 can include one or more position detectors 43, one or more light detection and ranging (LiDAR) sensors 54, and one or more other sensors 56 such as one or more of weather sensors, cameras, and the like. In a preferred embodiment, the one or more position detectors 43, the one or more LiDAR sensors 54, and one or more other sensors 56 are connected to the controller 40. The one or more position detectors 43 can detect a position of the machine body 3 (a machine body position W1) including measured position information such as latitude and longitude via a satellite positioning system (positioning satellite) such as D-GPS, GPS, GLONASS, Hokuto, Galileo, Michibiki, or the like. In other words, the one or more position detectors 43 receive a satellite signal (the position of a positioning satellite, transmission time, correction information, and the like) transmitted from a positioning satellite and detects the position (for example, the latitude and the longitude) of the working machine 1 based on the satellite signal.

As illustrated in FIG. 1A, the one or more position detectors 43, the one or more LiDAR sensors 54, and one or more other sensors 56 can be provided on an upper portion (roof) of the cabin 9 covering the operator's seat 10 of the working machine 1. Power and/or data cables for the one or more position detectors 43, the one or more LiDAR sensors 54, and the one or more other sensors 56 can be routed through an interior of the roof. The roof can be attached to, or integrated with, support pillars of the cabin 9, as shown in FIG. 1A, for example. A structure including the roof and the support pillars can define a roll-over protection system (ROPS) for the working machine 1. As shown in FIG. 1A, the one or more LiDAR sensors 54 can be provided on the upper portion (roof) of the cabin 9. The one or more LiDAR sensors 54 can be inclined with respect to the roof. Preferably, for example, the LiDAR sensors 54 are adjustable and can each include an adjustable mounting base. Accordingly, the LiDAR sensors 54 can be adjusted to optimize a LiDAR angle for any particular implementation or use of the roof. For example, the LiDAR sensors 54 can be set to an angle of, for example, about 40 degrees with respect to a surface of the roof, and/or can have an ultra-wide field-of-view. The mounting position and the configuration of the one or more position detectors 43, the one or more LiDAR sensors 54, and the one or more other sensors 56 are not limited to the aforementioned configurations, which each can be located on other portion of the working machine 1 in which the one or more position detectors 43, the one or more LiDAR sensors 54, and one or more other sensors 56 can perform their respective functions.

In a preferred embodiment of the present invention, the working machine 1 may include an automated-steering control unit 40a to control automated steering of the machine body 3 based on information including the machine body position W1 and information from the one or more LiDAR sensors 54 and/or the one or more sensors 56. More specifically, as illustrated in FIG. 3, the controller 40 includes the automated-steering control unit 40a. The automated-steering control unit 40a includes an electric/electronic circuit provided in the controller 40, a program stored in a CPU or the like, and the like. The automated-steering control unit 40*a* controls the assist mechanism 11*c* such that the machine body 3 travels along a planned traveling route L based on a control signal output from the controller 40. The automated-steering control unit 40*a* includes a first control unit 40*a*1. The first control unit 40*a*1 sets the steering angle of the steering device 11 based on the planned traveling route L. The planned traveling route L is set using a computer, such as a personal computer (PC), a smartphone (multifunctional mobile telephone), or a tablet connected to or included in the working machine 1. For example, the controller 40 can set the planned traveling route L, as discussed in more detail below.

Figure 4:
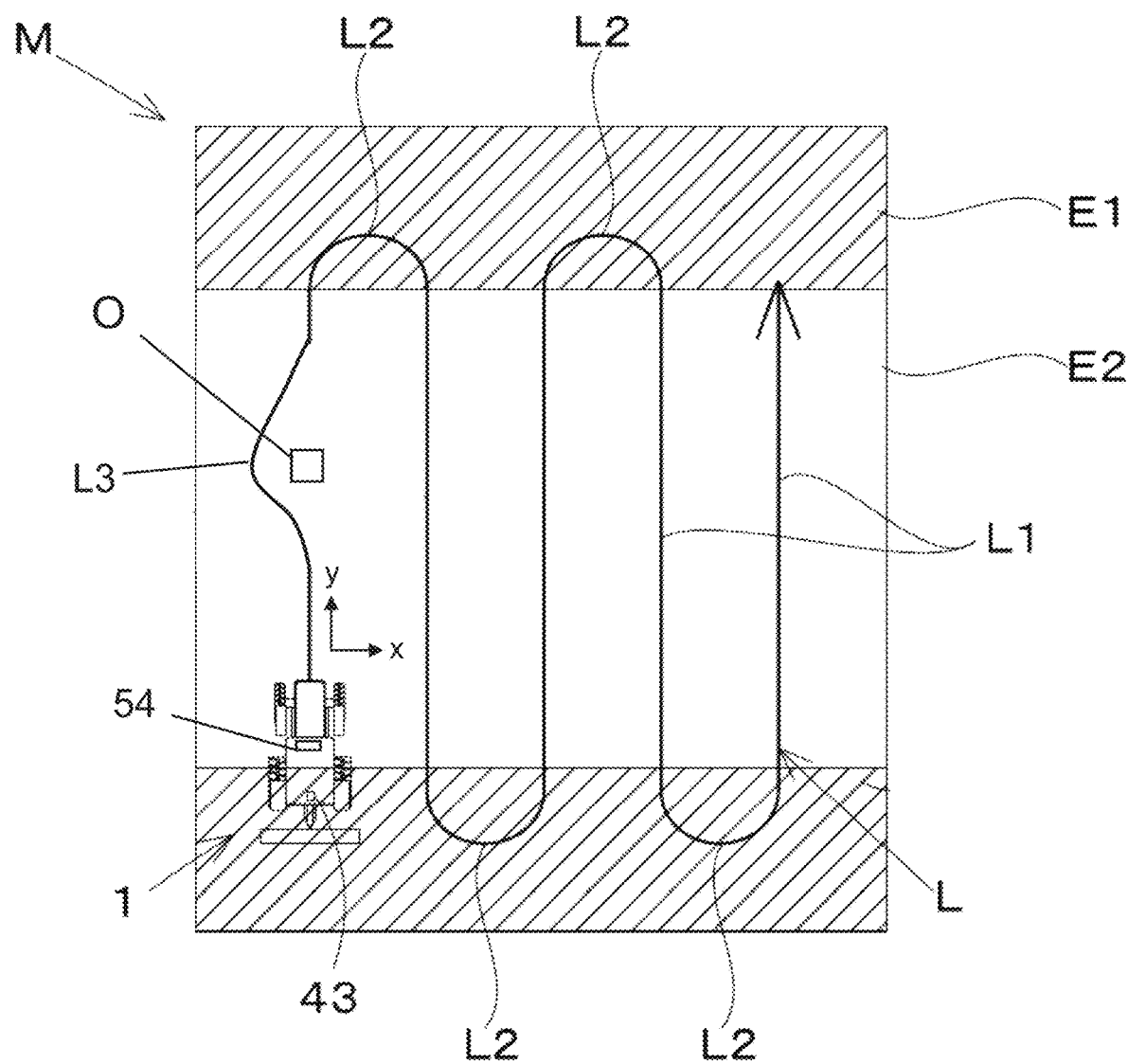
FIG. 4 shows a planned traveling route according to a preferred embodiment of the present invention.

As illustrated in FIG. 4, the planned traveling route L can be set based on an agricultural field map M that includes positional information regarding portions of the agricultural field and a location of one or more obstacles O within the agricultural field. In a preferred embodiment, the agricultural field map M can include portions that are predetermined (e.g., predetermined/stored before the working machine 1 enters the agricultural field) and/or portions that are updated (e.g., determined as the working machine travels in the agricultural field). For example, as illustrated in FIG. 4, the agricultural field map M can include positional information on a region E1 of the agricultural field including furrows and the periphery of the furrows, a region E2 of the agricultural field other than the region E1, and an obstacle O located within the agricultural field. As discussed in more detail below, the one or more LiDARs 54 can be used to detect one or more obstacles O within the agricultural field as the working machine 1 travels in the agricultural field. When the one or more obstacles O are detected, the agricultural field map M can be updated to include positional information regarding the one or more obstacles O, and if needed, the planned traveling route L can be updated based on the updated agricultural field map that includes the positional information regarding the one or more obstacles O. In other words, as discussed in more detail below, the controller 40 is configured or programmed to determine whether or not to update a planned traveling route of a working machine based on the updated agricultural field map that includes the positional information regarding the one or more obstacles O.

The planned traveling route L can include a straight travel section L1 in which the machine body 3 travels straight, a turn section L2 in which the machine body 3 turns, and an avoidance section L3 in which the machine body 3 is controlled to avoid an obstacle O. In a preferred embodiment of the present invention, the controller 40 generates the planned traveling route L. For example, the controller 40 can be configured or programmed to function as a global planner and a local planner to generate the planned traveling route L. The global planner generates an initial planned traveling route L based on desired way points on the agricultural field map M. An example of the global planner includes a Dijkstra global planner, known to one of ordinary skill in the art. The local planner will receive the initial planned traveling route L generated by the global planner, and if an obstacle is on the initial planned traveling route L, for example, if an obstacle is detected by the one or more LiDARs 54 as the working machine 1 travels in the agricultural field, then the local planner will change/update the initial planned traveling route L so that the working machine 1 avoids the obstacle O by traveling on an avoidance section L3. For example, the local planner is able to use Time Elastic Bands (TEB), known to one of ordinary skill in the art, to create a sequence of intermediate working machine poses 1 (x-coordinate, y-coordinate, and heading θ) to modify the initial planned traveling route L generated by the global planner. In this way, the controller 40 is configured or programmed to determine whether or not to update a planned traveling route L of a working machine based an obstacle detected by the one or more LiDARs 54.

In a preferred embodiment, the first control unit 40*a*1 performs a control such that the machine body 3 travels along the planned traveling route L when the working machine 1 performs automated traveling. In other words, when the deviation between the machine body 3 and the planned traveling route L is less than a first set value previously set, an automated-traveling control unit of the first control unit 40*a*1 maintains the rotation angle of the rotary shaft 11*b*. When the deviation between the machine body 3 and the planned traveling route L is more than or equal to the first set value, the automated-traveling control unit of the first control unit 40*a*1 rotates the rotary shaft 11*b* such that the deviation is zero.

Figure 5:
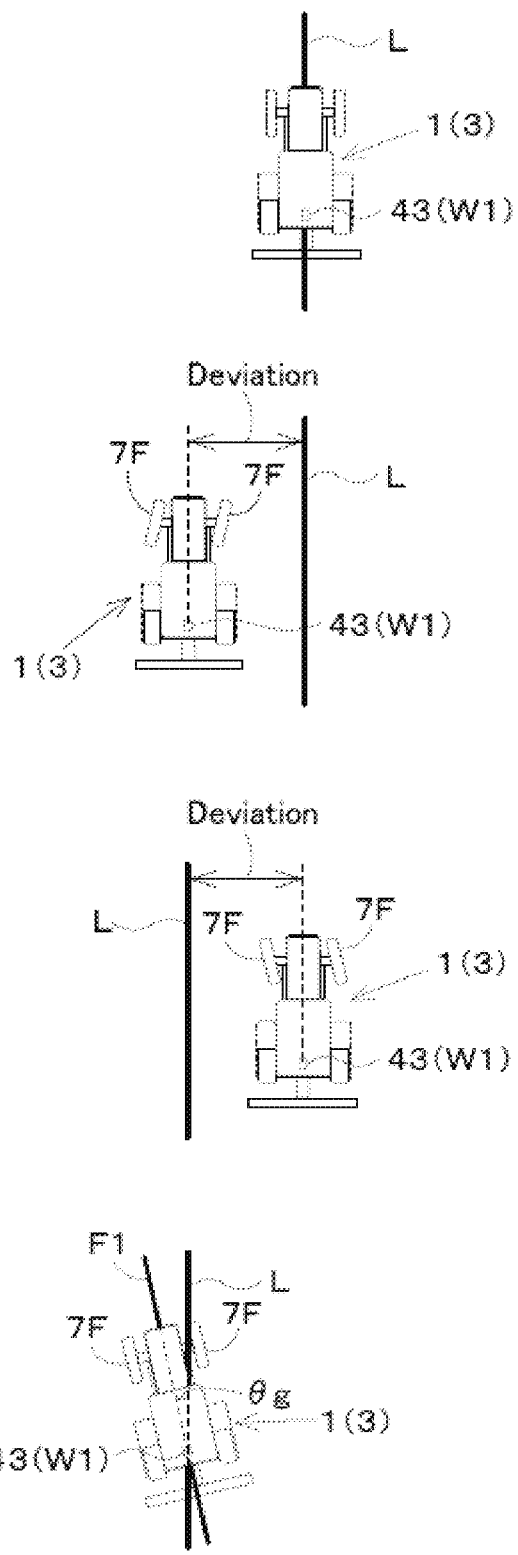
FIG. 5 is a diagram illustrating automated traveling according to a preferred embodiment of the present invention.

Specifically, as illustrated in FIG. 5, when the deviation (position deviation) between the machine body position W1 and the planned traveling route L is less than the first set value previously set, the first control unit 40*a*1 maintains the rotation angle of the rotary shaft 11*b*. When the position deviation between the machine body position W1 and the planned traveling route L is more than or equal to the first set value and when the working machine 1 is positioned on the left side of the planned traveling route L, the first control unit 40*a*1 rotates the rotary shaft 11*b* such that the steering direction of the working machine 1 is the right direction. When the position deviation between the machine body position W1 and the planned traveling route L is more than or equal to the first set value and when the working machine 1 is positioned on the right side of the planned traveling route L, the first control unit 40*a*1 rotates the rotary shaft 11*b* such that the steering direction of the working machine 1 is the left direction.

In the preferred embodiment described above, the steering angle of the steering device 11 is changed based on the position deviation between the machine body position W1 and the planned traveling route L. However, as illustrated in FIG. 5, when the course of the planned traveling route L and the course (machine body course) F1 of the running direction (traveling direction) of the working machine 1 (machine body 3) differ from each other, in other words, when an angle (course deviation) θg of the machine body course F1 with respect to the planned traveling route L is more than or equal to a second set value, the first control unit 40*a*1 may set the steering angle such that the angle θg is zero (the machine body course F1 coincides with the course of the planned traveling route L). The first control unit 40*a*1 may set the final steering angle for automated traveling based on a steering angle obtained based on the deviation (position deviation) and a steering angle obtained based on the angle (course deviation) θg. Setting of the steering angle for automated traveling in the preferred embodiment described above is an example and is not limiting.

The working machine 1 can cause a rotational difference between the first wheel 7R1 and the second wheel 7R2 and change and turn the machine body course F1. The working machine 1 includes a rotational difference generating device that causes a rotation difference between the first wheel 7R1 and the second wheel 7R2. The automated-steering control unit 40*a* has a second control unit 40*a*2 that controls the rotation difference generating device to cause a rotational difference between the first wheel 7R1 and the second wheel 7R2.

The rotational difference generating device causes a rotational difference between the first wheel 7R1 and the second wheel 7R2 by performing braking of each of the first wheel 7R1 and the second wheel 7R2 independently or transmitting an independent driving force to each of the first wheel 7R1 and the second wheel 7R2. When the rotational difference generating device increases the rotation speed of the first wheel 7R1 to be higher than that of the second wheel 7R2, the leftward propulsive force of the machine body 3 becomes larger than the rightward propulsive force, and the machine body 3 travels such that the machine body course F1 is directed to the right. When the rotational difference generating device increases the rotation speed of the second wheel 7R2 to be higher than that of the first wheel 7R1, the rightward propulsive force of the machine body 3 becomes larger than the leftward propulsive force, and the machine body 3 travels such that the machine body course F1 is directed to the left.

In the present preferred embodiment, the rotational difference generating device is the braking device 25 described above. The braking device 25 causes a rotational difference between the first wheel 7R1 and the second wheel 7R2 by switching at least one of the left braking device 25a and the right braking device 25b between the brake state in which braking is performed and the release state in which braking is not performed. For example, when the braking force of the right braking device 25b is increased to be higher than the braking force of the left braking device 25a by controlling the left braking device 25a and the right braking device 25b, the propulsive force of the first wheel 7R1 becomes higher than the propulsive force of the second wheel 7R2, and a rotational difference is generated between the first wheel 7R1 and the second wheel 7R2. When the braking force of the left braking device 25a is increased to be higher than the braking force of the right braking device 25b by controlling the left braking device 25a and the right braking device 25b, the propulsive force of the second wheel 7R2 becomes higher than the propulsive force of the first wheel 7R1, and a rotational difference is generated between the first wheel 7R1 and the second wheel 7R2.

The rotational difference generating device 25 is not limited to having the aforementioned configuration. As long as the rotational difference generating device 25 is able to cause a rotational difference between the first wheel 7R1 and the second wheel 7R2, the rotational difference generating device 25 is not limited to the braking device 25 and may be the transmission 5 that transmits an independent driving force to each of the first wheel 7R1 and the second wheel 7R2 by, for example, switching of a gear.

As illustrated in FIG. 3, the working machine 1 includes a state acquisition unit 40d that acquires the state of the transmission 5. The state acquisition unit 40d includes, for example, an electric/electronic circuit included in the controller 40, a program stored in a CPU or the like, and the like. The state acquisition unit 40d acquires information on operation of the switching tool 42j and acquires, based on the information, information on which one of the equal speed drive, the increased speed drive, and the 2WD the transmission 5 is switched to. Consequently, the pumping setting unit 60 determines whether the transmission 5 is switched to the increased speed drive or the equal speed drive based on the state of the transmission 5 acquired by the state acquisition unit 40d.

As illustrated in FIG. 3, the working machine 1 includes a speed acquisition unit 40c that acquires the machine body speed. The speed acquisition unit 40c includes, for example, an electric/electronic circuit included in the controller 40, a program stored in a CPU or the like, and the like. The speed acquisition unit 40c acquires information on the machine body 3 from a sensor included in the working machine 1 and acquires the machine body speed based on the information. For example, the speed acquisition unit 40c acquires the machine body speed by calculating the machine body speed based on the rotation speeds of the wheels 7F and 7R or acquires the machine body speed by calculating an actual machine body speed based on the machine body position W1 detected by the position detector 43 and the time of the detection. Consequently, the pumping setting unit 60 sets the duty ratio based on the machine body speed acquired by the speed acquisition unit 40c.

As illustrated in FIG. 3, the working machine 1 includes a steering-angle acquisition unit 40e that acquires the steering angle of the steering device 11. The steering-angle acquisition unit 40e includes, for example, an electric/electronic circuit included in the controller 40, a program stored in a CPU or the like, and the like. The steering-angle acquisition unit 40e acquires the steering angle based on, for example, a signal acquired from the steering angle sensor 41e. The method of acquiring the steering angle is not limited to the aforementioned method. The steering-angle acquisition unit 40e may acquire the steering angle set by the first control unit 40a1 from the first control unit 40a1. Consequently, based on the steering angle acquired by the steering-angle acquisition unit 40e, the pumping setting unit 60 determines whether the steering angle is more than or equal to a predetermined steering angle. The steering angle is a value that is previously stored in the storage unit or the like and may be changeable optionally.

Figure 6:
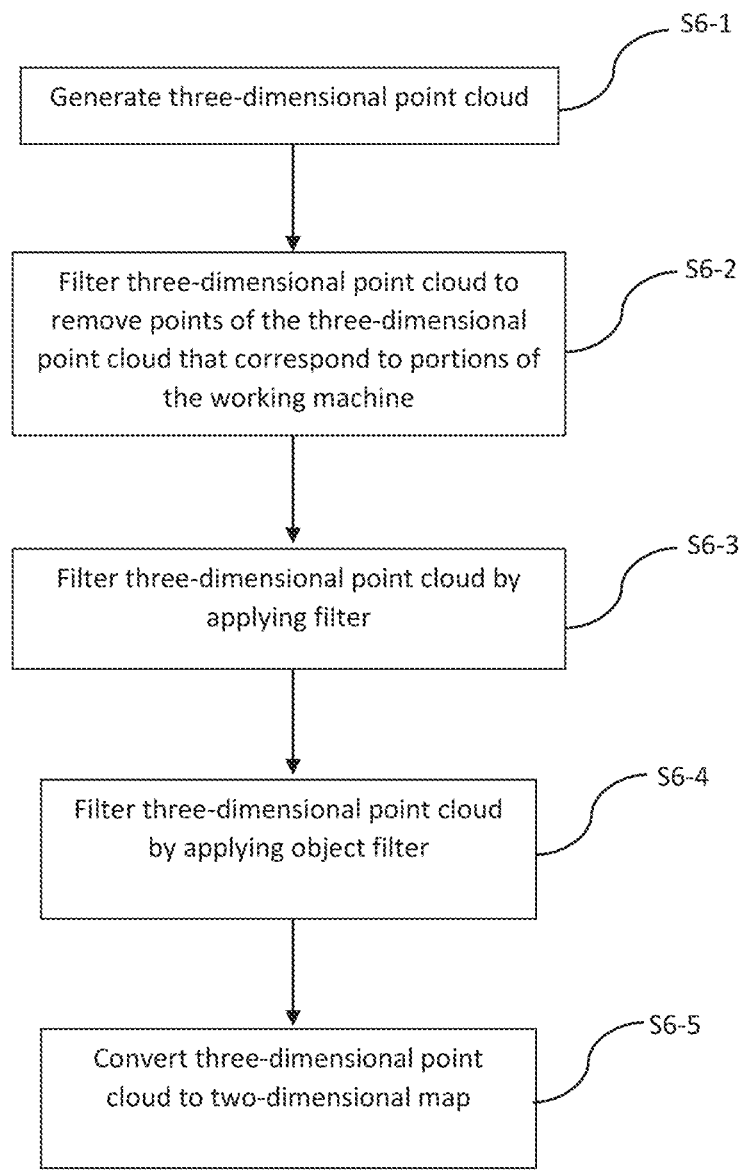
FIG. 6 is a flowchart showing a process performed according to a preferred embodiment of the present invention.

In a preferred embodiment of the present invention, the one or more LiDARs 54 are used to detect one or more obstacles around the working machine 1. The one or more LiDARs 54 can include an Ouster OS0-32 Lidar sensor which has a vertical field of view of 90° (±45°), for example. Alternatively, the one or more LiDARs 54 can include a different LiDAR sensor or LIDAR camera and/or have a different field of view. FIG. 6 shows a flowchart that includes steps included in a process according to a preferred embodiment of the present invention. In a preferred embodiment, the one or more LiDARs 54 include a controller 541 that is configured or programmed to perform the steps shown in FIG. 6. Alternatively, the controller 40 can be configured or programmed to perform the steps shown in FIG. 6.

In step S6-1, the one or more LiDARs 54 are used to generate a three-dimensional point cloud in the range and field of view of the one or more LiDARs 54. The three-dimensional point cloud includes data points that represent the objects and space surrounding the working machine 1. Each of the data points included in the three-dimensional point cloud includes an x-coordinate, a y-coordinate, and a z-coordinate. In a preferred embodiment, an averaging horizontal convolution filter can be used to stabilize a shift in the data points.

In a preferred embodiment, the three-dimensional point cloud includes data points that represent the objects and space surrounding the entire perimeter of the working machine 1, but the three-dimensional point cloud can alternatively include data points that represent only a portion of the objects and space surrounding the perimeter of the working machine 1. For example, the three-dimensional point cloud can include data points that represent the objects and space surrounding a front portion of the working machine 1 (e.g., 90 degrees or 180 degrees at the front of the working machine 1), or the three-dimensional point cloud can include data points that represent the objects and space surrounding a front portion and a rear portion of the working machine 1 (e.g., 90 degrees at the front portion and the rear portion of the working machine 1). In the example shown in FIG. 1B, a front LiDAR 54 is used to generate data points of the three-dimensional point cloud in the range and field of view 54-1 of the front LIDAR 54, and a rear LiDAR 54 is used to generate data points of the three-dimensional point cloud in the range and field of view 54-2 of the rear LiDAR 54.

In step S6-2, the three-dimensional point cloud is filtered to remove data points of the three-dimensional point cloud that correspond to portions of the working machine 1. For example, data points of the three-dimensional point cloud that correspond to portions of the working machine 1 such as the hood and the rear fender of the main body 3, the traveling device 7, the lifting apparatus 8, and the working device 2 are removed from the three-dimensional point cloud to generate a filtered three-dimensional point cloud. In a preferred embodiment, the data points of the three-dimensional point cloud that correspond to portions of the working machine 1 such as the hood and the rear fender of the main body 3, the traveling device 7, the lifting apparatus 8, and the working device 2 can be determined based on a known positional relationship between the one or more LiDARs 54 and the portions of the working machine 1 such as the hood and the rear fender of the main body 3, the traveling device 7, the lifting apparatus 8, and the working device 2. In other words, because the one or more LiDARs 54 and the portions of the working machine 1 such as the hood and the rear fender of the main body 3, the traveling device 7, the lifting apparatus 8, and the working device 2 have a fixed positional relationships with respect to each other, the fixed positional relationships can be used to determine which points of the three-dimensional point cloud correspond to the portions of the working machine 1.

Figure 1B:
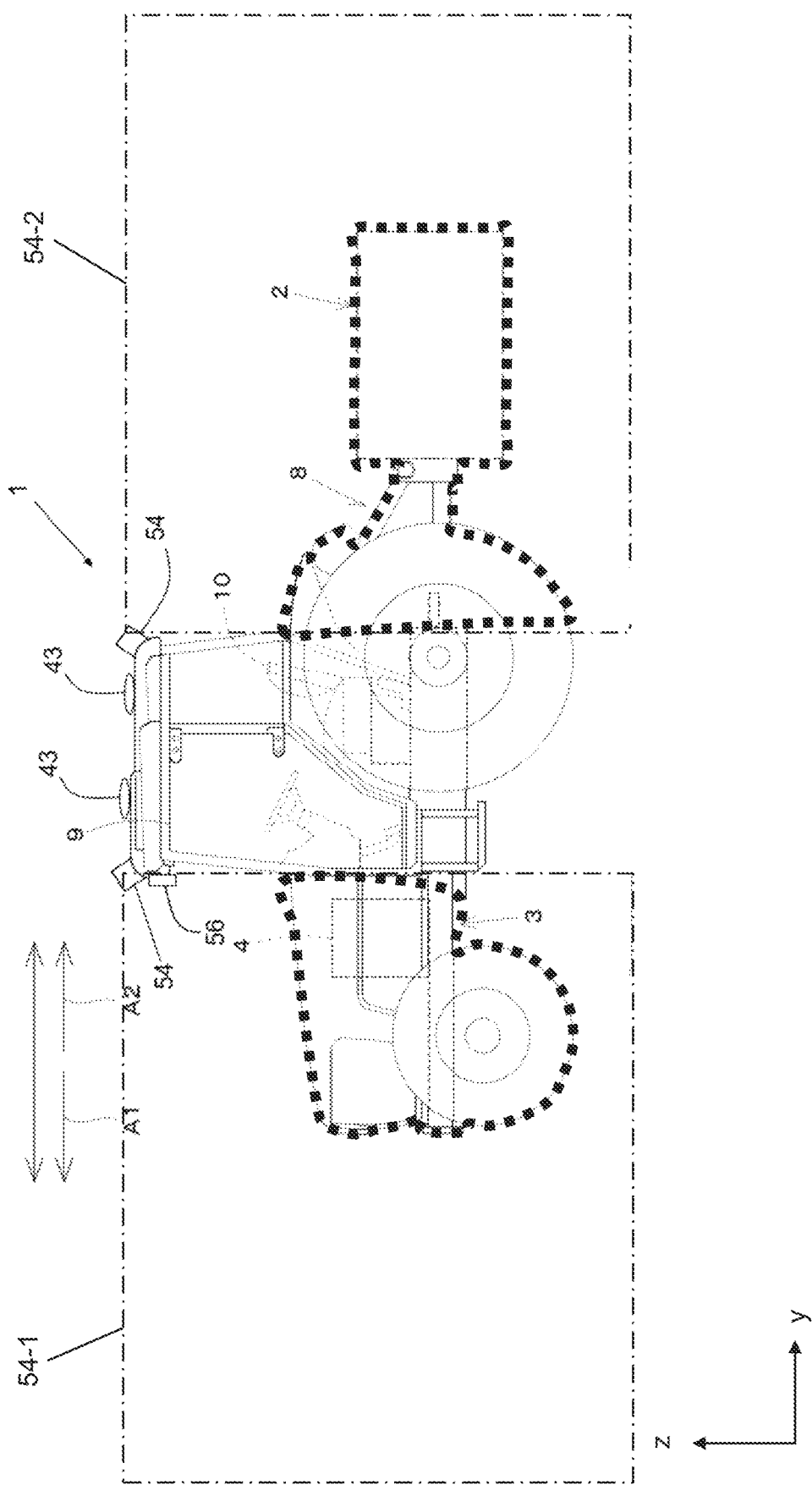
FIG. 1B is a side view of a working machine according to a preferred embodiment of the present invention.

For example, in FIG. 1B, the three-dimensional point cloud data points generated in the range and field of view 51-1 of the front LiDAR 54 can be filtered to remove the data points that correspond to the hood of the main body 3 and the front wheel 7F based on the known positional relationship between the front LiDAR 54 and each of the hood of the main body 3 and the front wheel 7F. In FIG. 1B, the data points that correspond to the hood of the main body 3 and the front wheel 7F are surrounded by a heavy dotted line. Similarly, the three-dimensional point cloud data points generated in the range and field of view 51-2 of the rear LIDAR 54 can be filtered to remove the data points that correspond to the rear fender of the main body 3, the rear wheel 7R, the lifting apparatus 8, and the working device 2 based on the known positional relationship between the rear LiDAR 54 and each of the rear fender of the main body 3, the rear wheel 7R, the lifting apparatus 8, and the working device 2. In FIG. 1B, the points that correspond to the rear fender of the main body 3, the rear wheel 7R, the lifting apparatus 8, and the working device 2 are surrounded by a heavy dotted line.

In steps S6-3 and S6-4, the filtered three-dimensional point cloud that was generated in step S6-2 is further filtered to eliminate/remove additional data points from the three-dimensional point cloud.

Figure 7:
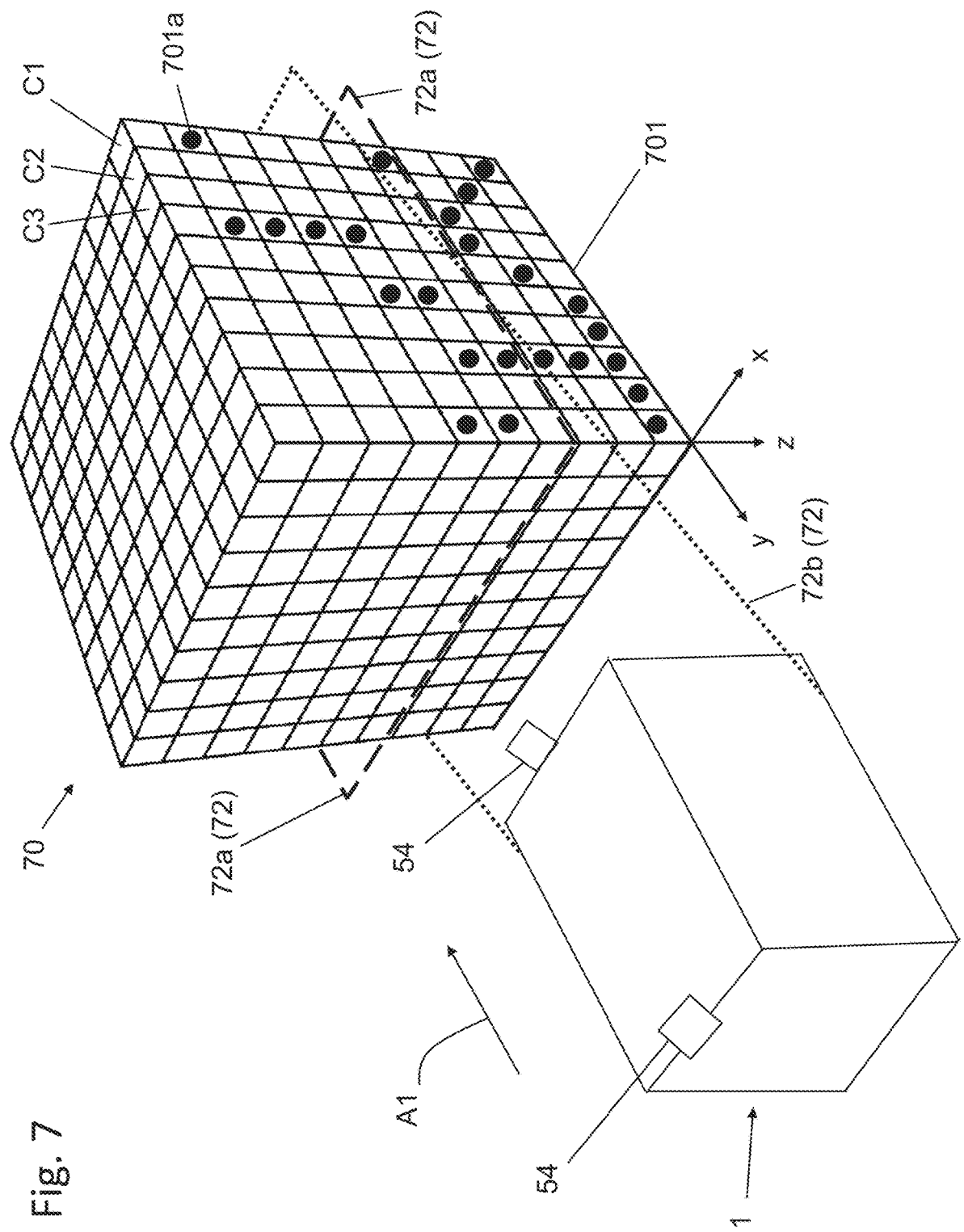
FIG. 7 is a perspective view of an example of a voxel grid according to a preferred embodiment of the present invention.

In a preferred embodiment, step S6-3 includes using a voxel grid 70 to process and filter the three-dimensional point cloud that was generated in step S6-2. A voxel grid 70 is a three-dimensional grid organized into layers of rows and columns. Each row, column, and layer intersection in the voxel grid 70 is called a voxel 701, and is represented by a three-dimensional cube, as shown in FIG. 7, for example. The size of the voxels 701 included in the voxel grid 70 can be set, for example, based on factors such as the size of the working machine 1 and the environment in which the working machine 1 operates. For example, the size of each voxel 701 can be set to 0.1 meters, and can alternatively be set to 0.3 meters, 0.5 meters, or another value.

FIG. 7 illustrates an example of a voxel grid 70 used to process and filter the three-dimensional point cloud that was generated in step S6-2. In the example shown in FIG. 7, the voxel grid 70 is used to process and filter the three-dimensional point cloud that was generated in step S6-2, which includes data points that represent the objects and space surrounding a front portion of the working machine 1. As discussed above, the three-dimensional point cloud can include data points that represent the objects and space surrounding other portions, or an entirety of, the perimeter of the working machine 1.

In a preferred embodiment, the voxel grid 70 includes one or more activated voxels 701*a*. An activated voxel 701*a* is a voxel 701 that includes a data point of the three-dimensional point cloud that corresponds to an object or a portion of an object. For example, an activated voxel 701*a* is a voxel 701 which is occupied by at least one data point of the three-dimensional point cloud that corresponds to an object such as an agricultural item, the ground, a person, another object, or a portion thereof. The activated voxels 701*a* in FIG. 7 are represented by the voxels that include a dot within the voxel 701. For illustrative purposes, FIG. 7 only shows the activated voxels 701*a* included in the voxel columns on a side surface of the voxel grid 70. That is, although activated voxels 701*a* may exist throughout the voxel grid 70, FIG. 7 only shows the activated voxels 701*a* included in the voxel columns on a side surface of the voxel grid 70.

In a preferred embodiment of the present invention, a filter 72 is applied to the voxel grid 70 in step S6-3. The filter 72 eliminates/removes certain activated voxels 701*a* from the voxel grid 70 by changing the certain activated voxels 701*a* to empty/inactivated voxels 701. In steps S6-3 and S6-4, when activated voxels 701*a* are eliminated/removed from the voxel grid 70 by changing the activated voxels 701*a* to empty/inactivated voxels 701, the data points of the three-dimensional point cloud that are included in the activated voxels 701*a* are eliminated/removed from the three-dimensional point cloud when the activated voxels 701*a* are eliminated/removed from the voxel grid 70. In this way, the voxel grid 70 is used to process and filter the three-dimensional point cloud in steps S6-3 and S6-4.

In a preferred embodiment of the present invention, the filter 72 applied in step S6-3 can eliminate/remove activated voxels 701*a* from the voxel grid 70 by changing the activated voxels 701*a* located below the filter 72 in the z-direction of voxel grid 70 (a vertical direction of the voxel grid 70) to empty/inactivated voxels 701. The filter 72 can be represented by a plane that is parallel to, and located a predetermined distance from, the bottom surface of the voxel grid 70. For example, in FIG. 7, the filter 72 is represented by a plane 72*a* that is parallel to, and located a predetermined distance of three voxels from, the bottom surface of the voxel grid 70. The predetermined distance of the plane 72*a* from the bottom surface of the voxel grid 70 can be a predetermined distance other than three voxels, such as one voxel or five voxels, for example.

Figure 8A:
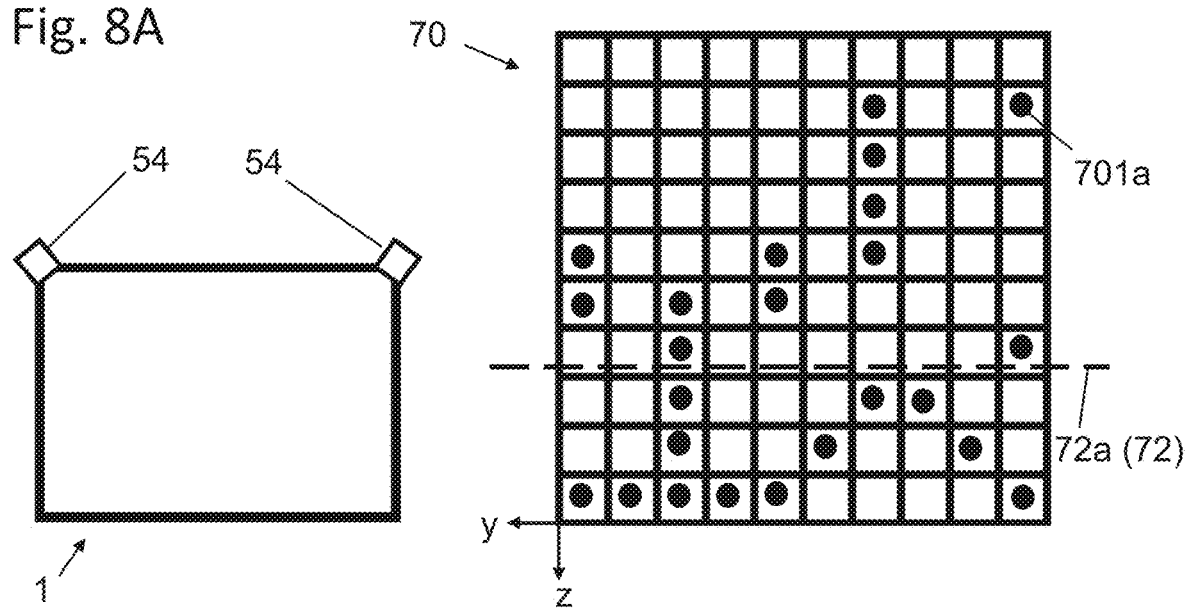
FIG. 8A is a side view of an example of a voxel grid according to a preferred embodiment of the present invention.
Figure 8B:
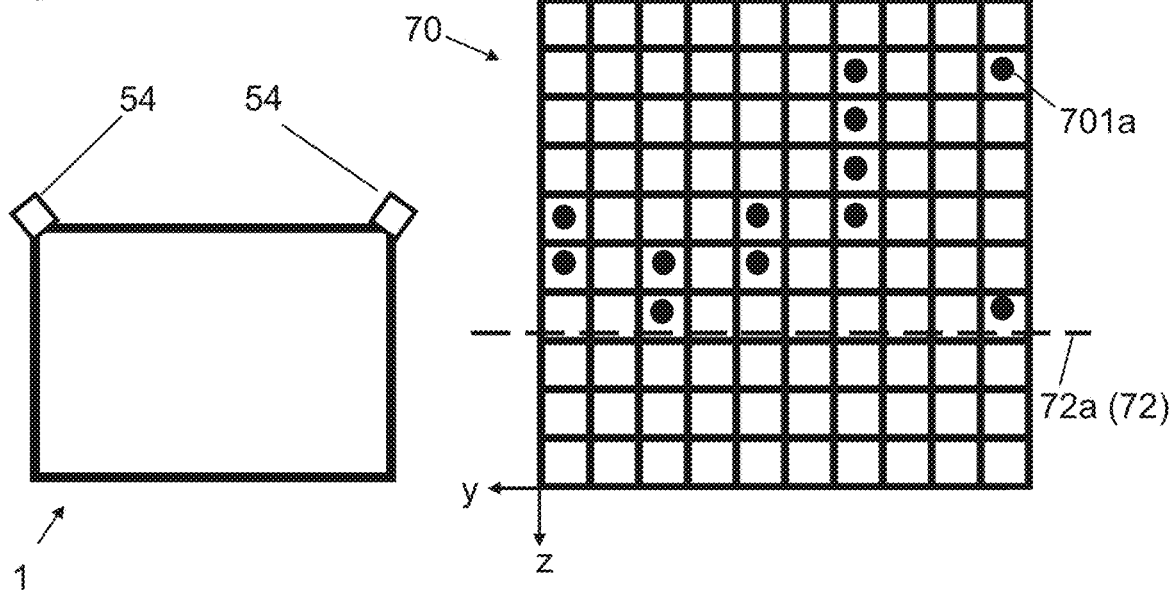
FIG. 8B is a side view of an example of a voxel grid according to a preferred embodiment of the present invention.

FIG. 8A is a side view that shows an example of the voxel grid 70 used to process and filter the three-dimensional point cloud that was generated in step S6-2. That is, FIG. 8A shows a side view of the voxel grid 70 from FIG. 7 before the filter 72 has eliminated/removed any activated voxels 701*a* from the voxel grid 70. FIG. 8B is a side view that shows the voxel grid 70 after the filter 72 has eliminated/removed activated voxels 701*a* from the voxel grid 70. More specifically, FIG. 8B shows an example in which the filter 72 has eliminated/removed activated voxels 701*a* from the voxel grid 70 by changing the activated voxels 701*a* located below the plane 72*a* in the z-direction of voxel grid 70 to empty/inactivated voxels 701.

The filter 72 is not limited to being represented by a plane that is parallel to the bottom surface of the voxel grid 70. For example, the filter 72 can be represented by an inclined plane 72*b* that starts from a point located on or adjacent to the working machine 1 and that increases at a predetermined slope away from the point located on or adjacent to the working machine 1. For example, as shown in FIG. 7, the filter 72 can be represented by an inclined plane 72*b* that starts from a point that is located at a bottom surface of the work machine 1 and that increases at a predetermined slope away from the point.

FIG. 9A is a side view that shows an example of the voxel grid 70 used to process and filter the three-dimensional point cloud when the filter 72 is represented by an inclined plane 72*b*. That is, FIG. 9A shows a side view of the voxel grid 70 from FIG. 7 before the filter 72 has eliminated/removed any activated voxels 701*a*. FIG. 9B is a side view that shows the voxel grid 70 after the filter 72 has eliminated/removed activated voxels 701*a*. More specifically, FIG. 9B shows an example in which the filter 72 has eliminated/removed activated voxels 701*a* from the voxel grid 70 by changing the activated voxels 701*a* through which the plane 72*b* extends, and the activated voxels 701*a* which are located below the plane 72*b* in the z-direction of voxel grid 70, to empty/inactivated voxels 701. Alternatively, the filter 72 may not eliminate/remove activated voxels 701*a* through which plane 72*b* extends, and only eliminate/remove activated voxels 701*a* which are located below the plane 72*b* in the z-direction of voxel grid 70.

In examples discussed above, the filter 72 represented by the plane 72*a* eliminates/removes activated voxels 701*a* located below the plane 72*a* in the z-direction of voxel grid 70, and the filter 72 represented by the inclined plane 72*b* eliminates/removes activated voxels 701*a* through which plane 72*b* extends and which are located below the plane 72*b* in the z-direction of voxel grid 70. In this way, in step S6-3, the filter 72 represented by the plane 72*a* or the filter 72 represented by the inclined plane 72*b* can eliminate/remove activated voxels 701*a* that correspond to portions of the ground surrounding the working machine 1 and/or small agricultural items located on the ground surrounding the working machine 1. Therefore, in step S6-3, the data points of the three-dimensional point cloud that are included in the activated voxels 701*a* that correspond to portions of the ground surrounding the working machine 1 and/or small agricultural items located on the ground surrounding the working machine 1 are eliminated/removed from the three-dimensional point cloud when the activated voxels 701*a* are eliminated/removed from the voxel grid 70.

In an alternative preferred embodiment, the filter 72 can eliminate/remove activated voxels 701*a* located above a plane 72*a* in the z-direction of voxel grid 70, or eliminate/remove activated voxels 701*a* through which a plane 72*b* extends and which are located above the plane 72*b* in the z-direction of voxel grid 70. In this way, based on the location of the plane 72*a* or the plane 72*b* in the z-direction of voxel grid 70, in step S6-3, the filter 72 represented by the plane 72*a* or the inclined plane 72*b* can eliminate/remove activated voxels 701*a* that correspond to portions of a canopy or other agricultural items above the working machine 1.

In another alternative preferred embodiment, more than one filter 72 can be used to eliminate/remove activated voxels 701*a* from the voxel grid 70. For example, a first filter 72 can be used to eliminate/remove activated voxels 701*a* located below a first plane 72*a*1 in the z-direction of voxel grid 70, and a second filter 72 can be used to eliminate/remove activated voxels 701*a* located above a second plane 72*a*2 in the z-direction of voxel grid 70. FIG. 10A is a side view that shows an example of the voxel grid 70 from FIG. 7 generated based on the filtered three-dimensional point cloud that was generated in step S6-2, and FIG. 10B is a side view that shows the voxel grid 70 after the first filter 72 and the second filter 72 have been used to eliminate/remove activated voxels 701*a*.

In a preferred embodiment of the present invention, step S6-4 includes applying an object filter to the voxel grid 70. For example, step S6-4 includes applying an object filter to the voxel grid 70 after step S6-3 has been completed. The object filter eliminates/removes certain activated voxels 701*a* from the voxel grid 70 by changing the activated voxels 701*a* to empty/inactivated voxels 701.

In a preferred embodiment of the present invention, the object filter is applied to an individual voxel column that extends in the z-direction of the voxel grid 70. For example, the object filter is applied to an individual voxel column such as voxel column C1, voxel column C2, and voxel column C3, shown in FIG. 7.

Figure 11:
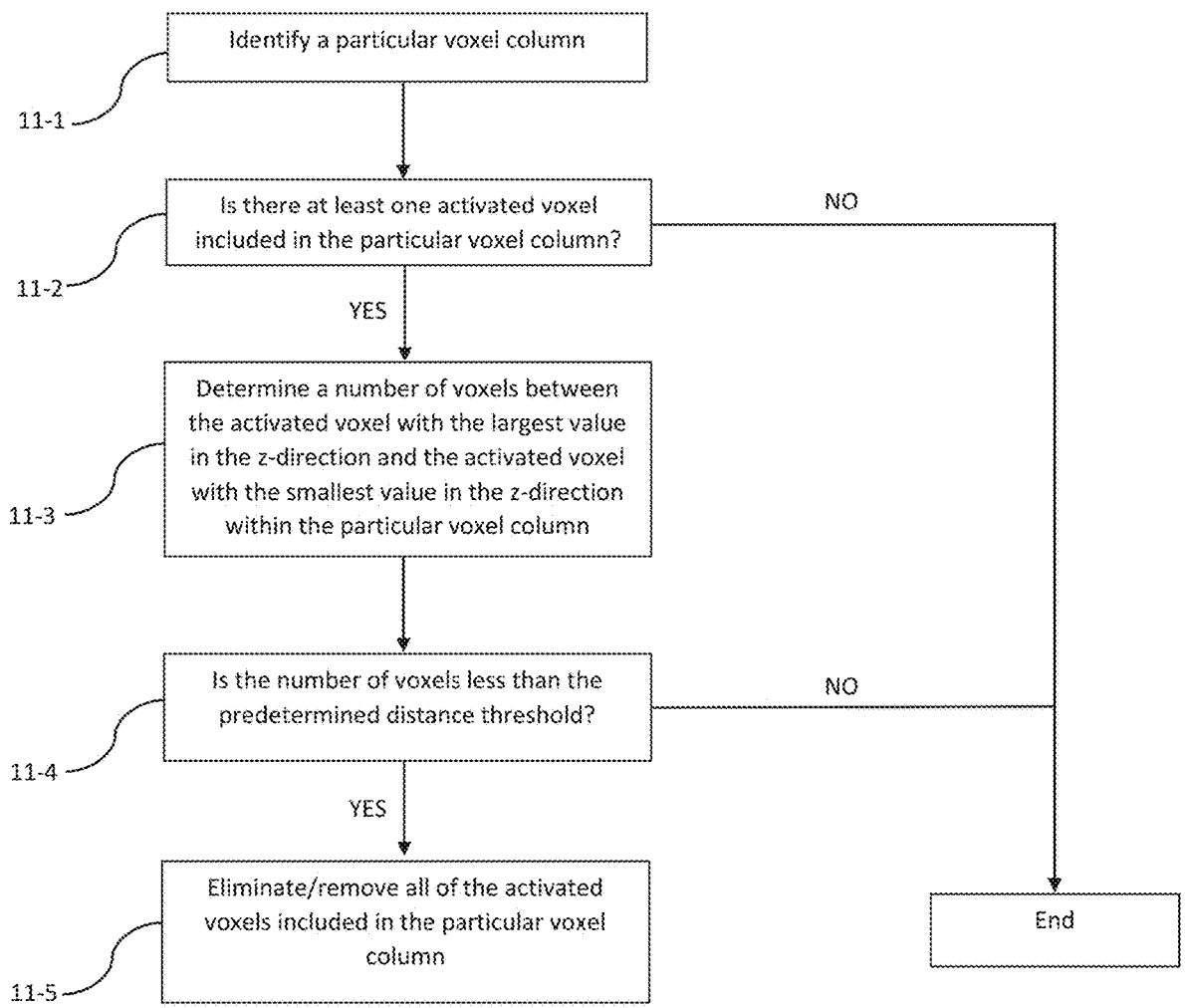
FIG. 11 is a flowchart showing a process performed according to a preferred embodiment of the present invention.

FIG. 11 is flowchart that shows steps performed by the object filter during step S6-4. In step S11-1, the object filter identifies a particular voxel column included in the voxel grid 70. For example, in step S11-1, the object filter can identify voxel column C1 as the particular voxel column. In step S11-2, the object filter determines whether or not there are any activated voxels 701*a* included in the particular voxel column identified in step S11-1. If, in step S11-2, the object filter determines that there are no activated voxels 701*a* included in the particular voxel column identified in step S11-1, then the process ends. If, on the other hand, the object filter determines that there is at least one activated voxel 701*a* included in the particular voxel column identified in step S11-1, then the process proceeds to step 11-3. In step S11-3, the object filter determines a number of voxels (a distance) between the activated voxel with the largest value in the z-direction and the activated voxel with the smallest value in the z-direction within the particular voxel column. In step S11-3, if the object filter determines that there is a single activated voxel 701*a* included in the particular voxel column, then the object filter interprets the number of voxels between the activated voxel with the largest value in the z-direction and the activated voxel with the smallest value in the z-direction within the particular voxel column as being one voxel.

In step S11-4, the object filter determines whether or not the number of voxels determined in step S11-3 is less than a predetermined distance threshold. In a preferred embodiment, the predetermined distance threshold can be a predetermined number of voxels, such as three voxels, for example. If the object filter determines that the number of voxels determined in step S11-3 is equal to or greater than the predetermined distance threshold, then the process ends.

If, on the other hand, the object filter determines that the number of voxels determined in step S11-3 is less than the predetermined distance threshold, then the process proceeds to step S11-5. In step S11-5, the object filter eliminates/removes all of the activated voxels 701a included in the particular voxel column by changing the activated voxels 701a to empty/inactivated voxels 701.

As mentioned above, the object filter is applied to the individual voxel columns that extend in the z-direction of the voxel grid 70. Examples of the object filter being applied to individual voxel columns will be discussed in more detail below.

Figure 12A:
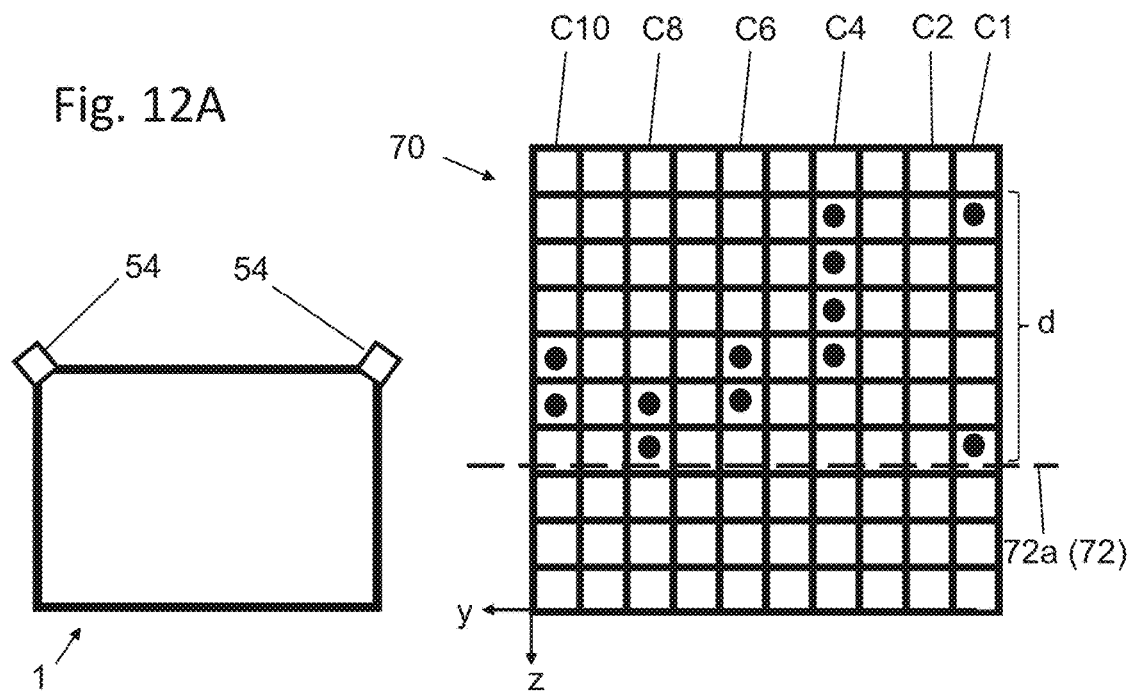
FIG. 12A is a side view of an example of a voxel grid according to a preferred embodiment of the present invention.

FIG. 12A shows a side view of the voxel grid 70 from FIG. 7 after the filter 72 has eliminated/removed activated voxels 701a from the voxel grid 70 by changing the activated voxels 701a located below the plane 72a in the z-direction of voxel grid 70 to empty/inactivated voxels 701. In a first example, in step S11-1, the object filter identifies a particular voxel column within the voxel grid 70. For example, in step S11-1, the object filter can identify voxel column C1 shown in FIG. 7 and FIG. 12A as the particular voxel column. In step S11-2, the object filter determines whether or not there are any activated voxels 701a included in the particular voxel column identified in step S11-1. For example, in step S11-2, the object filter determines that there is at least one activated voxel 701a included in the voxel column C1 because the voxel column C1 includes two activated voxels 701a. In step S11-3, the object filter determines a number of voxels (a distance) between the activated voxel with the largest value in the z-direction (the highest activated voxel) and the activated voxel with the smallest value in the z-direction (the lowest activated voxel) within the voxel column C1. For example, in step S11-3, the object filter determines that the number of voxels between the activated voxel with the largest value in the z-direction and the activated voxel with the smallest value in the z-direction within the voxel column C1 is six voxels (including the highest activated voxel and the lowest activated voxel). In step S11-4, the object filter determines whether or not the number of voxels determined in step S11-3 is less than the predetermined distance threshold. If the object filter determines that the number of voxels determined in step S11-3 is equal to or greater than the predetermined distance threshold, then the process ends. If, on the other hand, the object filter determines that the number of voxels determined in step S11-3 is less than the predetermined distance threshold, then the process proceeds to step S11-5. In the present example, if the predetermined distance threshold is set to three voxels, then the object filter determines that the number of voxels of six voxels determined in step S11-3 is equal to or greater than the predetermined distance threshold of three voxels, and the process ends.

In a second example, in step S11-1, the object filter can identify voxel column C2 shown in FIG. 12A as the particular voxel column. In step S11-2, the object filter determines whether or not there are any activated voxels 701a included in the particular voxel column identified in step S11-1. For example, in step S11-2, the object filter determines that there is not at least one activated voxels 701a included in voxel column C2, and the process ends.

In a third example, in step S11-1, the object filter can identify voxel column C4 shown in FIG. 12A as the particular voxel column. In step S11-2, the object filter determines whether or not there are any activated voxels 701a included in the particular voxel column identified in step S11-1. For example, in step S11-2, the object filter determines that there is at least one activated voxel 701a included in voxel column C4 because the voxel column C4 includes four activated voxel 701a. In step S11-3, the object filter determines a number of voxels between the activated voxel with the largest value in the z-direction (the highest activated voxel) and the activated voxel with the smallest value in the z-direction (the lowest activated voxel) within the voxel column C4. For example, in step S11-3, the object filter determines that the number of voxels between the activated voxel with the largest value in the z-direction and the activated voxel with the smallest value in the z-direction within the voxel column C4 is four voxels. In step S11-4, the object filter determines whether or not the number of voxels determined in step S11-3 is less than the predetermined distance threshold. If the object filter determines that the number of voxels determined in step S11-3 is equal to or greater than the predetermined distance threshold, then the process ends. If, on the other hand, the object filter determines that the number of voxels determined in step S11-3 is less than the predetermined distance threshold, then the process proceeds to step S11-5. In the present example, if the predetermined distance threshold is set to three voxels, then the object filter determines that the number of voxels of four voxels determined in step S11-3 is equal to or greater than the predetermined distance threshold of three voxels, and the process ends.

In a fourth example, in step S11-1, the object filter can identify voxel column C6 shown in FIG. 12A as the particular voxel column. In step S11-2, the object filter determines whether or not there are any activated voxels 701a included in the particular voxel column identified in step S11-1. For example, in step S11-2, the object filter determines that there is at least one activated voxel 701a included in voxel column C6 because voxel column C6 includes two activated voxels. In step S11-3, the object filter determines a number of voxels (a distance) between the activated voxel with the largest value in the z-direction (the highest activated voxel) and the activated voxel with the smallest value in the z-direction (the lowest activated voxel) within the voxel column C6. For example, in step S11-3, the object filter determines that the number of voxels between the activated voxel with the largest value in the z-direction and the activated voxel with the smallest value in the z-direction within the voxel column C6 is two voxels. In step S11-4, the object filter determines whether or not the number of voxels determined in step S11-3 is less than the predetermined distance threshold. If the object filter determines that the number of voxels determined in step S11-3 is equal to or greater than the predetermined distance threshold, then the process ends. If, on the other hand, the object filter determines that the number of voxels determined in step S11-3 is less than the predetermined distance threshold, then the object filter eliminates/removes all of the activated voxels 701a included in the particular voxel column by changing the activated voxels 701a to empty/inactivated voxels 701 in step S11-5. In the present example, if the predetermined distance threshold is set to three voxels, then the object filter determines that the number of voxels of two voxels determined in step S11-3 is less than the predetermined distance threshold of three voxels. Therefore, in step S11-5, the object filter eliminates/removes all of the activated voxels 701a included in the voxel column C6 by changing the activated voxels 701a to empty/inactivated voxels 701.

Figure 12B:
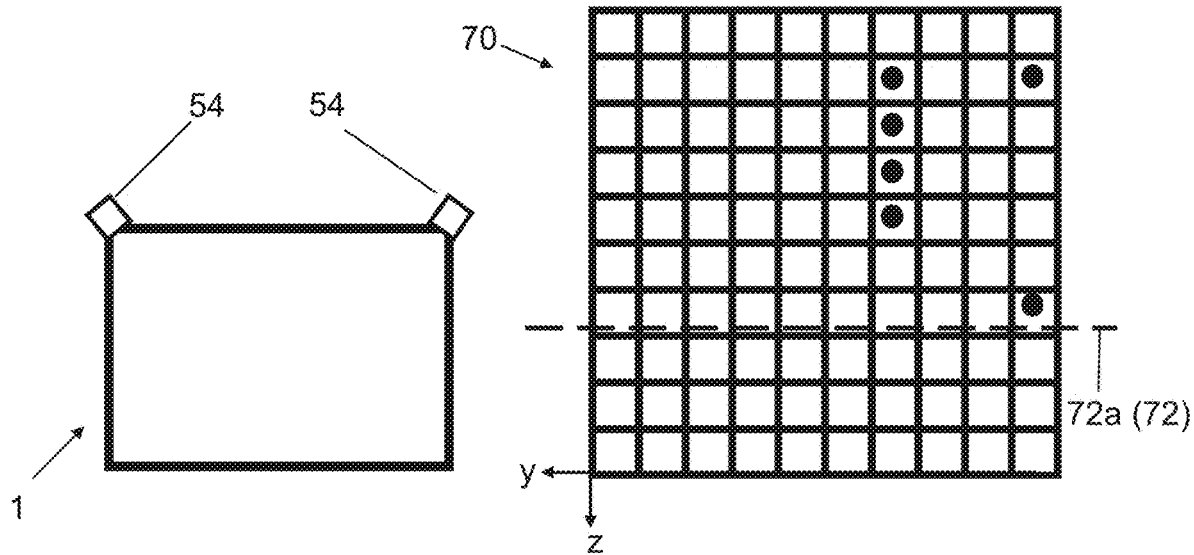
FIG. 12B is a side view of an example of a voxel grid according to a preferred embodiment of the present invention.

FIG. 12B shows a side view of the voxel grid 70 after the object filter has been applied to each of the individual voxel columns of the voxel grid 70 shown in FIG. 12A to eliminate/remove certain activated voxels 701a from the voxel grid 70 in step 6-4 when the predetermined distance threshold is set to three voxels. As discussed above, the object filter is applied to an individual voxel column that extends in the z-direction of the voxel grid 70. In a preferred embodiment, the object filter can be applied to more than one of the individual voxel columns of the voxel grid 70 in parallel/simultaneously. For example, the object filter can be applied to each of the individual voxel columns of the voxel grid 70 in parallel/simultaneously. Alternatively, the object filter can be applied to the individual voxel columns of the voxel grid 70 in series or in groups of voxel columns.

Additional examples of the object filter being applied to voxel columns in step 6-4 will be discussed below with respect to FIGS. 13 and 14.

Figure 13A:
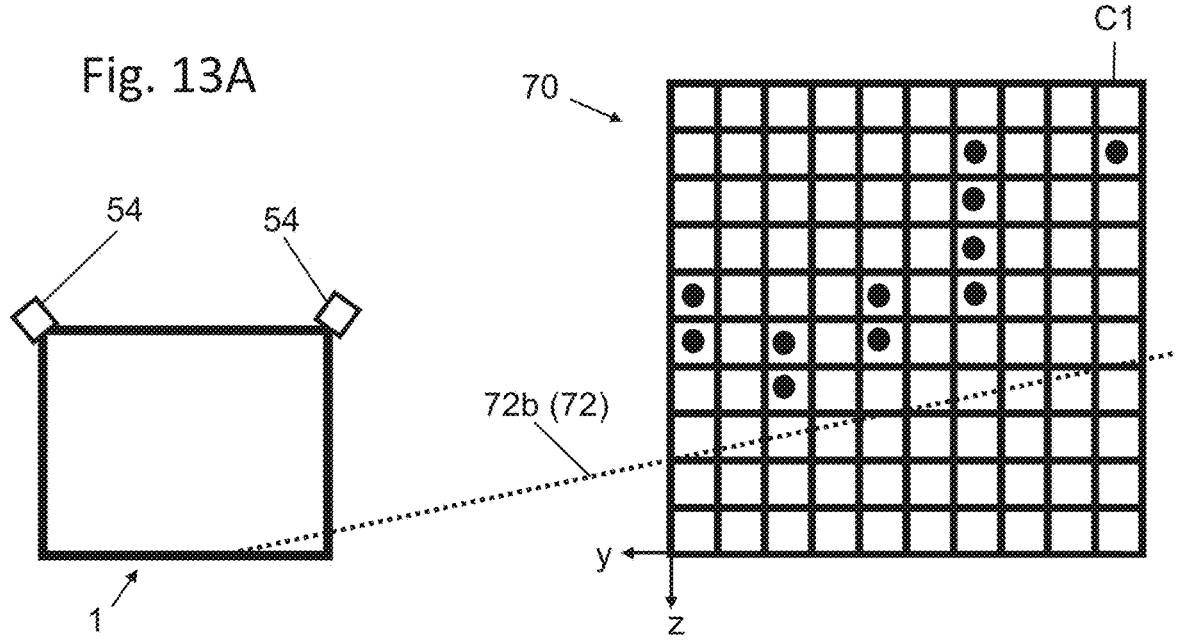
FIG. 13A is a side view of an example of a voxel grid according to a preferred embodiment of the present invention.
Figure 13B:
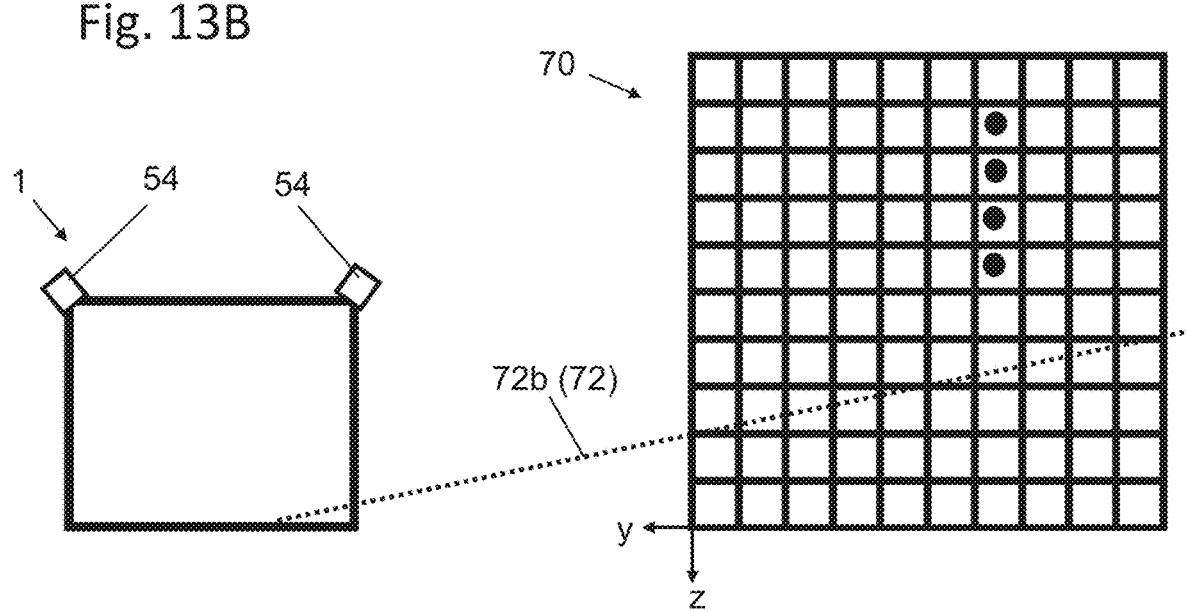
FIG. 13B is a side view of an example of a voxel grid according to a preferred embodiment of the present invention.

FIG. 13A shows a side view of the voxel grid 70 from FIG. 7 after the filter 72 has eliminated/removed activated voxels 701a from the voxel grid 70 by changing the activated voxels 701a located below the plane 72b in the z-direction of voxel grid 70 to empty/inactivated voxels 701 in step S6-3. FIG. 13B shows a side view of the voxel grid 70 after step S6-4 in which the object filter has been applied to each of the individual voxel columns of the voxel grid 70 shown in FIG. 13A to eliminate/remove certain activated voxels 701a from the voxel grid 70 when the predetermined distance threshold is set to three voxels.

FIG. 14A shows a side view of the voxel grid 70 from FIG. 7 after the first filter 72 has eliminated/removed activated voxels 701a located below a first plane 72a1 in the z-direction of voxel grid 70, and a second filter 72 has eliminated/removed activated voxels 701a located above a second plane 72a2 in the z-direction of the voxel grid 70. FIG. 14B shows a side view of the voxel grid 70 after step S6-4 in which the object filter has been applied to each of the individual voxel columns of the voxel grid 70 shown in FIG. 14A to eliminate/remove certain activated voxels 701a from the voxel grid 70 when the predetermined distance threshold is set to three voxels.

In a preferred embodiment of the present invention, the object filter can eliminate/remove activated voxels 701a from the voxel grid 70 that correspond to objects that the working machine 1 can pass through (e.g., pass through or over) and for which the planned traveling route L should not be changed/updated. For example, the examples of the object filter discussed above can eliminate/remove activated voxels 701a that correspond to objects such as small agricultural items such as branches or vegetation that extend in front of the working machine 1 in a horizontal manner (e.g., intersect the planned traveling route L) but through which the working machine 1 can easily pass through. On the other hand, the activated voxels 701a that correspond to objects that are obstacles such as significant agricultural items, a person, or another non-passable objects are maintained within the voxel grid 70.

Therefore, in step S6-4, the data points of the three-dimensional point cloud that are included in the activated voxels 701a that correspond to objects that the working machine 1 can pass through and for which the planned traveling route L should not be changed/updated are eliminated/removed from the three-dimensional point cloud when the activated voxels 701a are eliminated/removed from the voxel grid 70, and the data points of the three-dimensional point cloud that are included in the activated voxels 701a that correspond to objects that are obstacles such as significant agricultural items, a person, or another non-passable objects are maintained within the three-dimensional point cloud. In this way, the object filter is an example of a filter that filters the three-dimensional point cloud to eliminate/remove one or more data points corresponding to an object through which the working machine 1 can pass based on a vertical position of the one or more data points.

Figure 15:
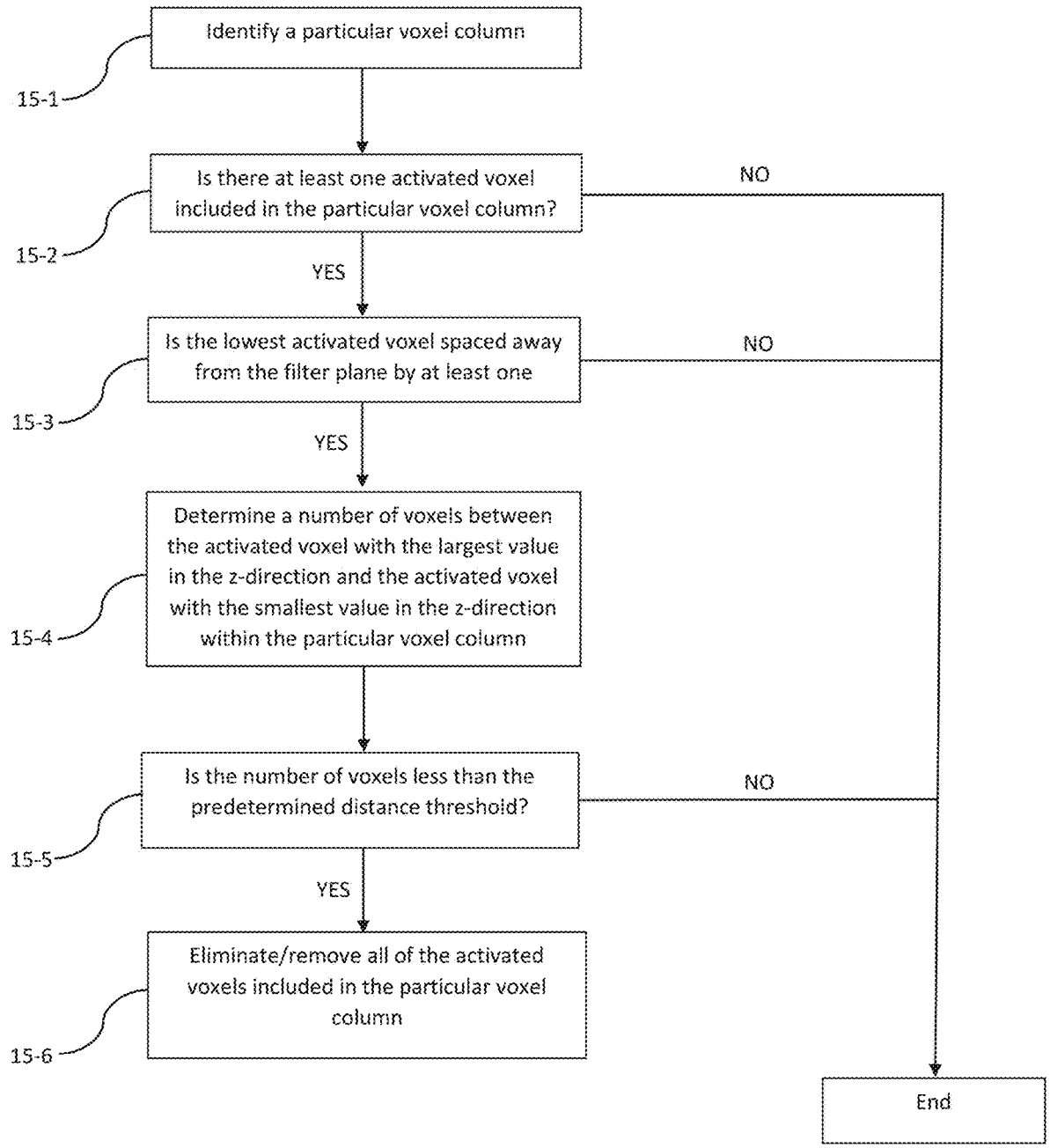
FIG. 15 is a flowchart showing a process performed according to a preferred embodiment of the present invention.

In a preferred embodiment of the present invention, the steps performed by the object filter during step S6-4 can be changed or modified from the steps shown in FIG. 11. For example, FIG. 15 is a flowchart that shows a first modification to the steps shown in FIG. 11, which are performed by the object filter during step S6-4. More specifically, FIG. 15 shows that the object filter is able to perform an additional step, step S15-3. The steps included in FIG. 15 other than step S15-3 are the same as the steps included in FIG. 11.

In step S15-3, the object filter determines whether or not the lowest activated voxel in the voxel column is spaced away from the filter 72 used to filter the voxel grid 70 in step S6-3. For example, the object filter determines whether or not the lowest activated voxel in the voxel column is spaced away from the plane 72a used to filter the voxel grid 70 in step S6-3. If the lowest activated voxel in the voxel column is not spaced away from the filter 72 used to filter the voxel grid 70 in step S6-3, then the process ends. If, on the other hand, the lowest activated voxel in the voxel column is spaced away from the filter 72 used to filter the voxel grid 70 in step S6-3, then the process proceeds to step S15-4.

Figure 16A:
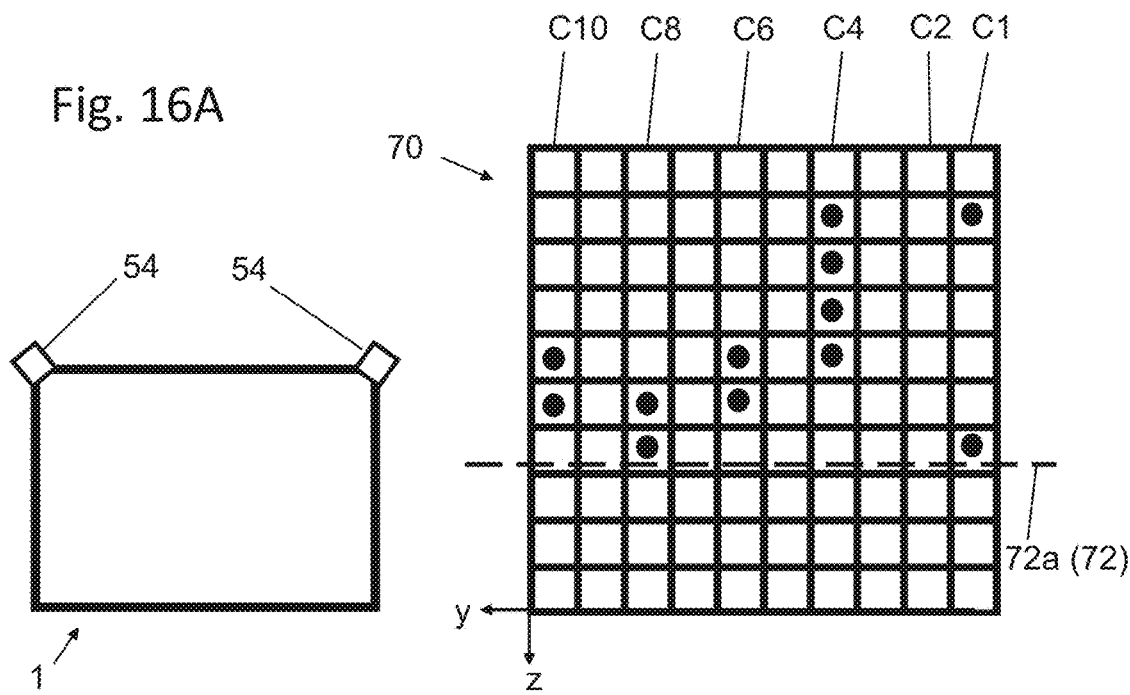
FIG. 16A is a side view of an example of a voxel grid according to a preferred embodiment of the present invention.
Figure 16B:
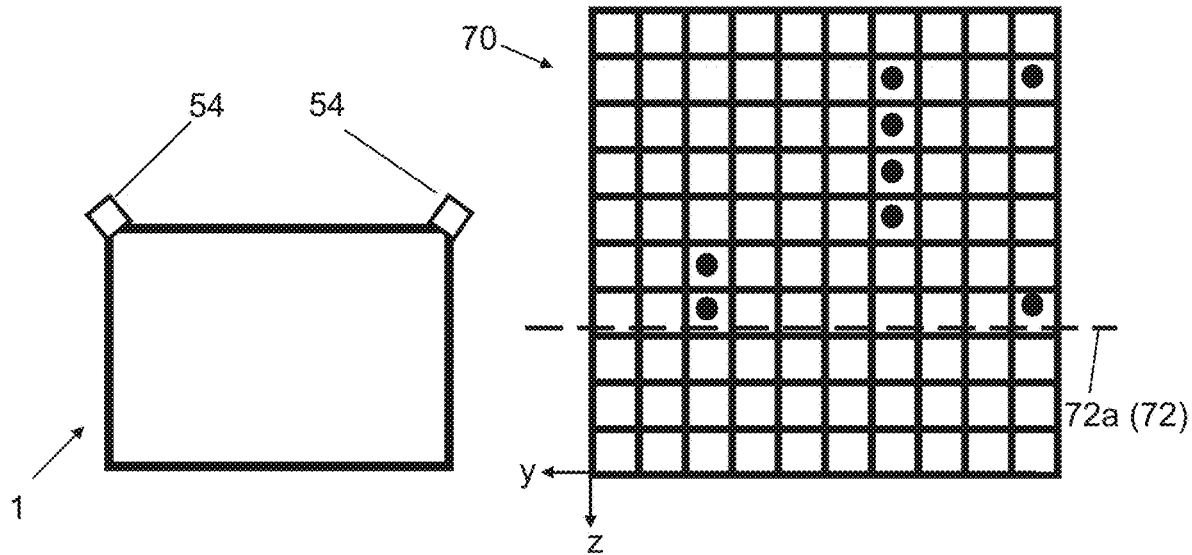
FIG. 16B is a side view of an example of a voxel grid according to a preferred embodiment of the present invention.

FIGS. 16A and 16B show an example of the object filter being applied to individual voxel columns in accordance with the steps shown in FIG. 15. FIG. 16A shows a side view of the voxel grid 70 from FIG. 7 after the filter 72 has eliminated/removed activated voxels 701a from the voxel grid 70 by changing the activated voxels 701a located below the plane 72a in the z-direction of voxel grid 70 to empty/inactivated voxels 701. In step S15-1, the object filter identifies a particular voxel column within the voxel grid 70. For example, in step S15-1, the object filter can identify voxel column C8 shown in FIG. 16A as the particular voxel column. In step S15-2, the object filter determines whether or not there are any activated voxels 701a included in the particular voxel column identified in step S15-1. For example, in step S15-2, the object filter determines that there is at least one activated voxel 701a included in the voxel column C8 because the voxel column C8 includes two voxels. In step S15-3, the object filter determines whether or not the lowest activated voxel in the voxel column is spaced away from the filter 72 that was used to filter the voxel grid 70 in step S6-3. For example, the object filter determines whether or not the lowest activated voxel in the voxel column is spaced away from the plane 72a that was used to filter the voxel grid 70 in step S6-3. In the present example, as shown in FIG. 16A, the lowest activated voxel in the voxel column C8 is not spaced away from the filter 72 (plane 72a) used to filter the voxel grid 70 in step S6-3 because the lowest activated voxel in the voxel column C8 is adjacent to the filter 72 (plane 72a), so the process ends. However, if the lowest activated voxel in the voxel column C8 had been spaced away from the filter 72 used to filter the voxel grid 70 in step S6-3, then the process would have proceeded to step S15-4. FIG. 16B shows a side view of the voxel grid 70 after the object filter has been applied to each of the individual voxel columns of the voxel grid 70 shown in FIG. 16A in accordance with the steps shown in FIG. 15 and when the predetermined distance threshold is set to three voxels.

In a preferred embodiment of the present invention, the example of the object filter discussed above with respect to FIGS. 15, 16A, and 16B can eliminate/remove activated voxels 701a that correspond to objects that the working machine 1 can easily pass through and for which the planned traveling route L should not be changed/updated. On the other hand, the activated voxels 701*a* that correspond to objects that are obstacles such as significant agricultural items, a person, or another object are maintained within the voxel grid 70. Additionally, by ending the process and not eliminating/removing any activated voxels 701*a* from the voxel column when the lowest activated voxel in the voxel column is not spaced away from the filter 72 used to filter the voxel grid 70 in step S6-3, the activated voxels 701*a* that are more likely to correspond to an object that is connected to the ground are maintained within the voxel grid 70 because they are more likely to correspond to objects that are obstacles such as a significant agricultural items, a person, or another non-passable objects connected to the ground. In this way, activated voxels 701*a* that are more likely to correspond to an object that is connected to the ground, and thus should not be passed through or over by the working machine 1, are maintained within the voxel grid 70. In this way, the object filter is an example of a filter that filters the three-dimensional point cloud to eliminate/remove one or more data points corresponding to an object through which the working machine 1 can pass based on a vertical position of the one or more data points.

Figure 17:
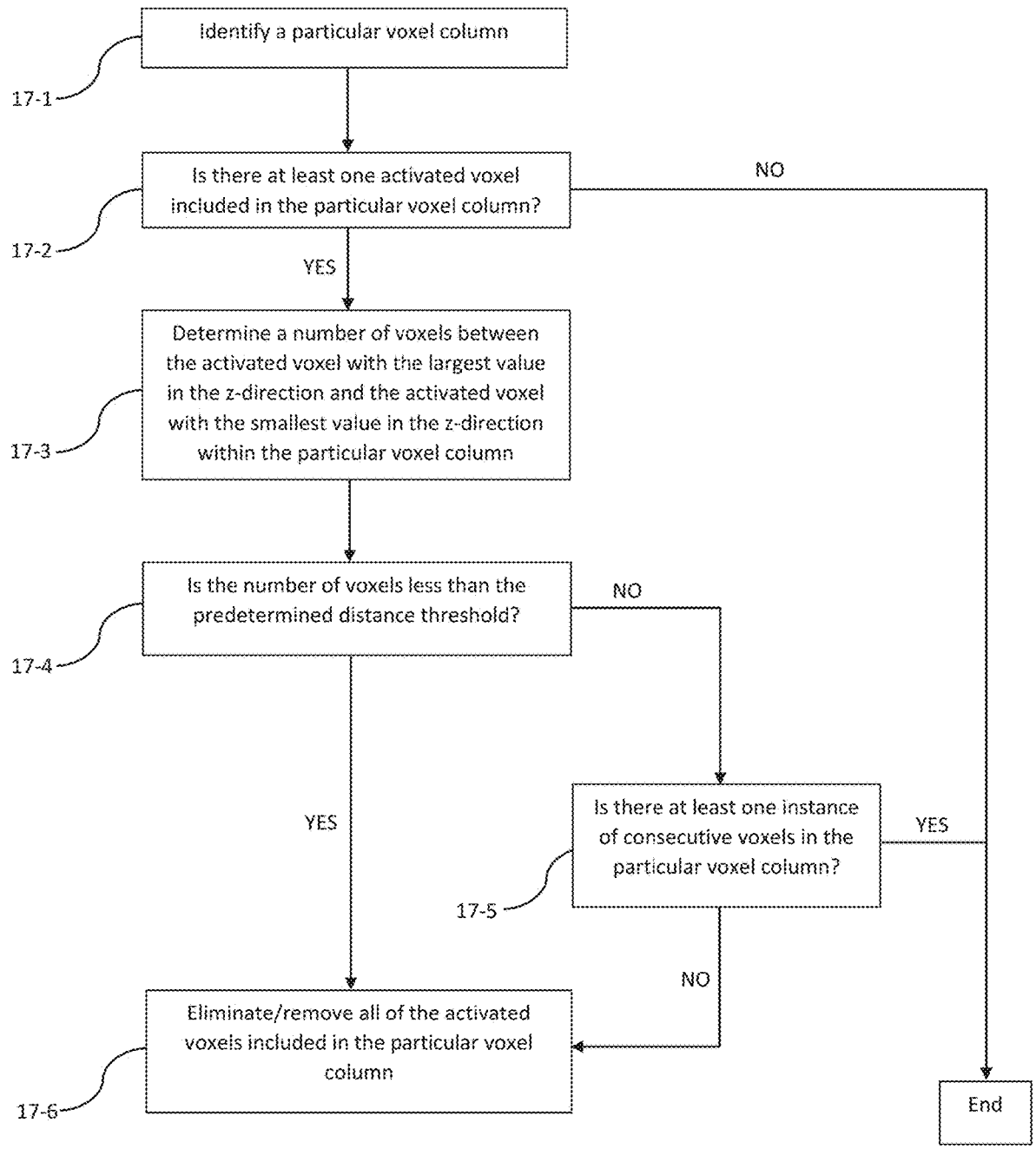
FIG. 17 is a flowchart showing a process performed according to a preferred embodiment of the present invention.

In a preferred embodiment of the present invention, the steps performed by the object filter during step S6-4 can be changed or modified from the steps shown in FIG. 11. For example, FIG. 17 is a flowchart that shows a second modification to the steps shown in FIG. 11, which are performed by the object filter during step S6-4. More specifically, FIG. 17 shows that the object filter is able to perform an additional step, step S17-5. The steps included in FIG. 17 other than step S17-5 are the same as the steps included in FIG. 11.

In step S17-5, the object filter determines whether or not there are any instances of consecutive activated voxels within the voxel column if the number of voxels determined in step 17-4 is equal to or greater than the predetermined distance threshold. If, in step S17-5, the object filter determines that there is at least one instance of consecutive activated voxels within the voxel column, then the process ends. On the other hand, if, in step S17-5, the object filter determines that there is not at least one instance of consecutive activated voxels within the voxel column, then the process proceeds to step S17-6 in which the object filter eliminates/removes all of the activated voxels 701*a* included in the particular voxel column by changing the activated voxels 701*a* to empty/inactivated voxels 701.

Figure 18A:
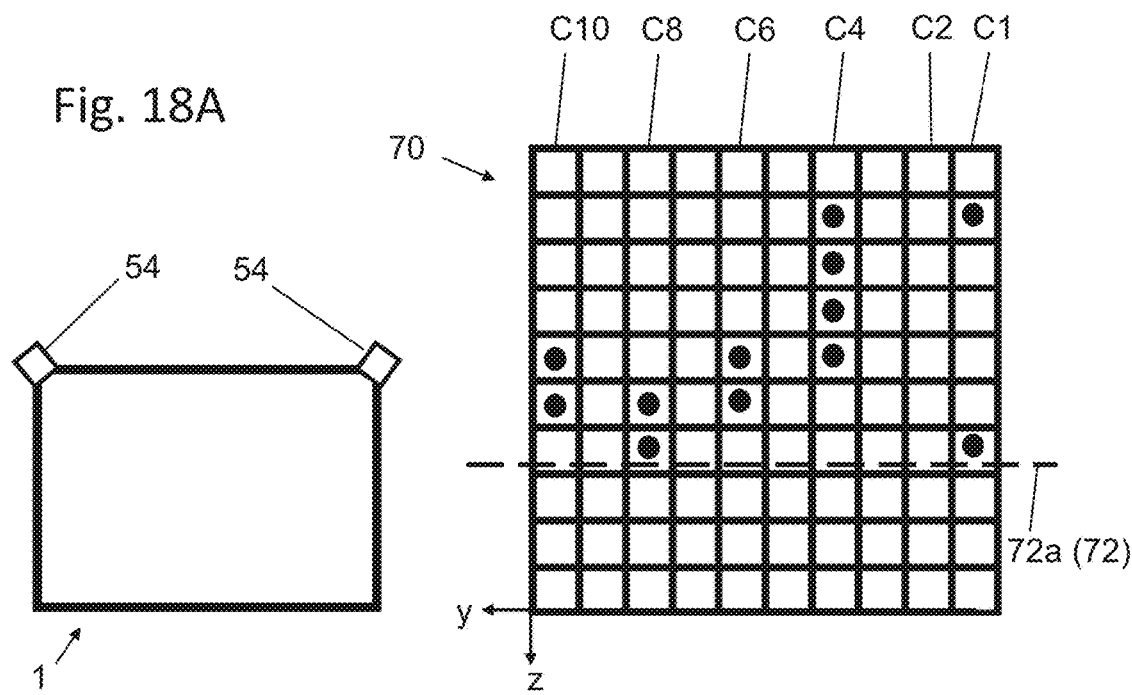
FIG. 18A is a side view of an example of a voxel grid according to a preferred embodiment of the present invention.
Figure 18B:
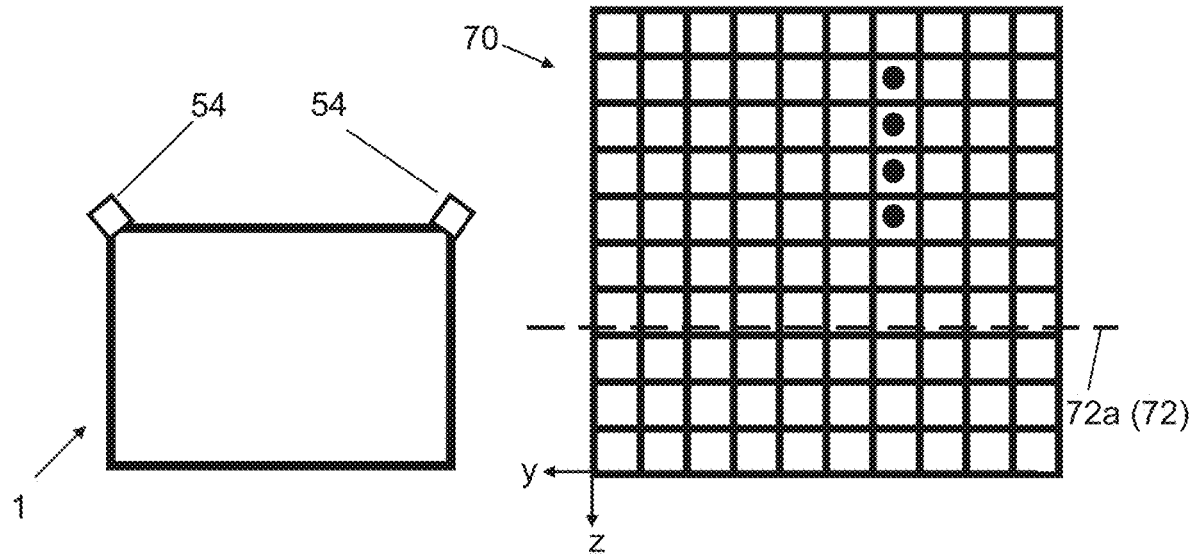
FIG. 18B is a side view of an example of a voxel grid according to a preferred embodiment of the present invention.

FIGS. 18A and 18B show an example of the object filter being applied to the individual voxel columns in accordance with the steps shown in FIG. 17. FIG. 18A shows a side view of the voxel grid 70 from FIG. 7 after the filter 72 has eliminated/removed activated voxels 701*a* from the voxel grid 70 by changing the activated voxels 701*a* located below the plane 72*a* in the z-direction of voxel grid 70 to empty/inactivated voxels 701. In step S17-1, the object filter identifies a particular voxel column within the voxel grid 70. For example, in step S17-1, the object filter can identify voxel column C1 shown in FIG. 18A as the particular voxel column. In step S17-2, the object filter determines whether or not there are any activated voxels 701*a* included in the particular voxel column identified in step S17-1. For example, in step S17-2, the object filter determines that there is at least one activated voxel 701*a* included in the voxel column C1 because voxel column C1 includes two activated voxels 701*a*. In step S17-3, the object filter determines a number of voxels (a distance) between the activated voxel with the largest value in the z-direction and the activated voxel with the smallest value in the z-direction within the particular voxel column. In step S17-4, the object filter determines whether or not the number of voxels determined in step S17-3 is less than a predetermined distance threshold. If, in step S17-4, the object filter determines that the number of voxels determined in step S17-3 is less than the predetermined distance threshold, then the process proceeds to step S17-6 in which the object filter eliminates/removes all of the activated voxels 701*a* included in the particular voxel column by changing the activated voxels 701*a* to empty/inactivated voxels 701. On the other hand, if the object filter determines that the number of voxels determined in step S17-3 is equal to or greater than the predetermined distance threshold, then the process proceeds to step S17-5. In the present example, in step S17-4, the object filter determines that the number of voxels of six determined in step S17-3 is equal to or greater than the predetermined distance threshold, so the process proceeds to step S17-5.

In step S17-5, the object filter determines whether or not there are any instances of consecutive voxels within the voxel column C1. In the present example, in step S17-5, the object filter determines that there is not at least one instance of consecutive activated voxels within the voxel column C1 because the only two activated voxels within the voxel column C1 are spaced apart from each other. Thus, the process proceeds to step S17-6 in which the object filter eliminates/removes all of the activated voxels 701*a* included in the particular voxel column C1 by changing the activated voxels 701*a* to empty/inactivated voxels 701. FIG. 18B shows a side view of the voxel grid 70 after the object filter has been applied to each of the individual voxel columns of the voxel grid 70 shown in FIG. 18A in accordance with the steps shown in FIG. 17 and when the predetermined distance threshold is set to three voxels.

In a preferred embodiment of the present invention, the example of the object filter discussed above with respect to FIGS. 17, 18A, and 18B can eliminate/remove activated voxels 701*a* that correspond to objects that the working machine 1 can easily pass through and for which the planned traveling route L should not be changed/updated. On the other hand, the activated voxels 701*a* that correspond to objects that are obstacles such as significant agricultural items, a person, or another object are maintained within the voxel grid 70. Additionally, by eliminating/removing all of the activated voxels 701*a* included in the particular voxel column when the object filter determines that there is not at least one instance of consecutive activated voxels within the voxel column in step S17-5 it is possible to eliminate/remove activated voxels 701*a* that correspond to two or more small objects such as agricultural items such as branches or vegetation that extend in front of the working machine 1 in a horizontal manner (e.g., intersect the planned traveling route L) and are spaced apart from each other in the vertical direction (z-direction), through which the working machine 1 can easily pass. In this way, the object filter is an example of a filter that filters the three-dimensional point cloud to eliminate/remove one or more data points corresponding to an object through which the working machine 1 can pass based on a vertical position of the one or more data points.

In preferred embodiments of the present invention discussed above, step S6-3 and step S6-4 include using a voxel grid 70 to process and filter the three-dimensional point cloud that was generated in step S6-2. However, in other preferred embodiments of the present invention discussed in more detail below, step S6-3 and step S6-4 can include filtering the three-dimensional point cloud that was generated in step S6-2 to eliminate/remove additional data points from the three-dimensional point cloud without use of a voxel grid. For example, in the other preferred embodiments of the present invention, in step S6-3, a filter 92 can be applied (e.g., directly applied) to the three-dimensional point cloud to filter the three-dimensional point cloud by removing data points of the three-dimensional point cloud, and in step S6-4 an object filter can be applied (e.g., directly applied) to the three-dimensional point cloud to filter the three-dimensional point cloud by removing data points of the three-dimensional point cloud.

In a preferred embodiment of the present invention, step S6-3 includes processing and filtering (e.g., directly filtering) the three-dimensional point cloud that was generated in step S6-2. FIG. 19 illustrates an example of a three-dimensional point cloud 90 that was generated in step S6-2, which includes data points that represent the objects and space surrounding a front portion of the working machine 1. As discussed above, the three-dimensional point cloud can include data points that represent the objects and space surrounding other portions, or an entirety of, the perimeter of the working machine 1. In FIG. 19, the three-dimensional point cloud 90 is shown overlaid a three-dimensional grid for ease of illustration. In a preferred embodiment, the three-dimensional point cloud 90 includes data points 901a that correspond to an object or a portion of an object such as an agricultural item, the ground, a person, another object, or a portion thereof.

In a preferred embodiment of the present invention, a filter 92 is applied to the three-dimensional point cloud 90 in step S6-3. The filter 92 eliminates/removes certain data points 901a from the three-dimensional point cloud 90. The filter 92 applied in step S6-3 can eliminate/remove certain data points 901a from the three-dimensional point cloud 90 by eliminating/removing the data points 901a located below the filter 92 in the z-direction of the three-dimensional point cloud 90 (a vertical direction of the three-dimensional point cloud 90). The filter 92 can be represented by a plane that is parallel to, and located a predetermined distance from, the bottom surface of the three-dimensional point cloud 90. For example, in FIG. 19, the filter 92 is represented by a plane 92a that is parallel to, and located a predetermined distance (e.g., about 0.3 meters or about 0.5 meters) from, the bottom surface of the three-dimensional point cloud 90. For example, each cube included in the three-dimensional grid, on which the three-dimensional point cloud 90 is overlaid in FIG. 19 for ease of illustration, can be about 0.1 meters.

Figure 20A:
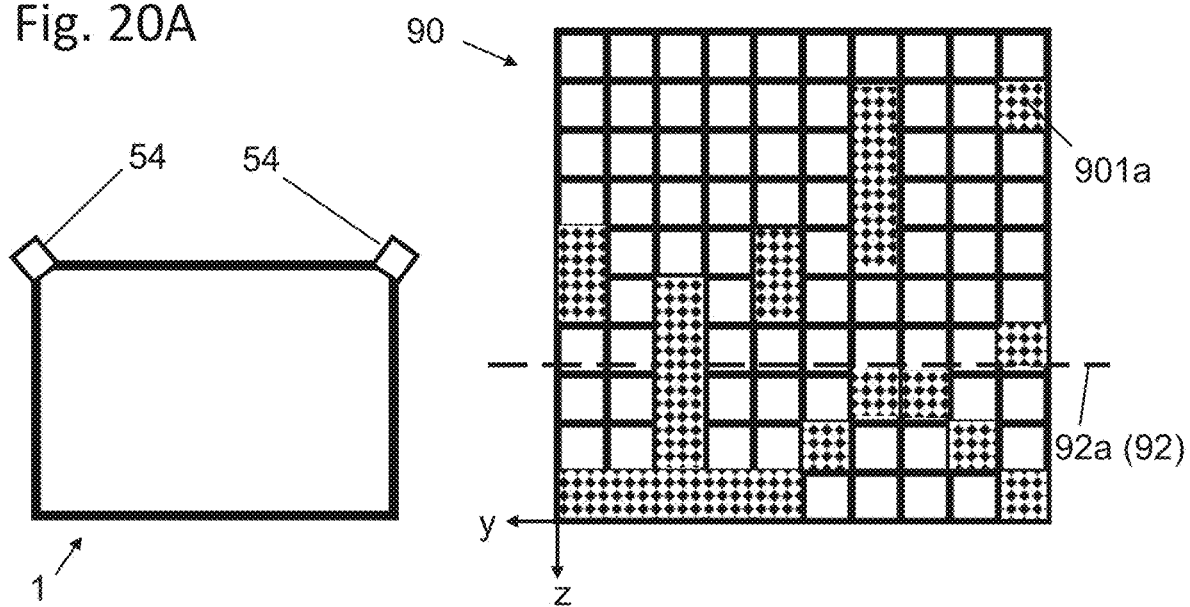
FIG. 20A is a side view of an example of a three-dimensional point cloud according to a preferred embodiment of the present invention.
Figure 20B:
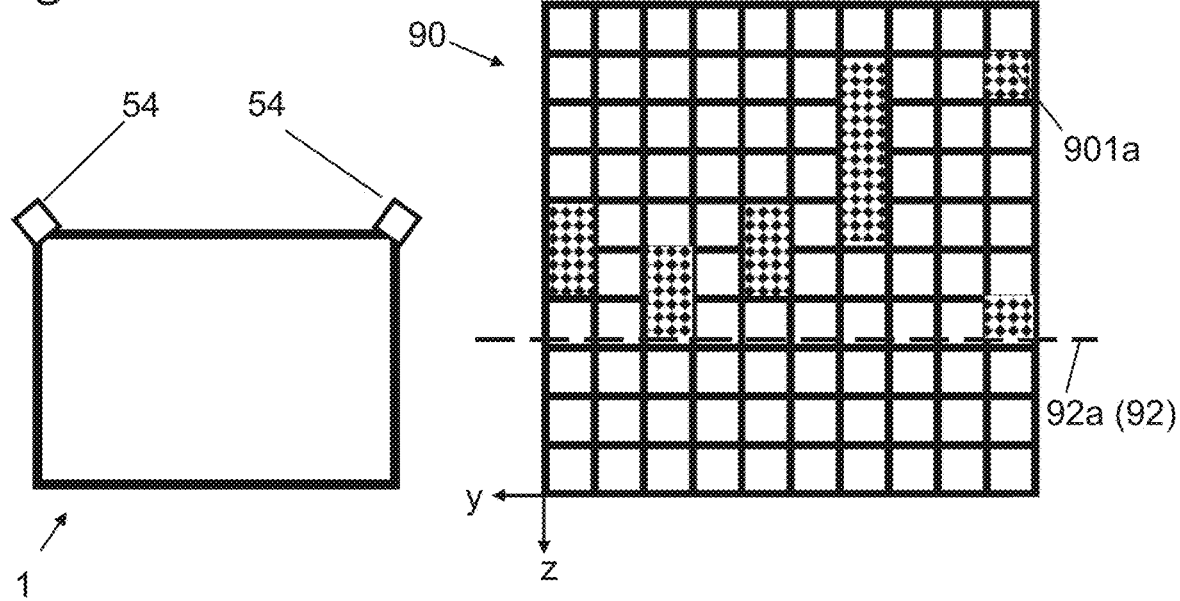
FIG. 20B is a side view of an example of a three-dimensional point cloud according to a preferred embodiment of the present invention.

FIG. 20A is a side view that shows an example of the three-dimensional point cloud 90 generated in step S6-2. That is, FIG. 20A shows a side view of the three-dimensional point cloud 90 from FIG. 19 before the filter 92 has eliminated/removed any data points 901a from the three-dimensional point cloud 90. FIG. 20B is a side view that shows the three-dimensional point cloud 90 after the filter 92 has eliminated/removed data points 901a from the three-dimensional point cloud 90. More specifically, FIG. 20B shows an example in which the filter 92 has eliminated/removed data points 901a from the three-dimensional point cloud 90 by eliminating/removing the data points 901a located below the plane 92a in the z-direction of the three-dimensional point cloud 90.

The filter 92 is not limited to being represented by a plane that is parallel to the bottom surface of the three-dimensional point cloud 90. For example, the filter 92 can be represented by an inclined plane 92b that starts from a point located on or adjacent to the working machine 1 and that increases at a predetermined slope away from the point located on or adjacent to the working machine 1. For example, as shown in FIG. 19, the filter 92 can be represented by an inclined plane 92b that starts from a point that is located at a bottom surface of the work machine 1 and that increases at a predetermined slope away from the point.

FIG. 21A is a side view that shows an example of the three-dimensional point cloud 90 when the filter 92 is represented by an inclined plane 92b. That is, FIG. 21A shows a side view of the three-dimensional point cloud 90 from FIG. 19 before the filter 92 has eliminated/removed any data points 901a. FIG. 21B is a side view that shows the three-dimensional point cloud 90 after the filter 92 has eliminated/removed data points 901a. More specifically, FIG. 21B shows an example in which the filter 92 has eliminated/removed data points 901a from the three-dimensional point cloud 90 by eliminating/removing the data points through which the plane 92b extends, and the data points 901a which are located below the plane 92b in the z-direction of the three-dimensional point cloud 90. Alternatively, the filter 92 may not eliminate/remove the data points 901a through which the plane 92b extends, and only eliminate/remove the data points 901a which are located below the plane 92b in the z-direction of the three-dimensional point cloud 90.

In the examples discussed above, the filter 92 represented by the plane 92a eliminates/removes data points 901a located below the plane 92a in the z-direction of the three-dimensional point cloud 90, and the filter 92 represented by the inclined plane 92b eliminates/removes data points 901a through which plane 92b extends and which are located below the plane 92b in the z-direction of the three-dimensional point cloud 90. In this way, in step S6-3, the filter 92 represented by the plane 92a or the filter 92 represented by the inclined plane 92b can eliminate/remove data points 901a that correspond to portions of the ground surrounding the working machine 1 and/or small agricultural items located on the ground surrounding the working machine 1. Therefore, in step S6-3, the data points of the three-dimensional point cloud that correspond to portions of the ground surrounding the working machine 1 and/or small agricultural items located on the ground surrounding the working machine 1 are eliminated/removed from the three-dimensional point cloud.

In another preferred embodiment, the filter 92 can eliminate/remove data points 901a located above a plane 92a in the z-direction of the three-dimensional point cloud 90, or eliminate/remove data points through which a plane 92b extends and which are located above the plane 92b in the z-direction of the three-dimensional point cloud 90. In this way, based on the location of the plane 92a or the plane 92b in the z-direction of the three-dimensional point cloud 90, in step S6-3, the filter 92 represented by the plane 92a or the inclined plane 92b can eliminate/remove data points 901a that correspond to portions of a canopy or other agricultural items above the working machine 1.

In another preferred embodiment, more than one filter 92 can be used to eliminate/remove data points 901a from the three-dimensional point cloud 90. For example, a first filter 92 can be used to eliminate/remove data points 901a located below a first plane 92a1 in the z-direction of the three-dimensional point cloud 90, and a second filter 92 can be used to eliminate/remove data points 901a located above a second plane 92a2 in the z-direction of the three-dimensional point cloud 90. FIG. 22A is a side view that shows an example of the three-dimensional point cloud 90 from FIG. 19 generated based on the filtered three-dimensional point cloud that was generated in step S6-2, and FIG. 22B is a side view that shows the three-dimensional point cloud 90 after the first filter 92a1 (92) and the second filter 92a2 (92) have been used to eliminate/remove data points 901a.

In a preferred embodiment of the present invention, step S6-4 includes applying an object filter to the three-dimensional point cloud 90. For example, step S6-4 includes applying an object filter to the three-dimensional point cloud 90 after step S6-3 has been completed. The object filter eliminates/removes certain data points 901a from the three-dimensional point cloud 90.

In a preferred embodiment of the present invention, the object filter is applied to an individual point cloud column that extends in the z-direction of the three-dimensional point cloud 90. For example, the object filter is applied to an individual point cloud column such as point cloud column PC1, point cloud column PC2, and point cloud column PC3, shown in FIG. 19. In a preferred embodiment, each of the point cloud columns extends in the z-direction of the three-dimensional point cloud 90 and can be defined by x-coordinates (e.g., a range of x-coordinates) and y-coordinates (e.g., a range of y-coordinates) of the three-dimensional point cloud 90. For example, in the example shown in FIG. 19, the point cloud column PC1 extends in the z-direction of the three-dimensional point cloud 90 and can be defined by x-coordinates (e.g., a starting point and an ending point of the point cloud column PC1 in the x-direction) and y-coordinates (a starting point and an ending point of the point cloud column PC1 in the y-direction) of the three-dimensional point cloud 90. For example, the point cloud column PC1 in FIG. 19 can be square-shaped or substantially square-shaped and extend 0.1 meters in the x-direction of the three-dimensional point cloud 90 and extend 0.1 meters in the y-direction of the three-dimensional point cloud 90. However, the point cloud columns can be sized and shaped differently. For example, the point cloud columns can extend about 0.3 or 0.5 meters in the x-direction of the three-dimensional point cloud 90 and extend 0.3 or 0.5 meters in the y-direction of the three-dimensional point cloud 90.

Figure 23:
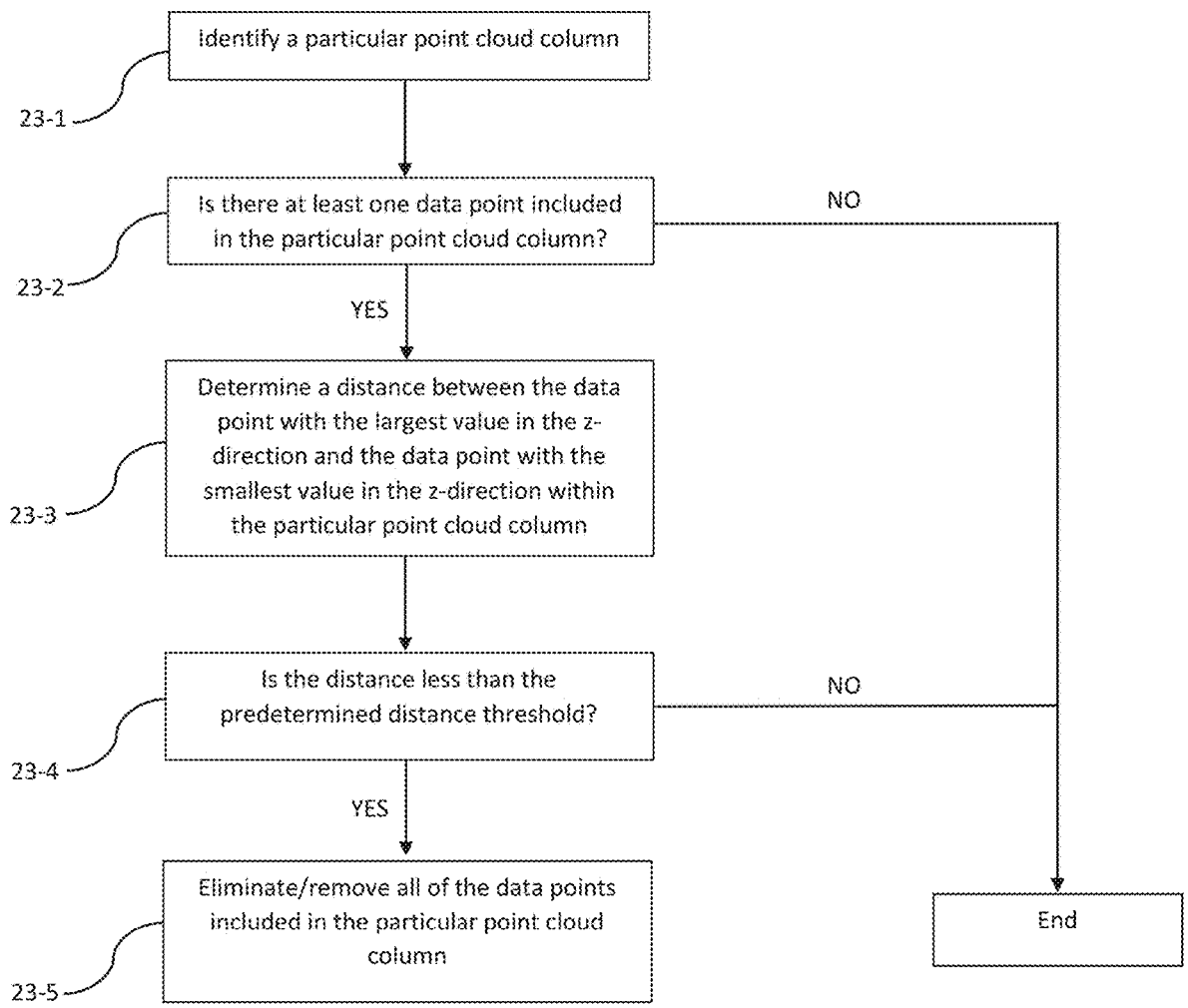
FIG. 23 is a flowchart showing a process performed according to a preferred embodiment of the present invention.

FIG. 23 is a flowchart that shows steps that can be performed by the object filter during step S6-4. In step S23-1, the object filter identifies a particular point cloud column included in the three-dimensional point cloud 90. For example, in step S23-1, the object filter can identify point cloud column PC1 as the particular point cloud column.

In step S23-2, the object filter determines whether or not there are any data points 901a included in the particular point cloud column identified in step S23-1. If, in step S23-2, the object filter determines that there are no data points 901a included in the particular point cloud column identified in step S23-1, then the process ends. If, on the other hand, the object filter determines that there is at least one data point 901a included in the particular point cloud column identified in step S23-1, then the process proceeds to step 23-3. In step S23-3, the object filter determines a distance between the data point with the largest value in the z-direction (largest vertical position) and the data point with the smallest value in the z-direction (smallest vertical position) within the particular point cloud column. In step S23-3, if the object filter determines that there is a single data point 901a included in the particular point cloud column, then the object filter interprets the distance between the data point with the largest value in the z-direction and the data point with the smallest value in the z-direction within the particular voxel column as being a value less than a predetermined distance threshold (discussed in more detail below).

In step S23-4, the object filter determines whether or not the distance determined in step S23-3 is less than a predetermined distance threshold. In a preferred embodiment, the predetermined distance threshold can be a predetermined distance, such as 0.3 meters, for example. If the object filter determines that the distance determined in step S23-3 is equal to or greater than the predetermined distance threshold, then the process ends. If, on the other hand, the object filter determines that the distance determined in step S23-3 is less than the predetermined distance threshold, then the process proceeds to step S23-5. In step S23-5, the object filter eliminates/removes all of the data points 901a included in the particular point cloud column.

As mentioned above, the object filter is applied to the individual point cloud columns that extend in the z-direction of the three-dimensional point cloud 90. Examples of the object filter being applied to individual point cloud columns will be discussed in more detail below.

Figure 24A:
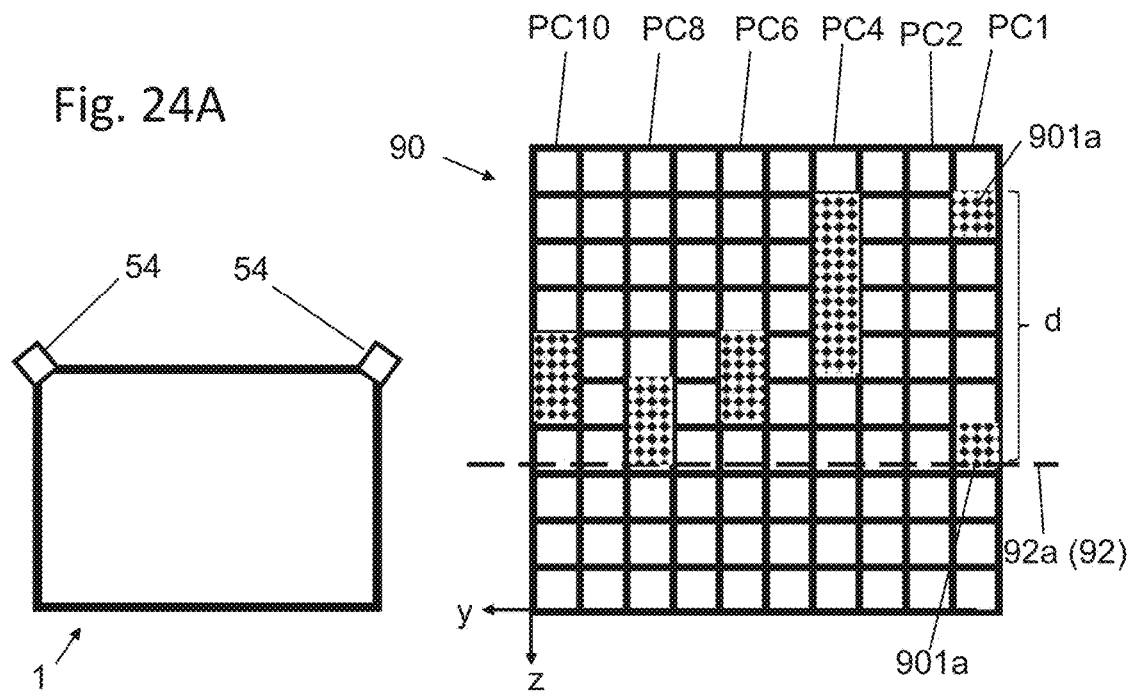
FIG. 24A is a side view of an example of a three-dimensional point cloud according to a preferred embodiment of the present invention.

FIG. 24A shows a side view of the three-dimensional point cloud 90 from FIG. 19 after the filter 92 has eliminated/removed data points 901a from the three-dimensional point cloud 90 by eliminating/removing the data points 901a located below the plane 92a in the z-direction of the three-dimensional point cloud 90. In a first example, in step S23-1, the object filter identifies a particular point cloud column within the three-dimensional point cloud 90. For example, in step S23-1, the object filter can identify point cloud column PC1 shown in FIG. 19 and FIG. 24A as the particular point cloud column. In step S23-2, the object filter determines whether or not there are any data points 901a included in the particular point cloud column identified in step S23-1. For example, in step S23-2, the object filter determines that there is at least one data point 901a included in the point cloud column PC1. In step S23-3, the object filter determines a distance d between the data point 901a with the largest value in the z-direction (the highest data point) and the data point 901a with the smallest value in the z-direction (the lowest data point) within the point cloud column PC1. For example, in step S23-3, the object filter determines that the distance d between the data point with the largest value in the z-direction and the data point with the smallest value in the z-direction within the point cloud column PC1 is 0.6 meters (including the highest data point and the lowest data point). In step S23-4, the object filter determines whether or not the distance determined in step S23-3 is less than the predetermined distance threshold. If the object filter determines that the distance determined in step S23-3 is equal to or greater than the predetermined distance threshold, then the process ends. If, on the other hand, the object filter determines that the distance determined in step S23-3 is less than the predetermined distance threshold, then the process proceeds to step S23-5. In the present example, if the predetermined distance threshold is set to 0.3 meters, then the object filter determines that the distance of 0.6 meters determined in step S23-3 is equal to or greater than the predetermined distance threshold of 0.3 meters, and the process ends.

In a second example, in step S23-1, the object filter can identify point cloud column PC2 shown in FIG. 24A as the particular point cloud column. In step S23-2, the object filter determines whether or not there are any data points 901a included in the particular point cloud column identified in step S23-1. For example, in step S23-2, the object filter determines that there is not at least one data point 901a included in point cloud column PC2, and the process ends.

In a third example, in step S23-1, the object filter can identify point cloud column PC4 shown in FIG. 24A as the particular point cloud column. In step S23-2, the object filter determines whether or not there are any data points 901a included in the particular point cloud column identified in step S23-1. For example, in step S23-2, the object filter determines that there is at least one data point 901a included in point cloud column PC4. In step S23-3, the object filter determines a distance between the data point with the largest value in the z-direction (the highest data point) and the data point with the smallest value in the z-direction (the lowest data point) within the point cloud column PC4. For example, in step S23-3, the object filter determines that the distance between the data point with the largest value in the z-direction and the data point with the smallest value in the z-direction within the point cloud column PC4 is 0.4 meters. In step S23-4, the object filter determines whether or not the distance determined in step S23-3 is less than the predetermined distance threshold. If the object filter determines that the distance determined in step S23-3 is equal to or greater than the predetermined distance threshold, then the process ends. If, on the other hand, the object filter determines that the distance determined in step S23-3 is less than the predetermined distance threshold, then the process proceeds to step S23-5. In the present example, if the predetermined distance threshold is set to 0.3 meters, then the object filter determines that the distance of 0.4 meters determined in step S23-3 is equal to or greater than the predetermined distance threshold of 0.3 meters, and the process ends.

In a fourth example, in step S23-1, the object filter can identify point cloud column PC6 shown in FIG. 24A as the particular point cloud column. In step S23-2, the object filter determines whether or not there are any data points 901a included in the particular point cloud column identified in step S23-1. For example, in step S23-2, the object filter determines that there is at least one data point 901a included in point cloud column PC6. In step S23-3, the object filter determines a distance between the data point with the largest value in the z-direction (the highest data point) and the data point with the smallest value in the z-direction (the lowest data point) within the point cloud column PC6. For example, in step S23-3, the object filter determines that the distance between the data point with the largest value in the z-direction and the data point with the smallest value in the z-direction within the point cloud column PC6 is 0.2 meters. In step S23-4, the object filter determines whether or not the distance determined in step S23-3 is less than the predetermined distance threshold. If the object filter determines that the distance determined in step S23-3 is equal to or greater than the predetermined distance threshold, then the process ends. If, on the other hand, the object filter determines that the distance determined in step S23-3 is less than the predetermined distance threshold, then the object filter eliminates/removes all of the data points 901a included in the particular point cloud column in step S23-5. In the present example, if the predetermined distance threshold is set to 0.3 meters, then the object filter determines that the distance of 0.2 meters determined in step S23-3 is less than the predetermined distance threshold of 0.3 meters. Therefore, in step S23-5, the object filter eliminates/removes all of the data points 901a included in the point cloud column PC6.

Figure 24B:
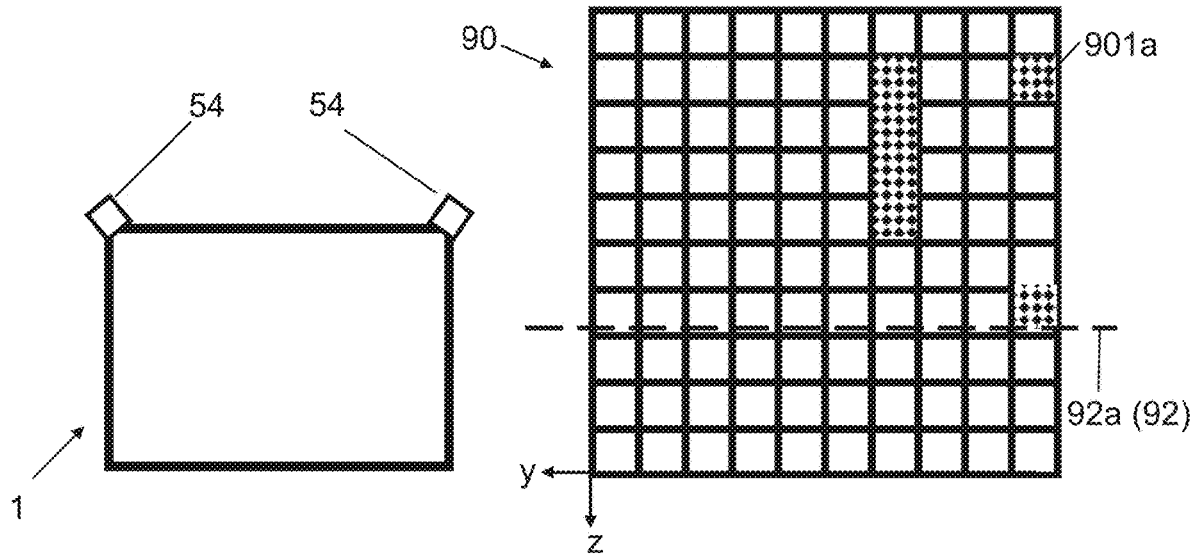
FIG. 24B is a side view of an example of a three-dimensional point cloud according to a preferred embodiment of the present invention.

FIG. 24B shows a side view of the three-dimensional point cloud 90 after the object filter has been applied to each of the individual point cloud columns of the three-dimensional point cloud 90 shown in FIG. 24A to eliminate/remove certain data points 901a from the three-dimensional point cloud 90 in step 6-4 when the predetermined distance threshold is set to 0.3 meters. As discussed above, the object filter is applied to an individual point cloud column that extends in the z-direction of the three-dimensional point cloud 90. In a preferred embodiment, the object filter can be applied to more than one of the individual point cloud columns of the three-dimensional point cloud 90 in parallel/simultaneously. For example, the object filter can be applied to each of the individual point cloud columns of the three-dimensional point cloud 90 in parallel/simultaneously. Alternatively, the object filter can be applied to the individual point cloud columns of the three-dimensional point cloud 90 in series or in groups of point cloud columns.

Additional examples of the object filter being applied to point cloud columns in step 6-4 will be discussed below with respect to FIGS. 25 and 26.

Figure 25A:
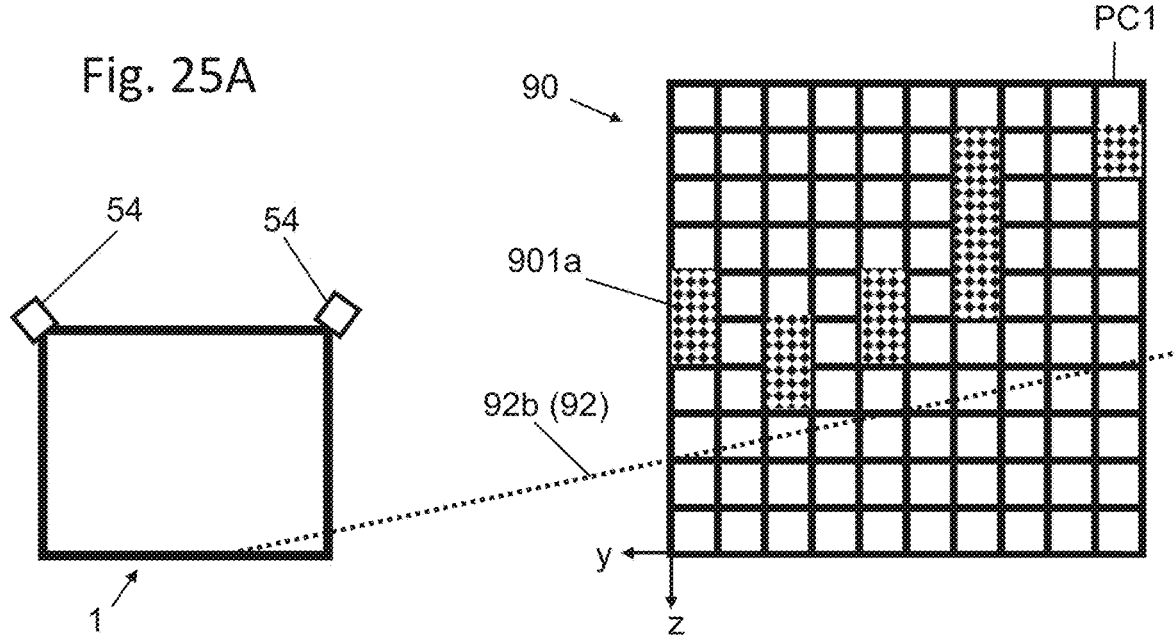
FIG. 25A is a side view of an example of a three-dimensional point cloud according to a preferred embodiment of the present invention.
Figure 25B:
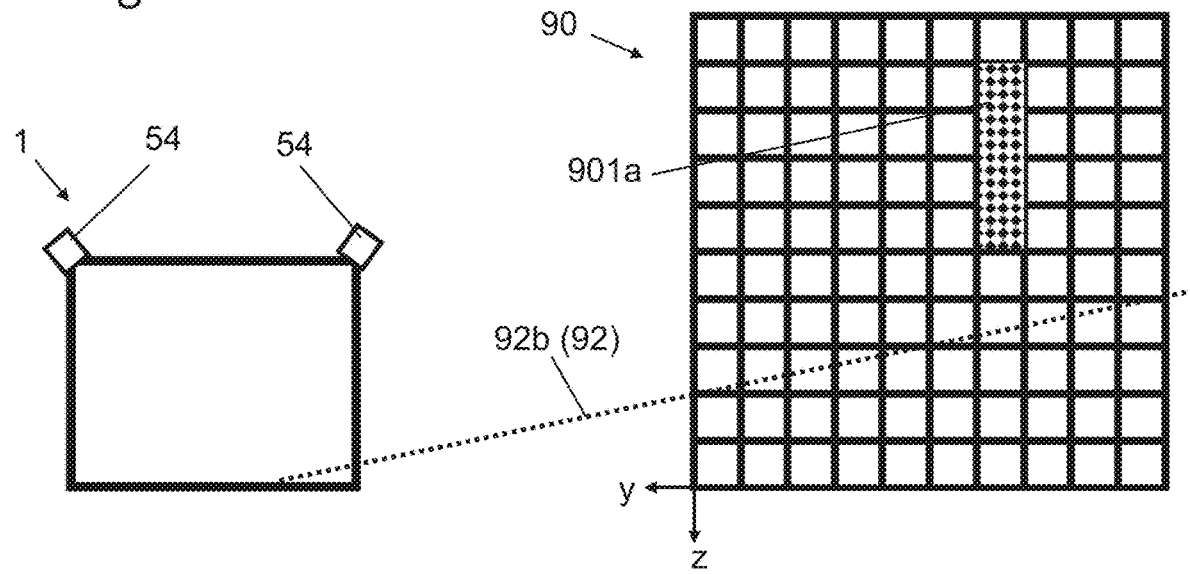
FIG. 25B is a side view of an example of a three-dimensional point cloud according to a preferred embodiment of the present invention.

FIG. 25A shows a side view of the three-dimensional point cloud 90 from FIG. 19 after the filter 92 has eliminated/removed data points 901a from the three-dimensional point cloud 90 by changing the data points 901a located below the plane 92b in the z-direction of the three-dimensional point cloud 90 in step S6-3. FIG. 25B shows a side view of the three-dimensional point cloud 90 after step S6-4 in which the object filter has been applied to each of the individual point cloud columns of the three-dimensional point cloud 90 shown in FIG. 25A to eliminate/remove data points 901a from the three-dimensional point cloud 90 when the predetermined distance threshold is set to 0.3 meters.

FIG. 26A shows a side view of the three-dimensional point cloud 90 from FIG. 19 after the first filter 92 has eliminated/removed data points 901a located below a first plane 92a1 in the z-direction of the three-dimensional point cloud 90, and a second filter 92 has eliminated/removed data points 901a located above a second plane 92a2 in the z-direction of the three-dimensional point cloud 90. FIG. 26B shows a side view of the three-dimensional point cloud 90 after step S6-4 in which the object filter has been applied to each of the individual point cloud columns of the three-dimensional point cloud 90 shown in FIG. 26A to eliminate/remove certain data points 901a from the three-dimensional point cloud 90 when the predetermined distance threshold is set to 0.3 meters.

In a preferred embodiment of the present invention, the object filter can eliminate/remove data points 901a from the three-dimensional point cloud 90 that correspond to objects that the working machine 1 can pass through (e.g., pass through or over) and for which the planned traveling route L should not be changed/updated. For example, the examples of the object filter discussed above can eliminate/remove data points 901a that correspond to objects such as small agricultural items (e.g., branches or vegetation) that extend in front of the working machine 1 in a horizontal manner (e.g., intersect the planned traveling route L) but through which the working machine 1 can easily pass. On the other hand, the data points 901a that correspond to objects that are obstacles such as significant agricultural items, a person, or another non-passable objects are maintained within the three-dimensional point cloud 90.

Therefore, in step S6-4, the data points of the three-dimensional point cloud that correspond to objects that the working machine 1 can pass through and for which the planned traveling route L should not be changed/updated are eliminated/removed from the three-dimensional point cloud when the data points 901a are eliminated/removed from the three-dimensional point cloud 90, and the data points of the three-dimensional point cloud that correspond to objects that are obstacles such as significant agricultural items, a person, or another non-passable objects are maintained within the three-dimensional point cloud 90. In this way, the object filter is an example of a filter that filters the three-dimensional point cloud to eliminate/remove one or more data points corresponding to an object through which the working machine 1 can pass based on a vertical position of the one or more data points.

Figure 27:
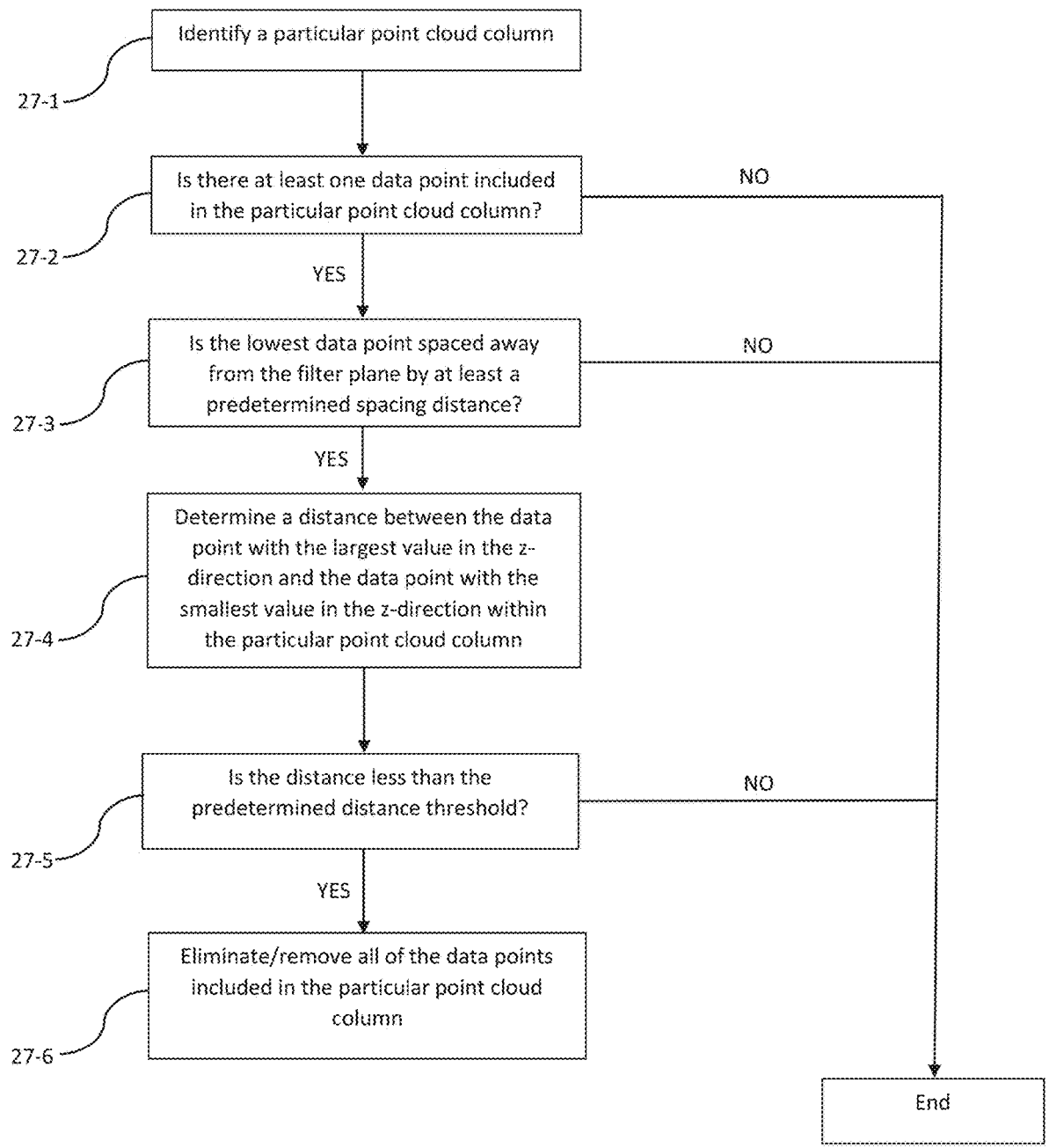
FIG. 27 is a flowchart showing a process performed according to a preferred embodiment of the present invention.

In a preferred embodiment of the present invention, the steps performed by the object filter during step S6-4 can be changed or modified from the steps shown in FIG. 23. For example, FIG. 27 is a flowchart that shows a first modification to the steps shown in FIG. 23, which are performed by the object filter during step S6-4. More specifically, FIG. 27 shows that the object filter is able to perform an additional step, step S27-3. The steps included in FIG. 27 other than step S27-3 are the same as the steps included in FIG. 23.

In step S27-3, the object filter determines whether or not the lowest data point in the point cloud column is spaced away from the filter 92 used to filter the three-dimensional point cloud 90 in step S6-3 by at least a predetermined spacing distance (e.g., 0.1 meters). For example, the object filter determines whether or not the lowest data point in the point cloud column is spaced away from the plane 92a used to filter the three-dimensional point cloud 90 in step S6-3 by at least a predetermined spacing distance. If the lowest data point in the point cloud column is not spaced away from the filter 92 used to filter the three-dimensional point cloud 90 in step S6-3 by at least the predetermined spacing distance, then the process ends. If, on the other hand, the lowest data point in the point cloud column is spaced away from the filter 92 used to filter the three-dimensional point cloud 90 in step S6-3 by at least the predetermined spacing distance, then the process proceeds to step S27-4.

Figure 28A:
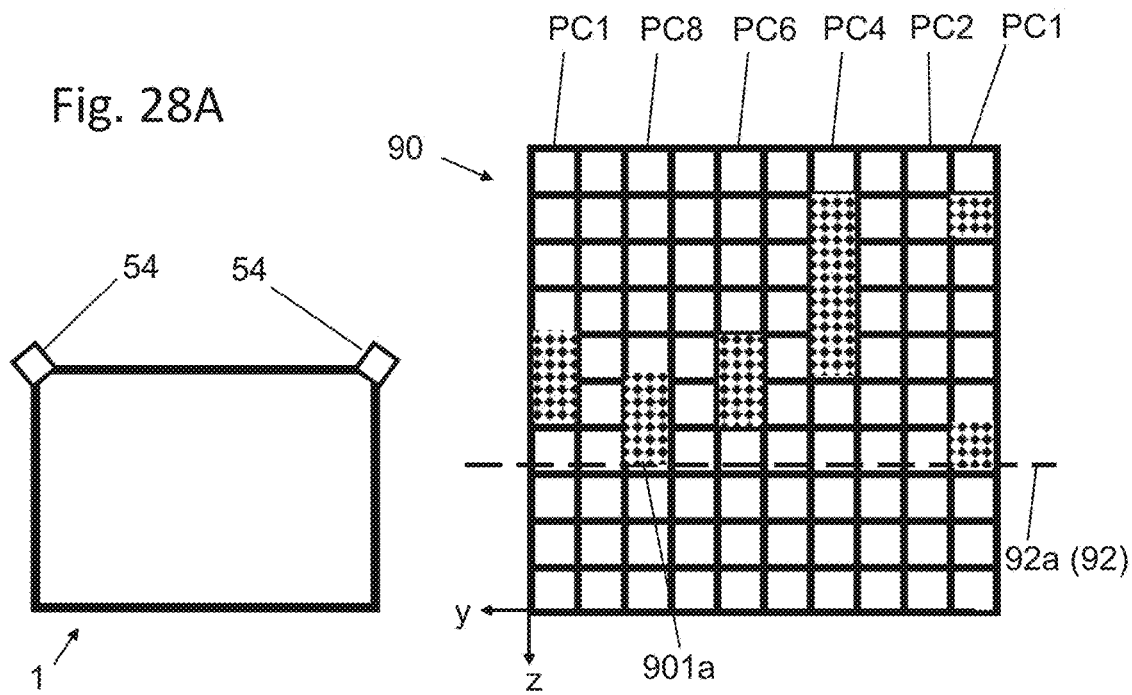
FIG. 28A is a side view of an example of a three-dimensional point cloud according to a preferred embodiment of the present invention.
Figure 28B:
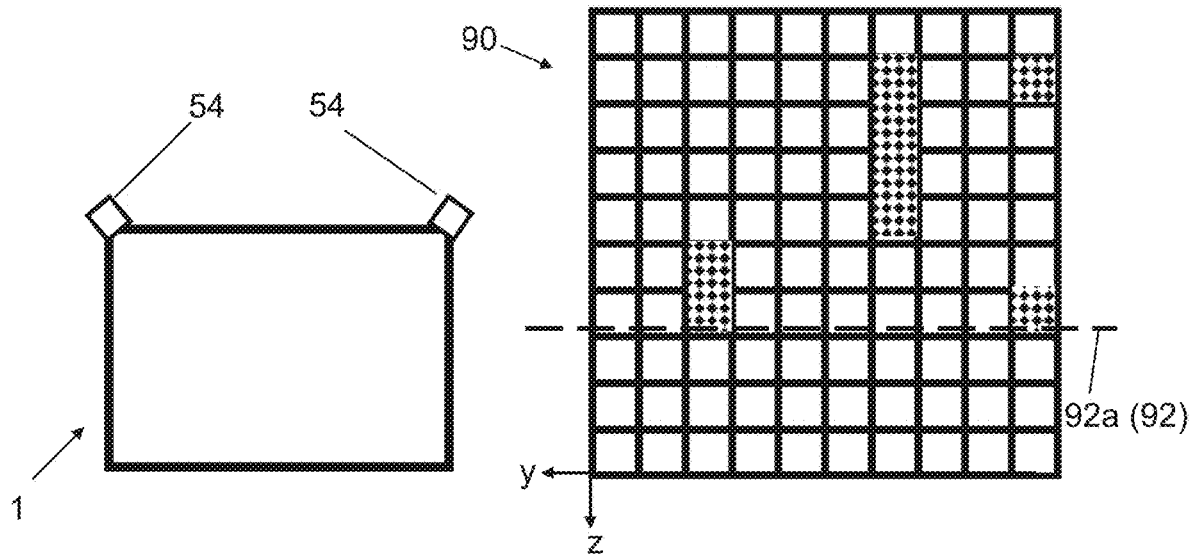
FIG. 28B is a side view of an example of a three-dimensional point cloud according to a preferred embodiment of the present invention.

FIGS. 28A and 28B show an example of the object filter being applied to individual point cloud columns in accordance with the steps shown in FIG. 27. FIG. 28A shows a side view of the three-dimensional point cloud 90 from FIG. 19 after the filter 92 has eliminated/removed data points 901a from the three-dimensional point cloud 90 by eliminating/removing the data points 901a located below the plane 92a in the z-direction of the three-dimensional point cloud 90. In step S27-1, the object filter identifies a particular point cloud column within the three-dimensional point cloud 90. For example, in step S27-1, the object filter can identify point cloud column PC8 shown in FIG. 28A as the particular point cloud column. In step S27-2, the object filter determines whether or not there are any data points 901a included in the particular point cloud column identified in step S27-1. For example, in step S27-2, the object filter determines that there is at least one data point 901a included in the point cloud column PC8. In step S27-3, the object filter determines whether or not the lowest data point in the point cloud column is spaced away from the filter 92 that was used to filter the three-dimensional point cloud 90 in step S6-3 by at least the predetermined spacing distance. For example, the object filter determines whether or not the lowest data point in the point cloud column is spaced away from the plane 92a that was used to filter the three-dimensional point cloud 90 in step S6-3 by at least the predetermined spacing distance. In the present example, as shown in FIG. 28A, the lowest data point 901a in the point cloud column PC8 is not spaced away from the filter 92 (plane 92a) used to filter the three-dimensional point cloud 90 in step S6-3 by at least the predetermined spacing distance (e.g., 0.1 meters) because the lowest data point in the point cloud column PC8 is adjacent to the filter 92 (plane 92a), so the process ends. However, if the lowest data point in the point cloud column PC8 had been spaced away from the filter 92 used to filter the three-dimensional point cloud 90 in step S6-3 by at least the predetermined spacing distance, then the process would have proceeded to step S27-4. FIG. 28B shows a side view of the three-dimensional point cloud 90 after the object filter has been applied to each of the point cloud columns of the three-dimensional point cloud 90 shown in FIG. 28A in accordance with the steps shown in FIG. 27 and when the predetermined spacing distance is set to 0.1 meter (one cube on the grid shown in FIG. 28A).

In a preferred embodiment of the present invention, the example of the object filter discussed above with respect to FIGS. 27, 28A, and 28B can eliminate/remove data points 901a that correspond to objects that the working machine 1 can easily pass through and for which the planned traveling route L should not be changed/updated. On the other hand, the data points 901a that correspond to objects that are obstacles such as significant agricultural items, a person, or another object are maintained within the three-dimensional point cloud 90. Additionally, by ending the process and not eliminating/removing data points 901a from the point cloud column when the lowest data point in the point cloud column is not spaced away from the filter 92 used to filter the three-dimensional point cloud 90 in step S6-3 by at least the predetermined spacing distance, the data points 901a that are more likely to correspond to an object that is connected to the ground are maintained within the three-dimensional point cloud 90 because they are more likely to correspond to objects that are obstacles such as a significant agricultural items, a person, or another non-passable objects connected to the ground. In this way, data points 901a that are more likely to correspond to an object that is connected to the ground, and thus should not be passed through or over by the working machine 1, are maintained within the three-dimensional point cloud 90. In this way, the object filter is an example of a filter that filters the three-dimensional point cloud to eliminate/remove one or more data points corresponding to an object through which the working machine 1 can pass based on a vertical position of the one or more data points.

Figure 29:
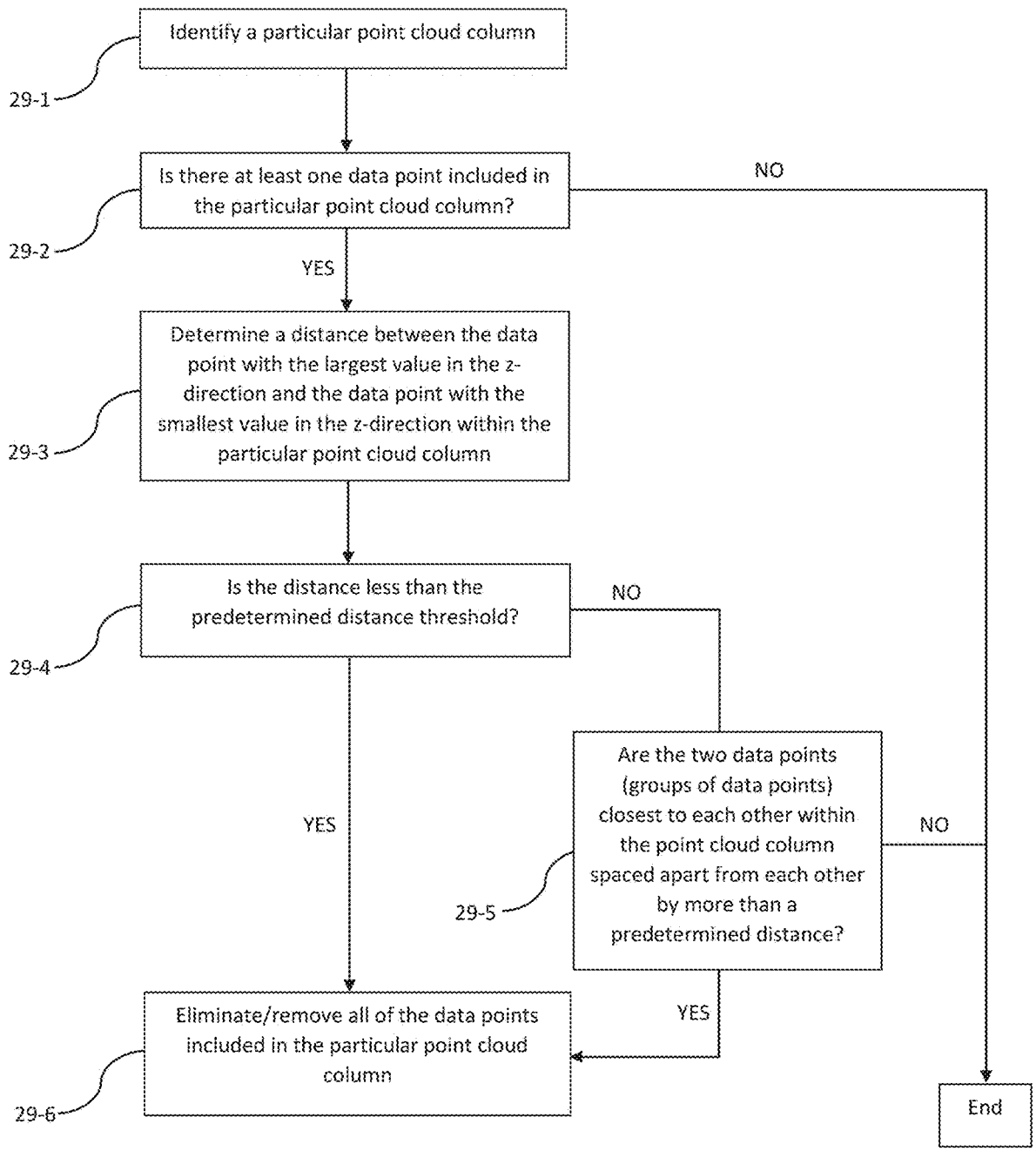
FIG. 29 is a flowchart showing a process performed according to a preferred embodiment of the present invention.

In a preferred embodiment of the present invention, the steps performed by the object filter during step S6-4 can be changed or modified from the steps shown in FIG. 23. For example, FIG. 29 is a flowchart that shows a second modification to the steps shown in FIG. 23, which are performed by the object filter during step S6-4. More specifically, FIG. 29 shows that the object filter is able to perform an additional step, step S29-5. The steps included in FIG. 29 other than step S29-5 are the same as the steps included in FIG. 23.

If the distance determined in step 29-4 is equal to or greater than the predetermined distance threshold, then in step S29-5, the object filter determines whether or not the two data points closest to each other within the point cloud column (or two groups of data points closest to each other within the point cloud column) are spaced apart from each other by more than a predetermined distance. As discussed in more detail below, a first group of data points and a second group of data points can be defined/identified based on a density level of data points 901a within a predetermined volume (e.g., 0.1 cubic meters).

If, in step S29-5, the object filter determines that the two data points closest to each other within the point cloud column (or two groups of data points closest to each other within the point cloud column) are not spaced apart from each other by more than a predetermined distance (e.g., 0.1 meters or 0.2 meters) then the process ends. On the other hand, if, in step S29-5, the object filter determines that the two data points closest to each other within the point cloud column (or two groups of data points closest to each other within the point cloud column) are spaced apart from each other by more than a predetermined distance, then the process proceeds to step S29-6 in which the object filter eliminates/removes all of the data points 901a included in the particular point cloud column by eliminating/removing the data points 901a from the three-dimensional point cloud 90.

Figure 30A:
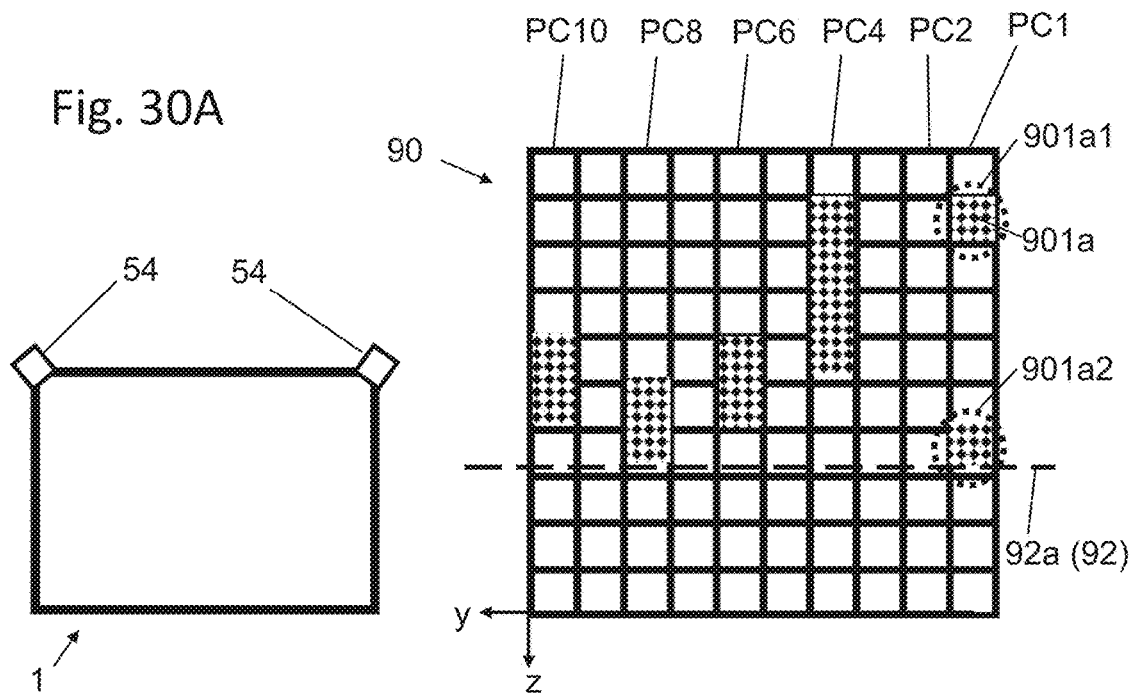
FIG. 30A is a side view of an example of a three-dimensional point cloud according to a preferred embodiment of the present invention.
Figure 30B:
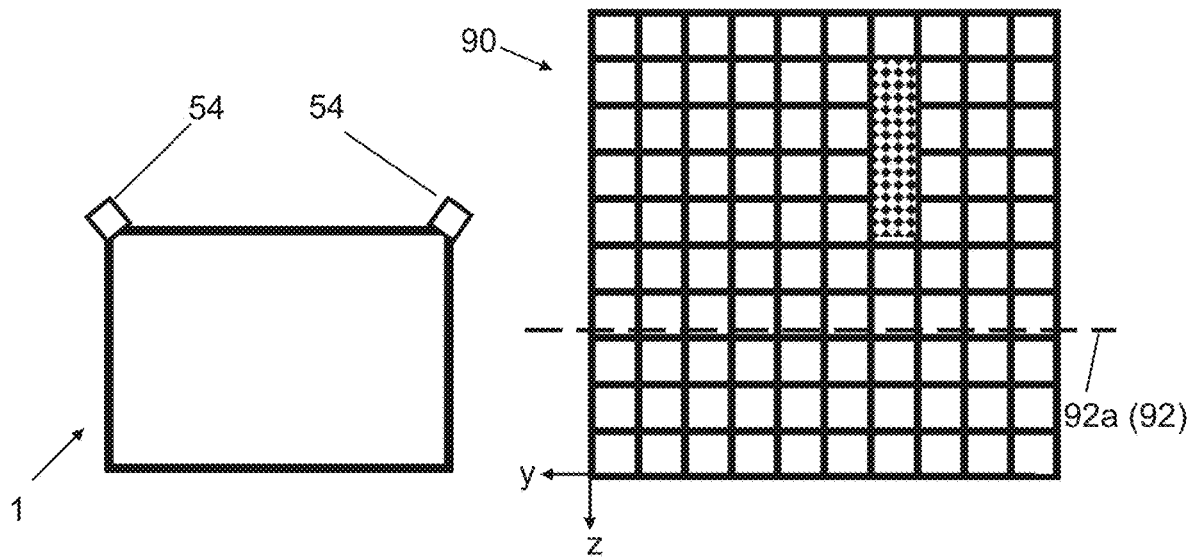
FIG. 30B is a side view of an example of a three-dimensional point cloud according to a preferred embodiment of the present invention.

FIGS. 30A and 30B show an example of the object filter being applied to the individual point cloud columns in accordance with the steps shown in FIG. 29. FIG. 30A shows a side view of the three-dimensional point cloud 90 from FIG. 19 after the filter 92 has eliminated/removed data points 901a from the three-dimensional point cloud 90 by eliminating/removing the data points 901a located below the plane 92a in the z-direction of the three-dimensional point cloud 90. In step S29-1, the object filter identifies a particular point cloud column within the three-dimensional point cloud 90. For example, in step S29-1, the object filter can identify point cloud column PC1 shown in FIG. 30A as the particular point cloud column. In step S29-2, the object filter determines whether or not there are any data points 901a included in the particular point cloud column identified in step S29-1. For example, in step S29-2, the object filter determines that there is at least one data point 901a included in the point cloud column PC1. In step S29-3, the object filter determines a distance between the data point with the largest value in the z-direction and the data point with the smallest value in the z-direction within the particular point cloud column. In step S29-4, the object filter determines whether or not the distance determined in step S29-3 is less than a predetermined distance threshold. If, in step S29-4, the object filter determines that the distance determined in step S29-3 is less than the predetermined distance threshold, then the process proceeds to step S29-6 in which the object filter eliminates/removes all of the data points 901a included in the particular point cloud column. On the other hand, if the object filter determines that the distance determined in step S29-3 is equal to or greater than the predetermined distance threshold, then the process proceeds to step S29-5. In the present example, in step S29-4, the object filter determines that the distance of 0.6 meters determined in step S29-3 is equal to or greater than the predetermined distance threshold, so the process proceeds to step S29-5.

In step S29-5, the object filter determines whether or not the two data points closest to each other within the point cloud column PC1 (or two groups of data points closest to each other within the point cloud column PC1) are spaced apart from each other by more than a predetermined distance (e.g., 0.2 meters). In the example shown in FIG. 30A, the point cloud column PC1 includes a first group of data points 901a1 and a second group of data points 901a2, which can be defined/identified based on a density level of the data points 901a within a predetermined volume (e.g., 0.1 cubic meters). In the present example, if the predetermined distance is 0.2 meters (two cubes in FIG. 30A), in step S29-5, the object filter determines that the two groups of data points closest to each other within the point cloud column PC1 (the first group of data points 901a1 and a second group of data points 901a2) are spaced apart from each other by more than the predetermined distance. Thus, the process proceeds to step S29-6 in which the object filter eliminates/removes all of the data points 901a included in the particular point cloud column PC1. FIG. 30B shows a side view of the three-dimensional point cloud 90 after the object filter has been applied to each of the individual point cloud columns of the three-dimensional point cloud 90 shown in FIG. 30A in accordance with the steps shown in FIG. 29.

In a preferred embodiment of the present invention, the example of the object filter discussed above with respect to FIGS. 29, 30A, and 31B can eliminate/remove data points 901a that correspond to objects that the working machine 1 can easily pass through and for which the planned traveling route L should not be changed/updated. On the other hand, the data points 901a that correspond to objects that are obstacles such as significant agricultural items, a person, or another object are maintained within the three-dimensional point cloud 90. Additionally, by eliminating/removing all of the data points 901a included in the particular point cloud column when the object filter determines that the two data points closest to each other within the point cloud column (or two groups of data points closest to each other within the point cloud column PC1) are spaced apart from each other by more than the predetermined distance in step S29-5, it is possible to eliminate/remove data points 901a that correspond to two or more small objects such as agricultural items such as branches or vegetation that extend in front of the working machine 1 in a horizontal manner (e.g., intersect the planned traveling route L) and are spaced apart from each other in the vertical direction (z-direction), through which the working machine 1 can easily pass. In this way, the object filter is an example of a filter that filters the three-dimensional point cloud to eliminate/remove one or more data points corresponding to an object through which the working machine 1 can pass based on a vertical position of the one or more data points.

Figure 31:
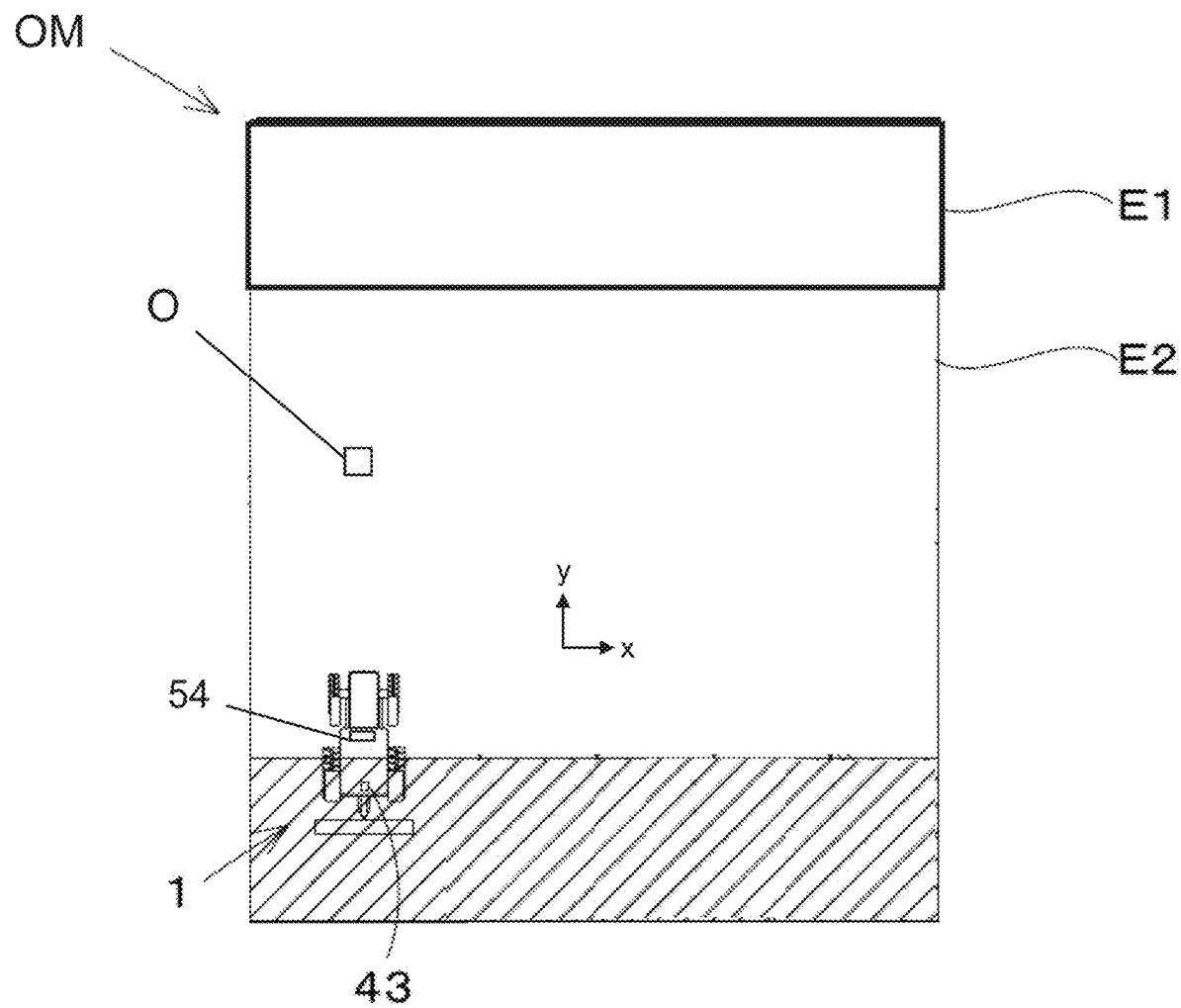
FIG. 31 shows an example of an obstacle map according to a preferred embodiment of the present invention.

In a preferred embodiment of the present invention, after the three-dimensional point cloud generated in step S6-2 is further filtered in steps S6-3 and S6-4, the three-dimensional point cloud is converted/compressed to generate a two-dimensional obstacle map OM in step S6-5. For example, in step S6-5, the three-dimensional point cloud is converted/compressed into a two-dimensional obstacle map OM by removing the z-coordinate from each of the data points remaining in the three-dimensional point cloud. By removing the z-coordinate from each of the data points included in the three-dimensional point cloud, each of the data points that is included in the three-dimensional point cloud is placed onto a two-dimensional plane that extends in the x-direction and the y-direction and represents the two-dimensional obstacle map OM. FIG. 31 shows an example of a two-dimensional obstacle map OM. The two-dimensional obstacle map includes the location of the one or more obstacles O that the work machine 1 cannot pass through and for which the planned traveling route L may have to be changed/updated.

In a preferred embodiment of the present invention, step S6-5 can include down sampling the three-dimensional point cloud by reducing the number of data points included in the three-dimensional point cloud based on the voxel grid 70. For example, the three-dimensional point cloud can be down sampled by representing the three-dimensional point cloud using the activated voxels 701a and the empty/inactivated voxels of the voxel grid 70 instead of all of the data points from the three-dimensional point cloud, because the data point density of the voxel grid 70 is less than the data point density of the three-dimensional point cloud. In other words, a plurality of data points of the three-dimensional point cloud that include at least one data point that corresponds to an obstacle can be represented by an activated voxel 701a, and a plurality of data points of the three-dimensional point cloud that do not include at least one data point that corresponds to an obstacle can be represented by an empty/inactivated voxel 701. However, step S6-5 is not limited to down sampling the three-dimensional point cloud using the voxel grid 70, and the data points included in the three-dimensional point cloud can be maintained.

In a preferred embodiment of the present invention, the agricultural field map M is updated to include positional information regarding the one or more obstacles O based on the two-dimensional obstacle map OM. For example, the two-dimensional obstacle map OM shown in FIG. 31 is continuously updated (e.g., updated at a predetermined time interval) as the working machine 1 travels through the agricultural field, and the agricultural field map M shown in FIG. 4 is updated to include the location of the one or more obstacles O included in the two-dimensional obstacle map OM.

As mentioned above, in a preferred embodiment of the present invention, the controller 40 is configured or programmed to determine whether or not the planned traveling route L needs to be updated based on the updated agricultural field map M that includes the positional information regarding the one or more obstacles O detected using the one or more LiDARs 54. For example, as shown in FIG. 4, the controller 40 is configured or programmed to determine to update the planned traveling route L to include an avoidance section L3 in which the machine body 3 is controlled to avoid an obstacle O detected using the one or more LiDARs 54. On the other hand, the controller 40 is configured or programmed to determine not to update the planned traveling route L if the obstacle O had not been detected.

In a preferred embodiment of the present invention discussed above, the three-dimensional point cloud generated in step S6-1 is generated using the one or more LiDARs 54. However, generating the three-dimensional point cloud in step S6-1 is not limited to using the one or more LiDARs 54. For example, a laser scanner other than a LIDAR or a photogrammetry method can be used to generate the three-dimensional point cloud in step S6-1. For example, images captured using a camera included in the one or more other sensors 56 can be processed using a photogrammetry method to generate the three-dimensional point cloud in step S6-1.

In a preferred embodiment of the present invention, a portion or an entirety of each of the controller 541 and the controller 40 and/or the functional units or blocks thereof as described herein with respect to the various preferred embodiments of the present invention can be implemented in one or more circuits or circuitry, such as an integrated circuit(s) or as an LSI (large scale integration). Each functional unit or block of each of the controller 541 and the controller 40 may be individually made into an integrated circuit chip. Alternatively, a portion or an entirety of the functional units or blocks may be integrated and made into an integrated circuit chip. Additionally, the method of forming a circuit or circuitry defining each of the controller 541 and the controller 40 is not limited to LSI, and an integrated circuit may be implemented by a dedicated circuit or a general-purpose processor or controller that is specifically programed to define a special-purpose processor or controller. Further, if technology of forming an integrated circuit, which replaces LSI, arises as a result of advances in semiconductor technology, an integrated circuit formed by that technology may be used.

Furthermore, a program which is operated in each of the controller 541 and the controller 40 and/or other elements of various preferred embodiments of the present invention, is a program (program causing a computer to perform a function or functions) controlling a controller, in order to realize functions of the various preferred embodiments according to the present invention, including each of the various circuits or circuitry described herein and recited in the claims. Therefore, information which is handled by the controller is temporarily accumulated in a RAM at the time of the processing. Thereafter, the information is stored in various types of circuitry in the form of ROMs and HDDs, and is read out by circuitry within, or included in combination with, the controller as necessary, and modification or write-in is performed thereto. As a recording medium storing the program, any one of a semiconductor medium (for example, the ROM, a nonvolatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer which is connected through a network such as the Internet. In this case, a storage device of the server computer is also included in preferred embodiments of the present invention. In addition, in the preferred embodiments described above, a portion or an entirety of the various functional units or blocks may be realized as an LSI which is typically an integrated circuit. Each functional unit or block of the controller may be individually chipped, or a portion thereof, or the whole thereof may be chipped by being integrated. In a case of making each functional block or unit as an integrated circuit, an integrated circuit controller that controls the integrated circuits, may be added.

Additionally, the method for making an integrated circuit is not limited to the LSI, and may be realized by a single-purpose circuit or a general-purpose processor that is programmable to perform the functions described above to define a special-purpose computer. Moreover, in a case of an appearance of a technology for making an integrated circuit which replaces the LSI due to an advance of a semiconductor technology, it is possible to use an integrated circuit depending on the technology.

Finally, it should be noted that the description and recitation in claims of this patent application referring to "controller", "circuit", or "circuitry" is in no way limited to an implementation that is hardware only, and as persons of ordinary skill in the relevant art would know and understand, such descriptions and recitations of "controller", "circuit", or "circuitry" include combined hardware and software implementations in which the controller, circuit, or circuitry is operative to perform functions and operations based on machine readable programs, software or other instructions in any form that are usable to operate the controller, circuit, or circuitry.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A method comprising:

generating a three-dimensional point cloud including a plurality of data points; and filtering the three-dimensional point cloud to remove one or more data points from the plurality of data points; and controlling a working machine based on the three-dimensional point cloud that has been filtered to remove the one or more data points; wherein the one or more data points are removed from the plurality of data points based on a distance between a first of the one or more data points with a largest vertical position within a column that extends in a vertical direction of the three-dimensional point cloud and a second of the one or more data points with a smallest vertical position within the column that extends in the vertical direction of the three-dimensional point cloud; and the one or more data points are removed from the plurality of data points when the distance between the first of the one or more data points and the second of the one or more data points is less than a predetermined threshold.

2. The method according to claim 1, further comprising:

filtering the three-dimensional point cloud to remove one or more additional data points from the plurality of data points based on the one or more additional data points corresponding to a portion of the working machine; wherein the three-dimensional point cloud is generated using a sensor attached to the working machine; and the one or more additional data points that correspond to the portion of the working machine are determined based on a known positional relationship between the sensor used to generate the three-dimensional point cloud and the portion of the working machine.

3. The method according to claim 1, wherein the filtering the three-dimensional point cloud includes using a voxel grid to filter the three-dimensional point cloud to remove the one or more data points from the plurality of data points;

the voxel grid includes one or more activated voxels that include at least one of the plurality of data points of the three-dimensional point cloud that corresponds to an object or a portion of an object;

the filtering the three-dimensional point cloud using the voxel grid includes applying a filter to the voxel grid to remove certain activated voxels from the voxel grid by changing the certain activated voxels to inactivated voxels; and when the certain activated voxels are removed from the voxel grid, the one or more data points, which are included in the certain activated voxels, are removed from the plurality of data points of the three-dimensional point cloud.

4. The method according to claim 3, wherein the filtering the three-dimensional point cloud using the voxel grid includes applying an additional filter to the voxel grid to removes certain activated voxels located above the filter in a vertical direction of the voxel grid; and the additional filter is represented by a plane that is parallel to, and located a predetermined distance from, a bottom surface of the voxel grid.

5. The method according to claim 3, wherein the filtering the three-dimensional point cloud using the voxel grid includes applying an additional filter to the voxel grid to removes certain activated voxels through which the additional filter extends and located below the additional filter in a vertical direction of the voxel grid; and the additional filter is represented by an inclined plane that starts from a point located on or adjacent to the working machine and that increases at a predetermined slope in the vertical direction of the voxel grid away from the point located on or adjacent to the working machine.

6. The method according to claim 3, wherein the filter applied to the voxel grid is applied to a particular voxel column that extends in a vertical direction of the voxel grid; and the filter removes the certain activated voxels from the particular voxel column based on a number of voxels between an activated voxel with a largest value in the vertical direction and an activated voxel with a smallest value in the vertical direction within the particular voxel column;

the first of the one or more data points is positioned within the activated voxel with the largest value in the vertical direction within the particular voxel column, and the second of the one or more data points is positioned within the activated voxel with the smallest value in the vertical direction within the particular voxel column; and the one or more data points are removed from the plurality of data points when the filter removes the certain activated voxels from the particular voxel column.

7. The method according to claim 6, wherein the filter determines whether or not the number of voxels between the activated voxel with the largest value in the vertical direction and the activated voxel with the smallest value in the vertical direction is less than a predetermined threshold; and the filter removes the certain activated voxels, which include all of the activated voxels included in the particular voxel column, when the number of voxels between the activated voxel with the largest value in the vertical direction and the activated voxel with the smallest value in the vertical direction is less than the predetermined threshold.

8. The method according to claim 6, wherein the filter removes the certain activated voxels from the particular voxel column based on whether or not there are any instances of consecutive activated voxels within the particular voxel column.

9. The method according to claim 3, wherein the filter applied to the voxel grid is applied to a particular voxel column that extends in a vertical direction of the voxel grid; and the filter removes the certain activated voxels from the particular voxel column based on whether or not an activated voxel with a smallest value in the vertical direction within the particular voxel column is spaced away from an additional filter that was previously used to remove activated voxels located below the additional filter in the vertical direction of the voxel grid.

10. The method according to claim 1, further comprising:

converting the three-dimensional point cloud to a two-dimensional obstacle map that includes a location of one or more obstacles; wherein the converting the three-dimensional point cloud to the two-dimensional obstacle map includes removing a vertical coordinate from each of the plurality of data points remaining in the three-dimensional point cloud after the one or more data points have been removed from the plurality of data points.

11. The method according to claim 1, further comprising:
converting the three-dimensional point cloud to a two-dimensional obstacle map that includes a location of one or more obstacles;
updating an agricultural field map to include the location of the one or more obstacles based on the two-dimensional obstacle map; and
determining whether or not to update a planned traveling route of the working machine based on the updated agricultural field map.

12. The method according to claim 1, wherein the second of the one or more data points with the smallest vertical position within the column that extends in the vertical direction of the three-dimensional point cloud is located above a bottom surface of the three-dimensional point cloud.

13. A method comprising:
generating a three-dimensional point cloud including a plurality of data points;
determining whether or not to update a planned traveling route of a working machine based on a distance between a first of the plurality of data points with a largest vertical position within a column that extends in a vertical direction of the three-dimensional point cloud and a second of the plurality of data points with a smallest vertical position within the column that extends in the vertical direction of the three-dimensional point cloud;
when it is determined to update the planned traveling route, updating the planned traveling route and controlling the working machine based on an updated planned traveling route; and
when it is determined to not update the planned traveling route, controlling the working machine based on the planned traveling route that has not been updated.

14. The method according to claim 13, wherein the second of the one or more data points with the smallest vertical position within the column that extends in the vertical direction of the three-dimensional point cloud is located above a bottom surface of the three-dimensional point cloud.

15. A working machine comprising:
a sensor to generate a three-dimensional point cloud including a plurality of data points; and
a controller configured or programmed to control the working machine based on the three-dimensional point cloud; wherein
the controller is configured or programmed to determine whether or not to update a planned traveling route of the working machine based on a distance between a first of the plurality of data points with a largest vertical position within a column that extends in a vertical direction of the three-dimensional point cloud and a second of the plurality of data points with a smallest vertical position within the column that extends in the vertical direction of the three-dimensional point cloud;
the controller is configured or programmed to update the planned traveling route and control the working machine based on an updated planned traveling route when it is determined to update the planned traveling route; and
the controller is configured or programmed to control the working machine based on the planned traveling route that has not been updated when it is determined to not update the planned traveling route.

16. The working machine according to claim 15, wherein
the controller is configured or programmed to filter the three-dimensional point cloud to remove one or more data points from the plurality of data points based on a position of the one or more data points;
the controller is configured or programmed to use a voxel grid to filter the three-dimensional point cloud to remove the one or more data points from the plurality of data points;
the voxel grid includes one or more activated voxels that include at least one of the plurality of data points of the three-dimensional point cloud that corresponds to an object or a portion of an object;
the controller is configured or programmed to apply a filter to the voxel grid to filter the three-dimensional point cloud using the voxel grid;
the filter applied to the voxel grid removes certain activated voxels from the voxel grid by changing the certain activated voxels to inactivated voxels; and
when the certain activated voxels are removed from the voxel grid, the one or more data points, which are included in the certain activated voxels, are removed from the plurality of data points of the three-dimensional point cloud.

17. The working machine according to claim 16, wherein
the controller is configured or programmed to apply the filter to a particular voxel column that extends in a vertical direction of the voxel grid;
the filter removes the certain activated voxels from the particular voxel column based on a number of voxels between an activated voxel with a largest value in the vertical direction and an activated voxel with a smallest value in the vertical direction within the particular voxel column;
the first of the one or more data points is positioned within the activated voxel with the largest value in the vertical direction within the particular voxel column, and the second of the one or more data points is positioned within the activated voxel with the smallest value in the vertical direction within the particular voxel column; and
the one or more data points are removed from the plurality of data points when the filter removes the certain activated voxels from the particular voxel column.

18. The working machine according to claim 16, wherein
the controller is configured or programmed to apply the filter to a particular voxel column that extends in a vertical direction of the voxel grid; and
the filter removes the certain activated voxels from the particular voxel column based on whether or not an activated voxel with a smallest value in the vertical direction within the particular voxel column is spaced away from an additional filter that was previously used to remove activated voxels located below the additional filter in the vertical direction of the voxel grid.

19. The working machine according to claim 15, wherein
the controller is configured or programmed to:
filter the three-dimensional point cloud to remove one or more data points from the plurality of data points based on a position of the one or more data points;
convert the three-dimensional point cloud to a two-dimensional obstacle map that includes a location of one or more obstacles;
update an agricultural field map to include the location of the one or more obstacles based on the two-dimensional obstacle map; and determine whether or not to update a planned traveling route of the working machine based on the updated agricultural field map.

20. The working machine according to claim 15, wherein the controller is configured or programmed to:
filter the three-dimensional point cloud to remove one or more data points from the plurality of data points based on a position of the one or more data points;
remove the one or more data points from the plurality of data points based on the distance between the first of the one or more data points and the second of the one or more data points; and
remove the one or more data points from the plurality of data points when the distance between the first of the one or more data points and the second of the one or more data points is less than a predetermined threshold.

\* \* \* \* \*